US012586716B2

(12) United States Patent
Ishizuka et al.

(10) Patent No.: US 12,586,716 B2
(45) Date of Patent: Mar. 24, 2026

(54) MULTILAYER CERAMIC CAPACITOR INCLUDING INTERNAL ELECTRODE LAYERS WITH VARYING COVERAGES

(71) Applicant: Murata Manufacturing Co., Ltd., Nagaokakyo (JP)

(72) Inventors: Akira Ishizuka, Nagaokakyo (JP); Kenichi Togo, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 529 days.

(21) Appl. No.: 17/985,195

(22) Filed: Nov. 11, 2022

(65) Prior Publication Data

US 2023/0197338 A1      Jun. 22, 2023

(30) Foreign Application Priority Data

Dec. 13, 2021      (JP) ................................. 2021-201981

(51) Int. Cl.
| | |
|---|---|
| *H01G 4/005* | (2006.01) |
| *H01G 4/232* | (2006.01) |
| *H01G 4/30* | (2006.01) |

(52) U.S. Cl.
CPC ............. *H01G 4/005* (2013.01); *H01G 4/232* (2013.01); *H01G 4/30* (2013.01)

(58) Field of Classification Search
CPC ........... H01G 4/30; H01G 4/232; H01G 4/005
See application file for complete search history.

(56) References Cited

U.S. PATENT DOCUMENTS

| | | | | |
|---|---|---|---|---|
| 6,038,121 A * | 3/2000 | Naito | ..................... | H01G 4/232 |
| | | | | 361/308.1 |
| 2006/0245141 A1* | 11/2006 | Shirasu | .................. | H01G 4/012 |
| | | | | 361/303 |
| 2009/0067117 A1* | 3/2009 | Kasuya | .................... | H01G 4/30 |
| | | | | 156/89.18 |
| 2011/0141656 A1* | 6/2011 | Yun | ........................ | H01G 4/005 |
| | | | | 29/25.42 |
| 2013/0329334 A1* | 12/2013 | Hiramatsu | ............... | H01G 4/12 |
| | | | | 29/25.03 |

(Continued)

FOREIGN PATENT DOCUMENTS

| | | | |
|---|---|---|---|
| JP | H03209709 A | | 9/1991 |
| JP | 06208903 A | * | 7/1994 |

(Continued)

*Primary Examiner* — David M Sinclair
(74) *Attorney, Agent, or Firm* — Keating & Bennett, LLP

(57) ABSTRACT

A multilayer ceramic capacitor includes a multilayer body and three or more external electrodes. A first internal electrode layer includes a first counter electrode portion, a first extension portion, and a second extension portion. The first counter electrode portion includes a first central region, a first connection region connected to the first extension portion, and a second connection region connected to the second extension portion. Coverages of the first and second connection regions with respect to the dielectric layers are higher than a coverage of the first central region with respect to the dielectric layers, and coverages of the first and second extension portions with respect to the dielectric layers are higher than the coverage of the first central region with respect to the dielectric layers.

20 Claims, 27 Drawing Sheets

(56)     References Cited

U.S. PATENT DOCUMENTS

2016/0196917 A1 *   7/2016  Lim ....................... H01G 4/012
                                                         361/301.4
2019/0027312 A1 *   1/2019  Muramatsu ............. H01G 4/12
2021/0210257 A1 *   7/2021  Hofstätter ........... H01C 1/1413

FOREIGN PATENT DOCUMENTS

JP          2000-058376  A      2/2000
JP          2008-085041  A      4/2008
JP           2010021524  A   *   1/2010    ............ H01G 4/012
JP          2013-093522  A      5/2013
JP           2013211357  A   *  10/2013    .............. H01G 4/12
JP          2020-065044  A      4/2020

* cited by examiner

MULTILAYER CERAMIC CAPACITOR INCLUDING INTERNAL ELECTRODE LAYERS WITH VARYING COVERAGES

CROSS REFERENCE TO RELATED APPLICATIONS

This application is based on and claims the benefit of priority from Japanese Patent Application No. 2021-201981, filed on Dec. 13, 2021, the entire contents of which are hereby incorporated herein by reference.

BACKGROUND OF THE INVENTION

1. Field of the Invention

The present invention relates to a multilayer ceramic capacitor.

2. Description of the Related Art

Conventionally, multilayer ceramic capacitors have been known. For example, as a decoupling capacitor used for stabilizing a power supply voltage supplied to an integrated circuit component which operates at high speed, a multilayer feedthrough ceramic capacitor having a structure such as that disclosed in Japanese Patent Application Publication No. 2000-58376 has been known. The multilayer feedthrough ceramic capacitor described in Japanese Patent Application Publication No. 2000-58376 includes a ceramic base body. Inside the ceramic base body, a plurality of first internal electrodes and a plurality of second internal electrodes are alternately provided in the lamination direction. Both ends of the first internal electrodes extend toward and reach both end faces in the length direction of the ceramic base body, and both ends of the second internal electrodes extend toward and reach both end faces in the width direction of the ceramic base body.

With an increase in performance of electronic devices on which such multilayer feedthrough ceramic capacitors are mounted, large capacitances of such multilayer feedthrough ceramic capacitors are required. Here, as one way to achieve larger capacitances, it is conceivable to increase the number of laminated layers in the effective portion by reducing the thicknesses of the internal electrodes. However, in a case in which the thicknesses of the internal electrodes are reduced, when the melting point of the metal powder used in the internal electrodes is lower than that of the dielectric powder, the internal electrodes are liquefied and coagulation occurs when the dielectric layers are sintered. In this case, the internal electrodes are divided into a plurality of pieces, and the coverage of the internal electrode layers with respect to the dielectric layers decreases. As a result, the area of the current path decreases due to the decrease in the metal ratio of the internal electrodes, and the resistance increases, such that the DC resistance (Rdc) increases. As a result, the characteristics of the multilayer ceramic capacitor may deteriorate. When a decrease in the coverage occurs at the extension portions of the internal electrodes that extend toward and reach the end surfaces or the side surfaces of the ceramic base body, the internal electrodes are not sufficiently exposed at the end surfaces or the side surfaces of the multilayer body, and the connectivity between the internal electrodes and the external electrodes decreases. When the connectivity between the internal electrode layers and the external electrodes decreases, the DC resistance (Rdc) may increase more significantly.

SUMMARY OF THE INVENTION

Preferred embodiments of the present invention provide multilayer ceramic capacitors that are each able to reduce or prevent an increase in DC resistance of internal electrode layers.

A multilayer ceramic capacitor according to a preferred embodiment of the present invention includes a multilayer body including a plurality of laminated dielectric layers, a plurality of internal electrode layers each laminated on a respective one of the plurality of dielectric layers, a first main surface and a second main surface opposed to each other in a lamination direction, a first end surface and a second end surface opposed to each other in a length direction orthogonal or substantially orthogonal to the lamination direction, and a first side surface and a second side surface opposed to each other in a width direction orthogonal or substantially orthogonal to the lamination direction and the length direction, and three or more external electrodes, wherein the plurality of internal electrode layers include a plurality of first internal electrode layers and a plurality of second internal electrode layers, the plurality of first internal electrode layers each include a first counter electrode portion opposed to a respective one of the plurality of second internal electrode layers with a respective one of the plurality of dielectric layers interposed therebetween, a first extension portion that extends from the first counter electrode portion and extends towards and is exposed at a first surface portion of the multilayer body, and a second extension portion that extends from the first counter electrode portion and extends towards and is exposed at a second surface portion of the multilayer body, the plurality of second internal electrode layers each include a second counter electrode portion opposed to a respective one of the plurality of first internal electrode layers with a respective one of the plurality of dielectric layers interposed therebetween, and a third extension portion that extends from the second counter electrode portion and extends towards and is exposed at a third surface portion of the multilayer body, the three or more external electrodes include a first external electrode connected to the first extension portion, a second external electrode connected to the second extension portion, and a third external electrode connected to the third extension portion, the first counter electrode portion includes a first central region including a central portion of the first counter electrode portion, a first connection region that is connected to the first extension portion and has a higher coverage with respect to the dielectric layers than the first central region, and a second connection region that is connected to the second extension portion and has a higher coverage with respect to the dielectric layers than the first central region, the coverages of the first connection region and the second connection region with respect to the dielectric layers are higher than a coverage of the first central region with respect to the dielectric layers, and coverages of the first extension portion and the second extension portion with respect to the dielectric layers are higher than the coverage of the first central region with respect to the dielectric layers.

According to preferred embodiments of the present invention, it is possible to provide multilayer ceramic capacitors that are each able to reduce or prevent an increase in DC resistance of internal electrode layers.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
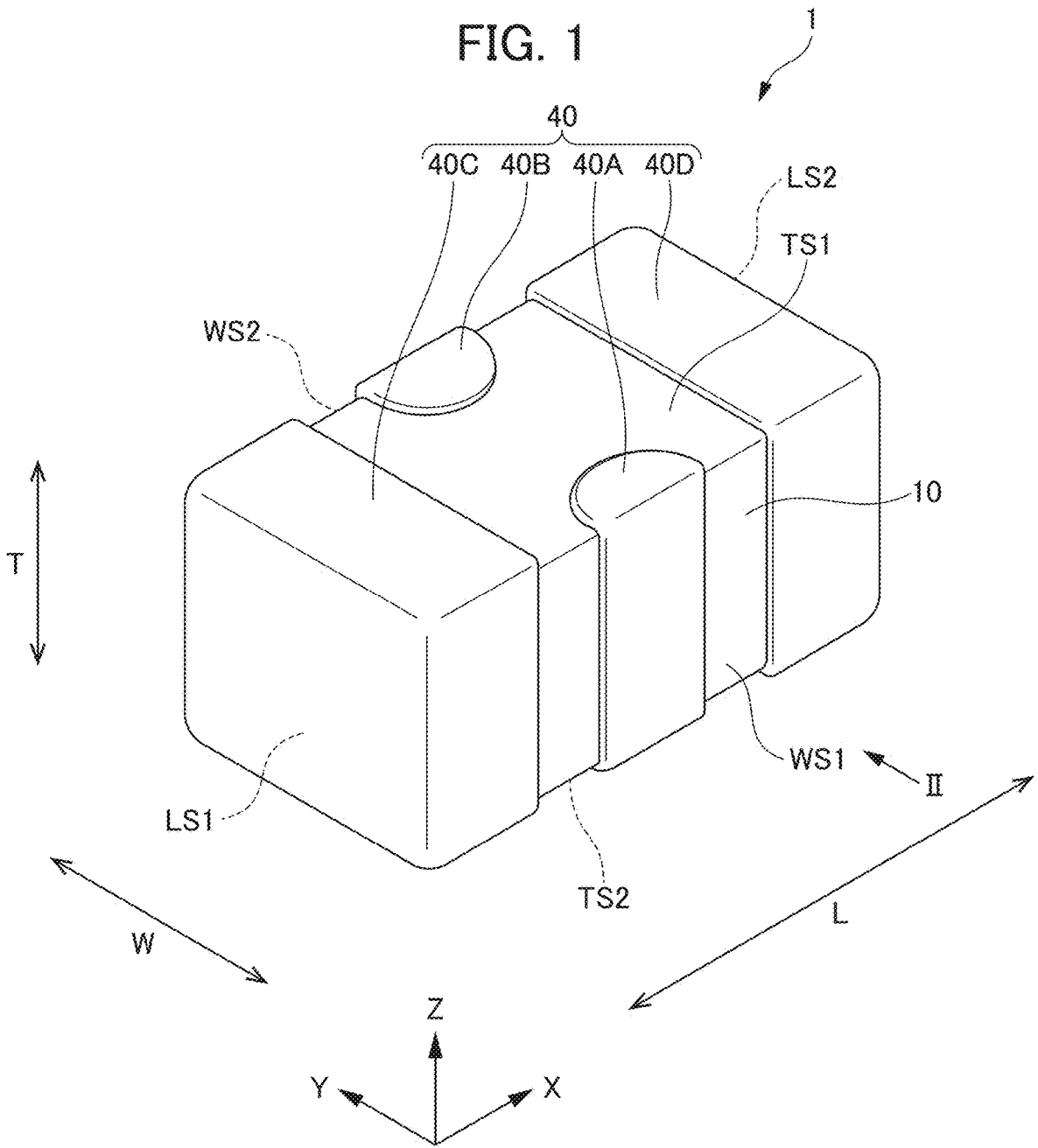
FIG. 1 is an external perspective view of a multilayer ceramic capacitor according to a first preferred embodiment of the present invention.
Figure 2:
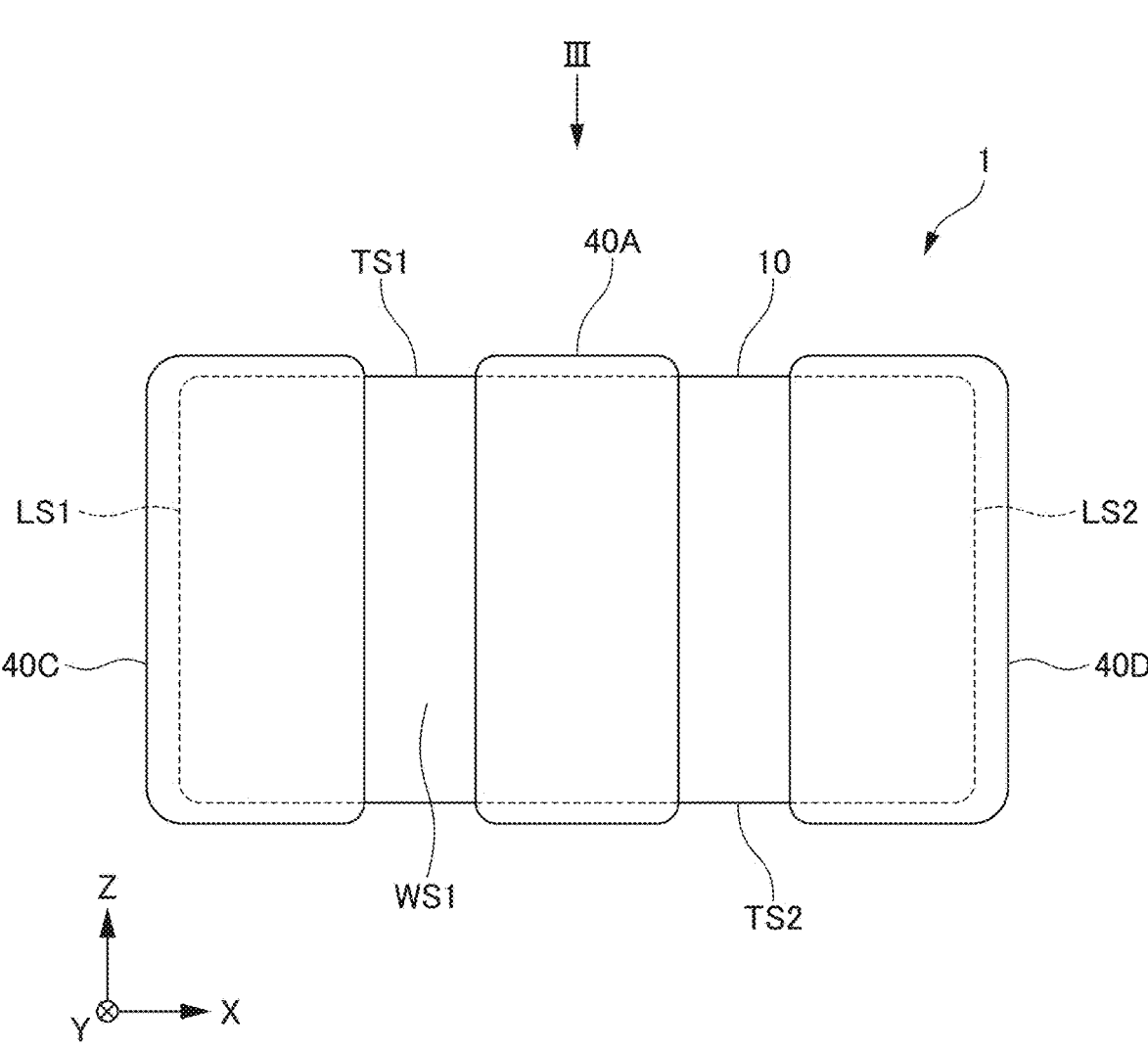
FIG. 2 is an arrow view of the multilayer ceramic capacitor shown in FIG. 1 when a first side surface is viewed along the direction of the arrow II.
Figure 3:
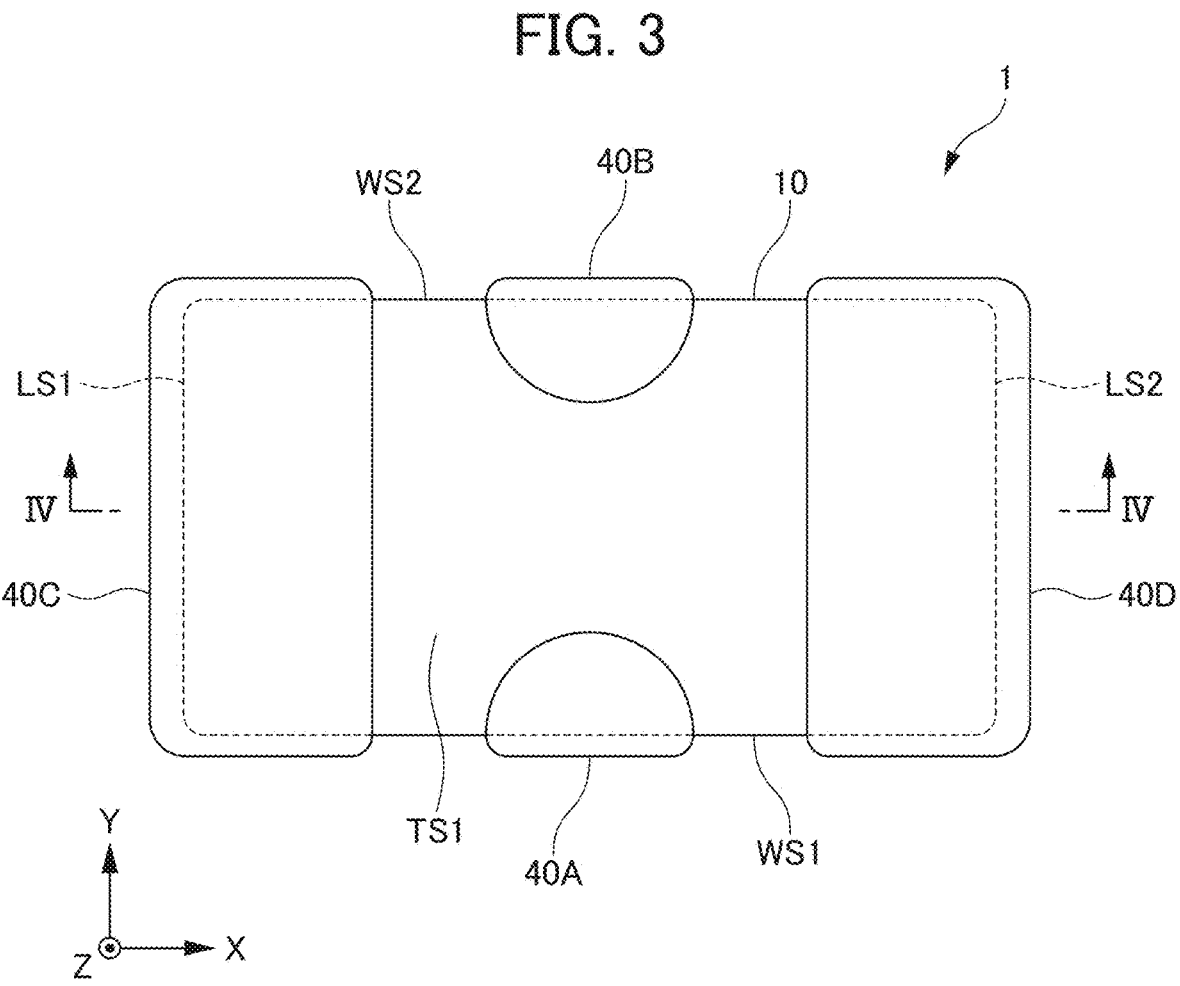
FIG. 3 is an arrow view of the multilayer ceramic capacitor shown in FIG. 2 when a first main surface is viewed along the direction of the arrow III.
Figure 4:
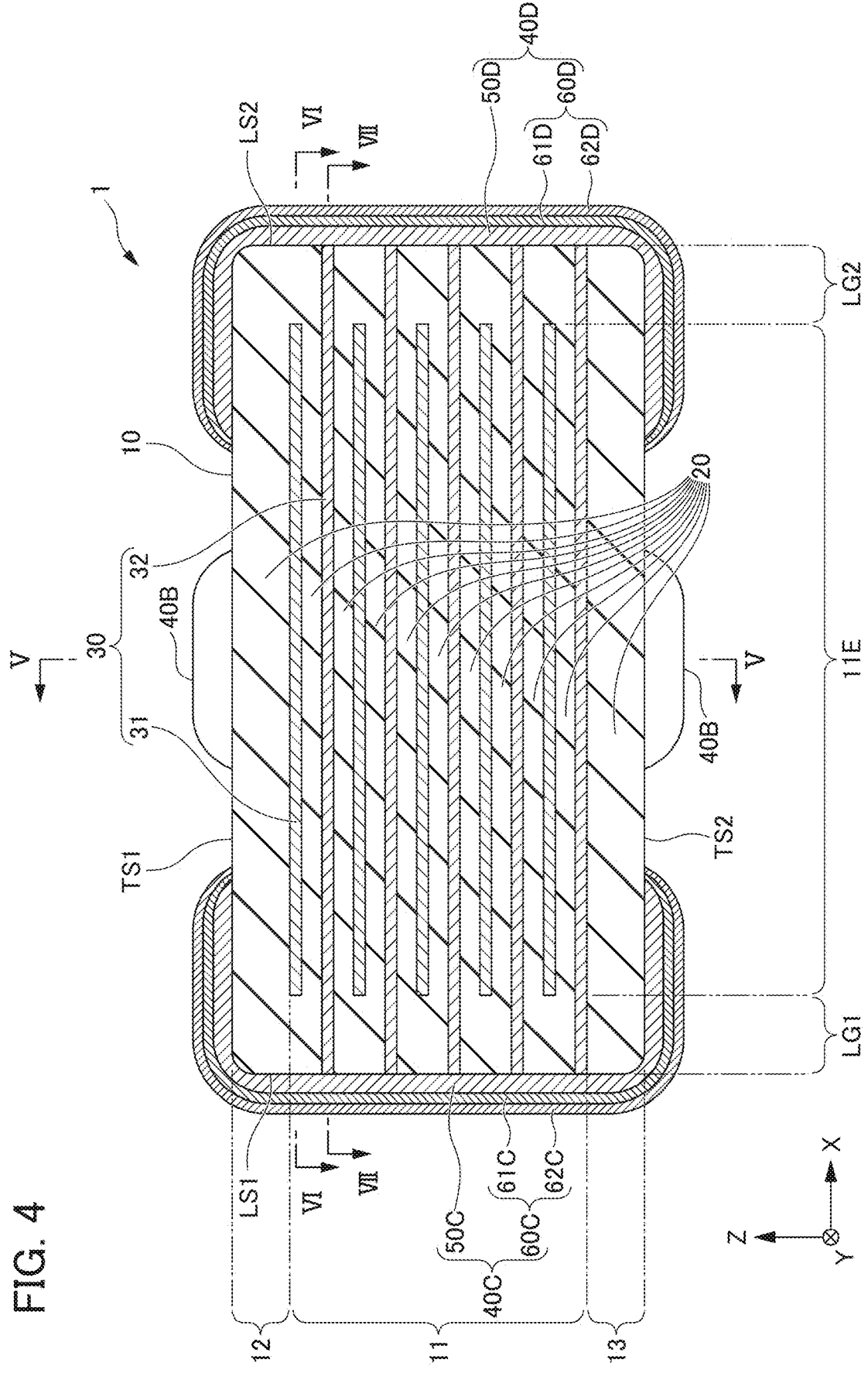
FIG. 4 is a cross-sectional view taken along the line IV-IV of the multilayer ceramic capacitor shown in FIG. 3.
Figure 5:
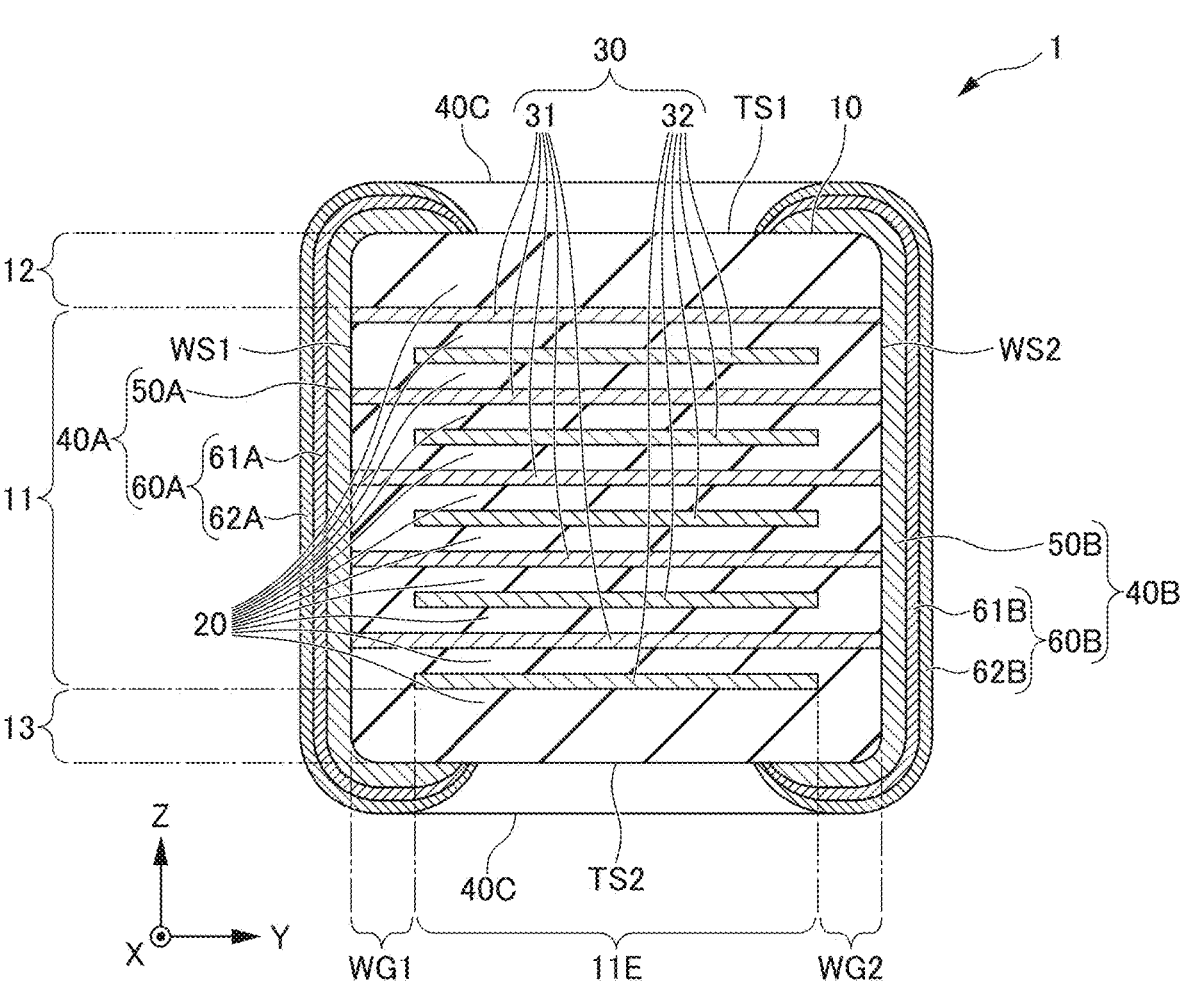
FIG. 5 is a cross-sectional view taken along the line V-V of the multilayer ceramic capacitor shown in FIG. 4.
Figure 6:
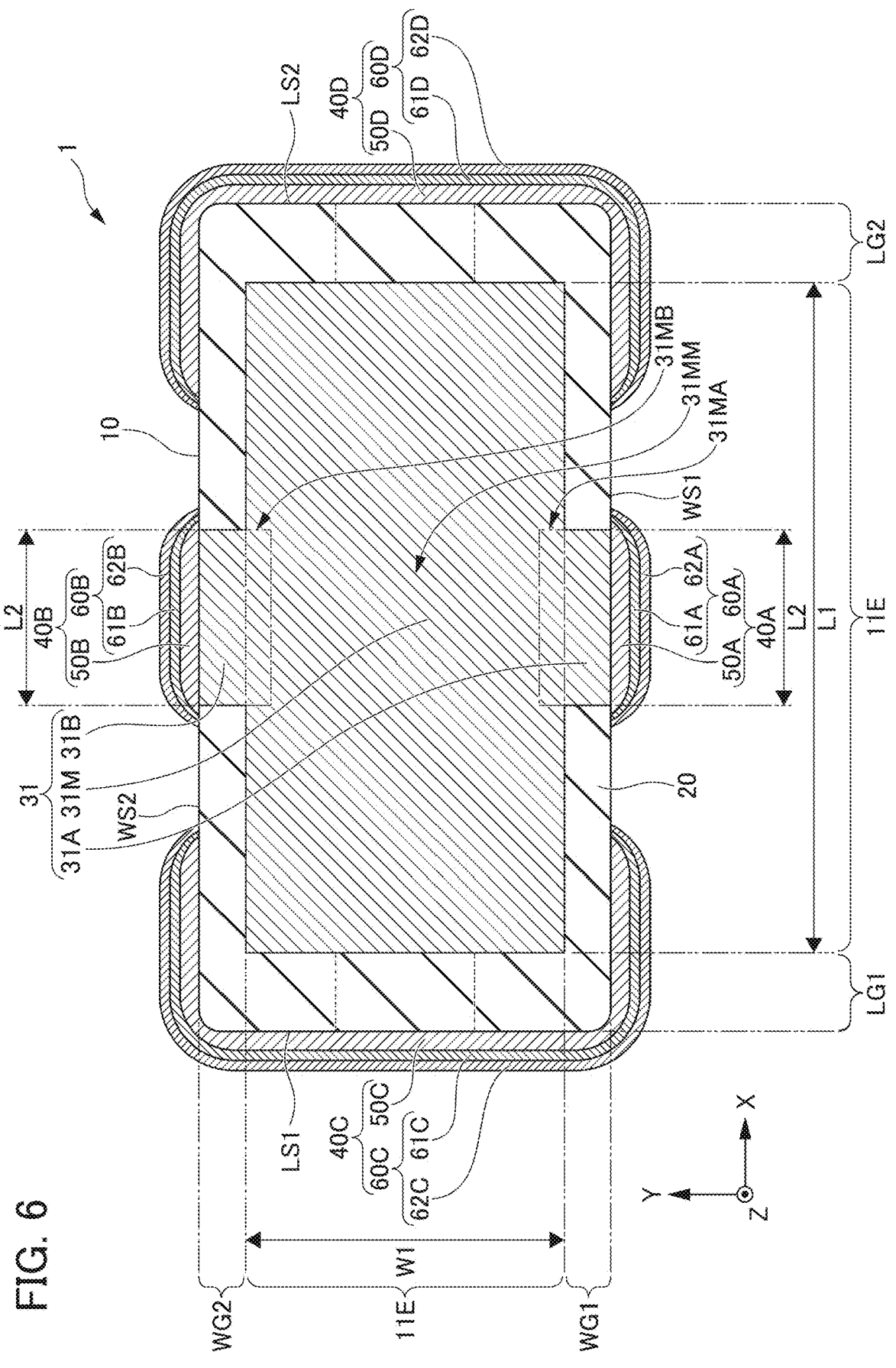
FIG. 6 is a cross-sectional view taken along the line VI-VI of the multilayer ceramic capacitor shown in FIG. 4, showing first internal electrode layers.
Figure 7:
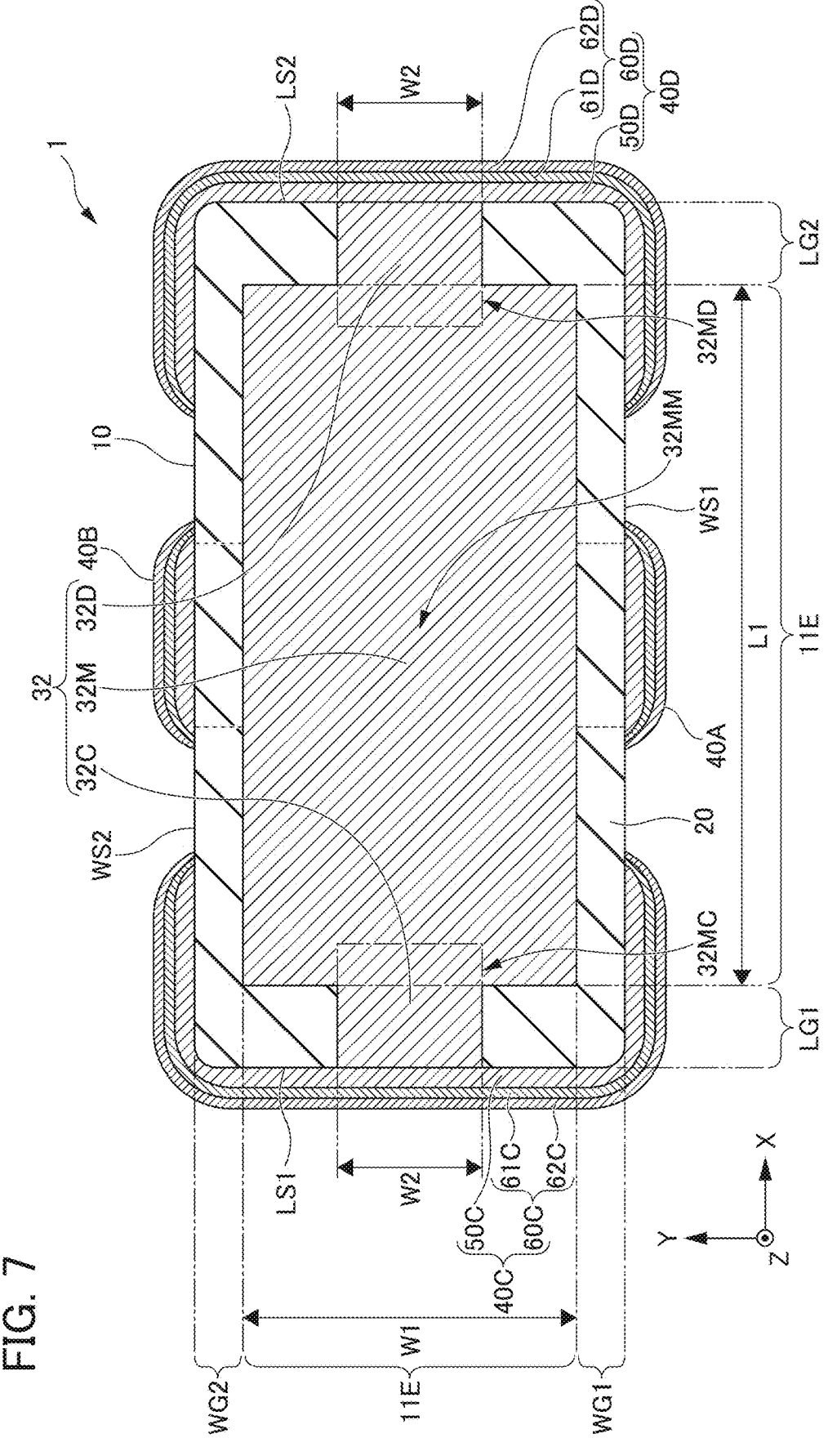
FIG. 7 is a cross-sectional view taken along line VII-VII of the multilayer ceramic capacitor shown in FIG. 4, showing second internal electrode layers.

Hereinafter, a multilayer ceramic capacitor 1 according to a first preferred embodiment of the present invention will be described. FIG. 1 is an external perspective view of a multilayer ceramic capacitor 1 according to the first preferred embodiment of the present invention. FIG. 2 is an arrow view of the multilayer ceramic capacitor 1 shown in FIG. 1 when the first side surface WS1 is viewed along the direction of the arrow II. FIG. 3 is an arrow view of the multilayer ceramic capacitor 1 shown in FIG. 2 when the first main surface TS1 is viewed along the direction of the arrow III. FIG. 4 is a cross-sectional view taken along the line IV-IV of the multilayer ceramic capacitor 1 shown in FIG. 3. FIG. 5 is a cross-sectional view taken along the line V-V of the multilayer ceramic capacitor 1 shown in FIG. 4. FIG. 6 is a cross-sectional view taken along the line VI-VI of the multilayer ceramic capacitor 1 shown in FIG. 4, showing first internal electrode layers 31. FIG. 7 is a cross-sectional view taken along the line VII-VII of the multilayer ceramic capacitor 1 shown in FIG. 4, showing second internal electrode layers 32.

The multilayer ceramic capacitor 1 includes a multilayer body 10 and external electrodes 40.

FIGS. 1 to 7 show XYZ orthogonal coordinate systems. The length direction L of the multilayer ceramic capacitor 1 and the multilayer body 10 corresponds to the X direction. The width direction W of the multilayer ceramic capacitor 1 and the multilayer body 10 corresponds to the Y direction. The lamination (stacking) direction T of the multilayer ceramic capacitor 1 and the multilayer body 10 corresponds to the Z direction. Here, the cross section shown in FIG. 4 is also referred to as a cross section LT. The cross section shown in FIG. 5 is also referred to as a cross section WT. The cross section shown in FIGS. 6 and 7 is also referred to as a cross section LW.

As shown in FIGS. 1 to 7, the multilayer body 10 includes a first main surface TS1 and a second main surface TS2 which are opposed to each other in the lamination direction T, a first end surface LS1 and a second end surface LS2 which are opposed to each other in the length direction L orthogonal or substantially orthogonal to the lamination direction T, and a first side surface WS1 and a second side surface WS2 which are opposed to each other in the width direction W orthogonal or substantially orthogonal to the lamination direction T and the length direction L.

As shown in FIG. 1, the multilayer body 10 has a rectangular or substantially rectangular parallelepiped shape. The dimension in the length direction L of the multilayer body 10 is not necessarily longer than the dimension in the width direction W. The corners and ridges of the multilayer body 10 are preferably rounded. The corner portions are portions where the three surfaces of the laminate intersect, and the ridge portions are portions where the two surfaces of the laminate intersect. In addition, unevenness or the like may be provided on a portion or the entirety of the surface of the multilayer body 10.

The dimensions of the multilayer body 10 are not particularly limited.

As shown in FIGS. 4 and 5, the multilayer body 10 includes an inner layer portion 11, and a first main surface-side outer layer portion 12 and a second main surface-side outer layer portion 13 that sandwich the inner layer portion 11 in the lamination direction T.

The inner layer portion 11 includes a plurality of dielectric layers 20 and a plurality of internal electrode layers 30. The inner layer portion 11 includes, in the lamination direction T, internal electrode layers 30 from the internal electrode layer 30 located closest to the first main surface TS1 to the internal electrode layer 30 located closest to the second main surface TS2. In the inner layer portion 11, the plurality of internal electrode layers 30 are opposed to each other with the dielectric layer 20 interposed therebetween. The inner layer portion 11 generates a capacitance and defines and functions as a capacitor.

The plurality of dielectric layers 20 are each made of a dielectric material. The dielectric material may be, for example, a dielectric ceramic including components such as $BaTio_3$, $CaTio_3$, $SrTiO_3$, or $CaZro_3$. Furthermore, the dielectric material may be obtained by adding a sub-component such as, for example, Mn compound, Fe compound, Cr compound, Co compound, and Ni compound to the main component.

The thickness of the dielectric layer 20 is preferably, for example, about 0.3 μm or more and about 1.5 μm or less. The number of the dielectric layers 20 to be laminated (stacked) is preferably 14 or more and 1000 or less, for example. The number of the dielectric layers 20 refers to the total number of dielectric layers in the inner layer portion 11, and dielectric layers in the first main surface-side outer layer portion 12 and the second main surface-side outer layer portion 13.

The plurality of internal electrode layers 30 include a plurality of first internal electrode layers 31 and a plurality of second internal electrode layers 32. The plurality of first internal electrode layers 31 are provided on the plurality of dielectric layers 20 and extend toward the first side surface WS1 and the second side surface WS2. The plurality of second internal electrode layers 32 are provided on the plurality of dielectric layers 20 and extend toward the first end surface LS1 and the second end surface LS2. The plurality of first internal electrode layers 31 and the plurality of second internal electrode layers 32 are alternately provided with the dielectric layer 20 interposed therebetween in the lamination direction T of the multilayer body 10. The first internal electrode layers 31 and the second internal electrode layers 32 each sandwich the dielectric layers 20.

As shown in FIG. 6, the first internal electrode layers 31 each include a first counter electrode portion 31M opposed to the second internal electrode layer 32 with the dielectric layer 20 interposed therebetween, a first extension portion 31A extending from the first counter electrode portion 31M and extending towards and being exposed at a portion of the first side surface WS1 defining and functioning as a first surface portion, and a second extension portion 31B extending from the first counter electrode portion 31M and extending towards and being exposed at a portion of the second side surface WS2 defining and functioning as a second surface portion. The first extension portion 31A is exposed at the first side surface WS1, and the second extension portion 31B is exposed at the second side surface WS2.

The shape of the first counter electrode portion 31M is not particularly limited, but is preferably rectangular or substantially rectangular, for example. However, the corners of the rectangular or substantially rectangular shape may be rounded, or the corners of the rectangular or substantially rectangular shape may be oblique. The shapes of the first extension portion 31A and the second extension portion 31B are not particularly limited, but are preferably rectangular or substantially rectangular, for example. However, the corners of the rectangular or substantially rectangular shape may be rounded, or the corners of the rectangular or substantially rectangular shape may be oblique.

The dimension L2 of the first extension portion 31A in the length direction L is smaller than the dimension L1 of the first counter electrode portion 31M in the length direction L. The dimension L2 of the second extension portion 31B in the length direction L is smaller than the dimension L1 of the first counter electrode portion 31M in the length direction L. That is, when the extending direction of the first extension portion 31A (the direction from the second side surface WS2 to the first side surface WS1) is defined as the first extending direction, the length L2 of the first extension portion 31A in the direction orthogonal or substantially orthogonal to the first extending direction (the length direction L) is smaller than the length L1 of the first counter electrode portion 31M in the direction orthogonal or substantially orthogonal to the first extending direction (the length direction L). When the extending direction of the second extension portion 31B (the direction from the first side surface WS1 to the second side surface WS2) is defined as the second extending direction, the length L2 of the second extension portion 31B in the direction orthogonal or substantially orthogonal direction to the second extending direction (the length direction L) is smaller than the length L1 of the first counter electrode portion 31M in the direction orthogonal or substantially orthogonal to the second extending direction (the length direction L). The length L2 is preferably, for example, about 90% or less of the length L1. The length L2 is more preferably, for example, about 5% or more and about 90% or less of the length L1.

The first counter electrode portion 31M includes a first central region 31MM including a central portion of the first counter electrode portion 31M, a first connection region 31MA connected to the first extension portion 31A, and a second connection region 31MB connected to the second extension portion 31B. The first connection region 31MA has a higher coverage with respect to the dielectric layer 20 than the first central region 31MM. The second connection region 31MB has a higher coverage with respect to the dielectric layer 20 than the first central region 31MM.

The length of the first connection region 31MA in the width direction W is defined as, for example, about 5% of the length W1 of the first counter electrode portion 31M in the width direction W. The length of the first connection region 31MA in the length direction L is defined to be the same or substantially the same as the length L2 of the first extension portion 31A in the length direction L. The length of the second connection region 31MB in the width direction W of the second connection region 31MB is defined as, for example, about 5% of the length W1 of the first counter electrode portion 31M in the width direction W. The length of the second connection region 31MB in the length direction L is defined to be the same or substantially the same as the length L2 of the first extension portion 31A in the length direction L.

The coverage of the first connection region 31MA and the second connection region 31MB with respect to the dielectric layer 20 is higher than the coverage of the first central region 31MM with respect to the dielectric layer 20. The coverage of the first extension portion 31A and the second extension portion 31B with respect to the dielectric layer 20 is higher than the coverage of the first central region 31MM with respect to the dielectric layer 20.

That is, when the coverage of the first central region 31MM with respect to the dielectric layer 20 is defined as A, the coverage of the first connection region 31MA and the second connection region 31MB with respect to the dielectric layer 20 is defined as B, and the coverage of the first extension portion 31A and the second extension portion 31B with respect to the dielectric layer 20 is defined as C, the relationship of A<B and A<C are satisfied.

With such a configuration, since the metal ratio of the first connection region 31MA and the second connection region 31MB of the first internal electrode layer 31, and the metal ratio of the first extension portion 31A and the second extension portion 31B increase, it is possible to increase the area of the current path connecting the first internal electrode layer 31 and a first external electrode 40A and a second external electrode 40B, which will be described later, of the external electrode 40. As a result, since the resistance of the first internal electrode layer 31 becomes low, it is possible to reduce or prevent an increase in the DC resistance (Rdc), and it is possible to maintain and improve the characteristics of the multilayer ceramic capacitor 1. Furthermore, since it is possible to reduce or prevent the division of the first internal electrode layer 31 into a plurality of pieces, it is possible to reduce or prevent a decrease in the connectivity between the first internal electrode layer 31, and the first external electrode 40A and the second external electrode 40B.

With such a configuration, by providing the first connection region 31MA and the second connection region 31MB and making the coverage B of the first connection region 31MA and the second connection region 31MB with respect to the dielectric layer 20 larger than the coverage A of the first central region 31MM with respect to the dielectric layer 20, the metal ratio of the first internal electrode layer 31 increases not only in the first extension portion 31A and the second extension portion 31B, but also in the first connection region 31MA and the second connection region 31MB. With such a configuration, since it is possible to increase the area of the current path, it is possible to reduce the resistance correspondingly, and to reduce the resistance of the entire first internal electrode layer 31. As a result, it is possible to further improve the advantageous effect of reducing or preventing an increase in DC resistance (Rdc).

Here, in the present preferred embodiment, the reason why the coverage A of the first central region 31MM is not equal to the coverage B of the first connection region 31MA and the second connection region 31MB or the coverage C of the first extension portion 31A and the second extension portion 31B will be described. In a case in which the coverage A of the first central region 31MM is increased and is equal to or greater than the coverage B of the first connection region 31MA and the second connection region 31MB or the coverage C of the first extension portion 31A and the second extension portion 31B, although it is possible to ensure the capacitance, a portion where the dielectric layer 20 is exposed on the surface of the first internal electrode layer 31 may be reduced. In this case, the contact point between the dielectric layers 20 and the other dielectric layers 20 to be laminated on the first internal electrode layers 31 is reduced, and the adhesion strength is reduced, and there is a concern that delamination may occur. For example, when the coverage of the internal electrode layer with respect to the dielectric layer is 100%, delamination may be more likely to occur than when the coverage of the internal electrode layer with respect to the dielectric layer is low. In the present preferred embodiment, by making the coverage A of the first central region 31MM lower than the coverage B of the first connection region 31MA and the second connection region 31MB and the coverage C of the first extension portion 31A and the second extension portion 31B, it is possible to ensure a portion where the dielectric layer 20 is exposed on the surface of the first internal electrode layer 31, and it is possible to increase the contact point between the dielectric layers 20 and the other dielectric layers 20 to be laminated on the first internal electrode layers 31. As a result, it is possible to ensure adhesion, and it is possible to reduce or prevent the delamination. According to the present preferred embodiment, it is possible to achieve both the reduction or prevention of an increase of the DC resistance (Rdc) of the first internal electrode layer 31 and a reduction or prevention of the delamination. That is, according to the multilayer ceramic capacitor 1 of the present preferred embodiment, an anchor effect is generated between the dielectric layers and the internal electrode layers, and thus, it is possible to increase the adhesion strength between the dielectric layers and the internal electrode layers. As a result, it is possible to reduce or prevent intrusion of moisture or the like into the multilayer body, and thus, it is possible to reduce or prevent a decrease in moisture resistance of the multilayer ceramic capacitor 1. Therefore, it is possible to improve the reliability of the multilayer ceramic capacitor 1 while reducing or preventing an increase in the DC resistance (Rdc) of the first internal electrode layer 31.

Furthermore, the coverage B of the first connection region 31MA and the second connection region 31MB with respect to the dielectric layer 20 is preferably, for example, about 72% or more. The coverage C of the first extension portion 31A and the second extension portion 31B with respect to the dielectric layer 20 is preferably, for example, about 72% or more. The coverage A of the first central region 31MM with respect to the dielectric layer 20 is preferably lower than the coverage B and the coverage C, and is preferably, for example, about 52% or more. The coverage B and the coverage C may be high at, for example, about 5% or more than the coverage A.

As shown in FIG. 7, the second internal electrode layer 32 includes a second counter electrode portion 32M opposed to the first internal electrode layer 31 with the dielectric layer 20 interposed therebetween, a third extension portion 32C extending from the second counter electrode portion 32M and extending toward and being exposed at a portion of the first end surface LS1 defining and functioning as a third surface portion, and a fourth extension portion 32D extending from the second counter electrode portion 32M and extending towards and being exposed at a portion of the second end surface LS2 defining and functioning as a fourth surface portion. The third extension portion 32C is exposed at the first end surface LS1, and the fourth extension portion 32D is exposed at the second end surface LS2.

The shape of the second counter electrode portion 32M is not particularly limited, but is preferably rectangular or substantially rectangular, for example. However, the corners of the rectangular or substantially rectangular shape may be rounded, or the corners of the rectangular or substantially rectangular shape may be provided obliquely. The shapes of the third extension portion 32C and the fourth extension portion 32D are not particularly limited, or but are preferably rectangular substantially rectangular, for example. However, the corners of the rectangular or substantially rectangular shape may be rounded, or the corners of the rectangular or substantially rectangular shape may be provided obliquely.

The dimension W2 of the third extension portion 32C in the width direction W is equal to or smaller than the dimension W1 of the second counter electrode portion 32M in the width direction W. The dimension W2 of the fourth extension portion 32D in the width direction W is equal to or smaller than the dimension W1 of the second counter electrode portion 32M in the width direction W. In the present preferred embodiment, the dimension W2 of the third extension portion 32C in the width direction W is smaller than the dimension W1 of the second counter electrode portion 32M in the width direction W. The dimension W2 of the fourth extension portion 32D in the width direction W is smaller than the dimension W1 of the second counter electrode portion 32M in the width direction W. That is, when the extending direction of the third extension portion 32C (the direction from the second end surface LS2 toward the first end surface LS1) is defined as the third extending direction, the length W2 of the third extension portion 32C in the direction orthogonal or substantially orthogonal to the third extending direction (the width direction W) is smaller than the length W1 of the second counter electrode portion 32M in the direction orthogonal or substantially orthogonal to the third extending direction (the width direction W). When the extending direction of the fourth extension portion 32D (the direction from the first end surface LS1 toward the second end surface LS2) is defined as the fourth extending direction, the length W2 of the fourth extension portion 32D in the direction orthogonal or substantially orthogonal to the fourth extending direction (the width direction W) is smaller than the length W1 of the second counter electrode portion 32M in the orthogonal or substantially orthogonal to the fourth extending direction (the width direction W). The length W2 is preferably, for example, about 90% or less of the length W1. The length W2 is more preferably, for example, about 5% or more and about 90% or less of the length W1.

The second counter electrode portion 32M preferably includes a second central region 32MM including a central portion of the second counter electrode portion 32M, a third connection region 32MC connected to the third extension portion 32C, and a fourth connection region 32MD connected to the fourth extension portion 32D. The third connection region 32MC has a higher coverage with respect to the dielectric layer 20 than the second central region 32MM. The fourth connection region 32MD has a higher coverage with respect to the dielectric layer 20 than the second central region 32MM.

The length of the third connection region 32MC in the length direction L is defined as, for example, about 5% of the length L1 of the second counter electrode portion 32M in the length direction L. The length of the third connection region 32MC in the width direction W is defined to be the same or substantially the same as the length W2 of the third extension portion 32C in the width direction W. The length of the fourth connection region 32MD in the length direction L is defined as, for example, about 5% of the length L1 of the second counter electrode portion 32M in the length direction L. The length of the fourth connection region 32MD in the width direction W is defined to be the same or substantially the same as the length W2 of the fourth extension portion 32D in the width direction W.

The coverage of the third connection region 32MC and the fourth connection region 32MD with respect to the dielectric layer 20 is preferably higher than the coverage of the second central region 32MM with respect to the dielectric layer 20. The coverage of the third extension portion 32C and the fourth extension portion 32D with respect to the dielectric layer 20 is preferably higher than the coverage of the second central region 32MM with respect to the dielectric layer 20.

That is, when the coverage of the second central region 32MM with respect to the dielectric layer 20 is defined as D, the coverage of the third connection region 32MC and the fourth connection region 32MD with respect to the dielectric layer 20 is defined as E, and the coverage of the third extension portion 32C and the fourth extension portion 32D with respect to the dielectric layer 20 is defined as F, the relationship preferably satisfies D<E and D<F.

With such a configuration, since the metal ratio of the third connection region 32MC and the fourth connection region 32MD of the second internal electrode layer 32, and the metal ratio of the third extension portion 32C and the fourth extension portion 32D are increased, it is possible to increase the area of the current path connecting the second internal electrode layer 32, and a third external electrode 40C and a fourth external electrode 40D, which will be described later, of the external electrodes 40. As a result, since the resistance of the second internal electrode layer 32 becomes low, it is possible to reduce or prevent an increase in the DC resistance (Rdc), and it is possible to maintain and improve the characteristics of the multilayer ceramic capacitor 1. Furthermore, since it is possible to reduce or prevent the division of the second internal electrode layer 32 into a plurality of pieces, it is possible to reduce or prevent a decrease in the connectivity between the second internal electrode layer 32, and the third external electrode 40C and the fourth external electrode 40D.

Thus, by providing the third connection region 32MC and the fourth connection region 32MD and making the coverage E of the third connection region 32MC and the fourth connection region 32MD with respect to the dielectric layer 20 larger than the coverage D of the second central region 32MM with respect to the dielectric layer 20, the metal ratio of the second internal electrode layer 32 is increased not only in the third extension portion 32C and the fourth extension portion 32D, but also in the third connection region 32MC and the fourth connection region 32MD. With such a configuration, since it is possible to increase the area of the current path, it possible to is reduce the resistance correspondingly, and thus it is possible to reduce the resistance of the entire second internal electrode layer 32. As a result, it is possible to further improve the advantageous effect of reducing or preventing an increase in DC resistance (Rdc).

Here, in the present preferred embodiment, the reason why the coverage D of the second central region 32MM is not equal to the coverage E of the third connection region 32MC and the fourth connection region 32MD or the coverage F of the third extension portion 32C and the fourth extension portion 32D will be described. In a case in which the coverage D of the second central region 32MM is increased and is equal to or greater than the coverage E of the third connection region 32MC and the fourth connection region 32MD or the coverage F of the third extension portion 32C and the fourth extension portion 32D, although it is possible to ensure the capacitance, a portion where the dielectric layer 20 is exposed on the surface of the second internal electrode layer 32 may be reduced. In this case, the contact point between the dielectric layers 20 and the other dielectric layers 20 to be laminated on the second internal electrode layers 32 is reduced, the adhesion strength is reduced, and there is a concern that delamination may occur. For example, when the coverage of the internal electrode layer with respect to the dielectric layer is 100%, delamination may be more likely to occur than when the coverage of the internal electrode layer with respect to the dielectric layer is low. In the present preferred embodiment, by making the coverage D of the second central region 32MM lower than the coverage E of the third connection region 32MC and the fourth connection region 32MD and the coverage F of the third extension portion 32C and the fourth extension portion 32D, it is possible to ensure a portion where the dielectric layer 20 is exposed on the surface of the second internal electrode layer 32, and it is possible to increase the contact point between the dielectric layers 20 and the other dielectric layers 20 to be laminated on the second internal electrode layers 32. As a result, it is possible to ensure adhesion, and it is possible to reduce or prevent delamination. According to the present preferred embodiment, it is possible to achieve both a reduction or prevention of increase of the DC resistance (Rdc) of the second internal electrode layer 32 and the reduction or prevention of the delamination. That is, according to the multilayer ceramic capacitor 1 of the present preferred embodiment, an anchor effect is generated between the dielectric layers and the internal electrode layers, and thus, it is possible to increase the adhesion strength between the dielectric layers and the internal electrode layers. As a result, it is possible to reduce or prevent intrusion of moisture or the like into the multilayer body, and thus, it is possible to reduce or prevent a decrease in moisture resistance of the multilayer ceramic capacitor 1. Therefore, it is possible to improve the reliability of the multilayer ceramic capacitor 1 while reducing or preventing an increase in the DC resistance (Rdc) of the second internal electrode layer 32.

The coverage E of the third connection region 32MC and the fourth connection region 32MD with respect to the dielectric layer 20 is preferably, for example, about 72% or more. The coverage F of the third extension portion 32C and the second extension portion 32D with respect to the dielectric layer 20 is preferably, for example, 72% or more. The coverage D of the second central region 32MM with respect to the dielectric layer 20 is preferably lower than the coverage E and the coverage F, and is preferably, for example, about 52% or more. The coverage E and the coverage F may be high at, for example, about 5% or more than the coverage D.

Furthermore, the first internal electrode layers 31 may be each used as a ground electrode in a multilayer feedthrough ceramic capacitor. The second internal electrode layers 32 may be each used as a through electrode in the multilayer feedthrough ceramic capacitor.

The first internal electrode layers 31 and the second internal electrode layers 32 are each made of an appropriate electrically conductive material such as a metal such as, for example, Ni, Cu, Ag, Pd, or Au, or an alloy including at least one of these metals. When an alloy is used, the first internal electrode layers 31 and the second internal electrode layers 32 may be each made of, for example, an Ag—Pd alloy.

The total number of the first internal electrode layers 31 and the second internal electrode layers 32 is preferably equal to or greater than 14 and equal to or less than 1000, for example. The number of the first internal electrode layers 31 is not particularly limited, but is preferably, for example, 7 or more and 500 or less. The number of the second internal electrode layers 32 is not particularly limited, but is preferably, for example, 7 or more and 500 or less.

The thicknesses of the first counter electrode portion 31M of the first internal electrode layer 31 and the second counter electrode portion 32M of the second internal electrode layer 32 are not particularly limited, but are preferably, for example, about 0.25 μm or more and about 0.60 μm or less. In the present preferred embodiment, particularly high advantageous effects are achieved in regions each having a thickness of, for example, about 0.4 μm or less.

The thicknesses of the first extension portion 31A and the second extension portion 31B of the first internal electrode layer 31 and the thicknesses of the third extension portion 32C and the fourth extension portion 32D of the second internal electrode layer 32 are not particularly limited, but are preferably, for example, about 0.25 μm or more and about 0.60 μm or less. In the present preferred embodiment, particularly high advantageous effects are achieved in regions each having a thickness of, for example, about 0.4 μm or less.

The first main surface-side outer layer portion 12 is positioned adjacent to the first main surface TS1 of the multilayer body 10. The first main surface-side outer layer portion 12 is an aggregate of a plurality of dielectric layers 20 positioned between the first main surface TS1 and the internal electrode layer 30 closest to the first main surface TS1. The dielectric layer 20 used in the first main surface-side outer layer portion 12 may be the same or substantially the same as the dielectric layer 20 used in the inner layer portion 11.

The second main surface-side outer layer portion 13 is positioned adjacent to the second main surface TS2 of the multilayer body 10. The second main surface-side outer layer portion 13 is an aggregate of a plurality of dielectric layers 20 positioned between the second main surface TS2 and the internal electrode layer 30 closest to the second main surface TS2. The dielectric layer 20 used in the second main surface-side outer layer portion 13 may be the same or substantially the same as the dielectric layer 20 used in the inner layer portion 11.

As described above, the multilayer body 10 includes the plurality of laminated dielectric layers 20 and the plurality of internal electrode layers 30 laminated on the dielectric layers 20. That is, the multilayer ceramic capacitor 1 includes the multilayer body 10 in which the dielectric layers 20 and the internal electrode layers 30 are alternately laminated.

The multilayer body 10 includes a counter portion 11E. The counter portion 11E is a portion where the first counter electrode portion 31M of the first internal electrode layer 31 and the second counter electrode portion 32M of the second internal electrode layer 32 are opposed to each other. The counter portion 11E is provided as a portion of the inner layer portion 11. FIGS. 6 and 7 each show ranges of the counter portion 11E in the width direction W and the length direction L. The counter portion 11E is also referred to as a capacitor effective portion.

The multilayer body 10 includes a side surface-side outer layer portion. The side surface-side outer layer portion includes a first side surface-side outer layer portion WG1 positioned adjacent to the first side surface WS1 and a second side surface-side outer layer portion WG2 positioned adjacent to the second side surface WS2. The first side surface-side outer layer portion WG1 is a portion including the dielectric layer 20 and the first extension portion 31A positioned between the counter portion 11E and the first side surface WS1. That is, the first side surface-side outer layer portion WG1 is an aggregate of the portions of the plurality of dielectric layers 20 adjacent to the first side surface WS1 and the plurality of first extension portions 31A. The second side surface-side outer layer portion WG2 is a portion including the dielectric layer 20 and the second extension portion 31B positioned between the counter portion 11E and the second side surface WS2. That is, the second side surface-side outer layer portion WG2 is an aggregate of the portions of the plurality of dielectric layers 20 adjacent to the second side surface WS2 and the plurality of second extension portions 31B. FIGS. 5 to 7 each show ranges of the first side surface-side outer layer portion WG1 and the second side surface-side outer layer portion WG2 in the width direction W. In addition, the first side surface-side outer layer portion WG1 and the second side surface-side outer layer portion WG2 are each also referred to as a W gap or a side gap.

Furthermore, the multilayer body 10 includes an end surface-side outer layer portion. The end surface-side outer layer portion includes a first end surface-side outer layer portion LG1 positioned adjacent to the first end surface LS1 and a second end surface-side outer layer portion LG2 positioned adjacent to the second end surface LS2. The first end surface-side outer layer portion LG1 is a portion including the dielectric layer 20 and the third extension portion 32C positioned between the counter portion 11E and the first end surface LS1. That is, the first end surface-side outer layer portion LG1 is an aggregate of the portions of the plurality of dielectric layers 20 adjacent to the first end surface LS1 and the plurality of third extension portions 32C. The second end surface-side outer layer portion LG2 is a portion including the dielectric layer 20 and the fourth extension portion 32D positioned between the counter portion 11E and the second end surface LS2. That is, the second end surface-side outer layer portion LG2 is an aggregate of the portions of the plurality of dielectric layers 20 adjacent to the second end surface LS2 and the plurality of fourth extension portions 32D. FIG. 4, FIG. 6, and FIG. 7 each show ranges of the first end surface-side outer layer portion LG1 and the second end surface-side outer layer portion LG2 in the length direction L. In addition, the first end surface-side outer layer portion LG1 and the second end surface-side outer layer portion LG2 are each also referred to as an L gap or an end gap.

Figure 8A:
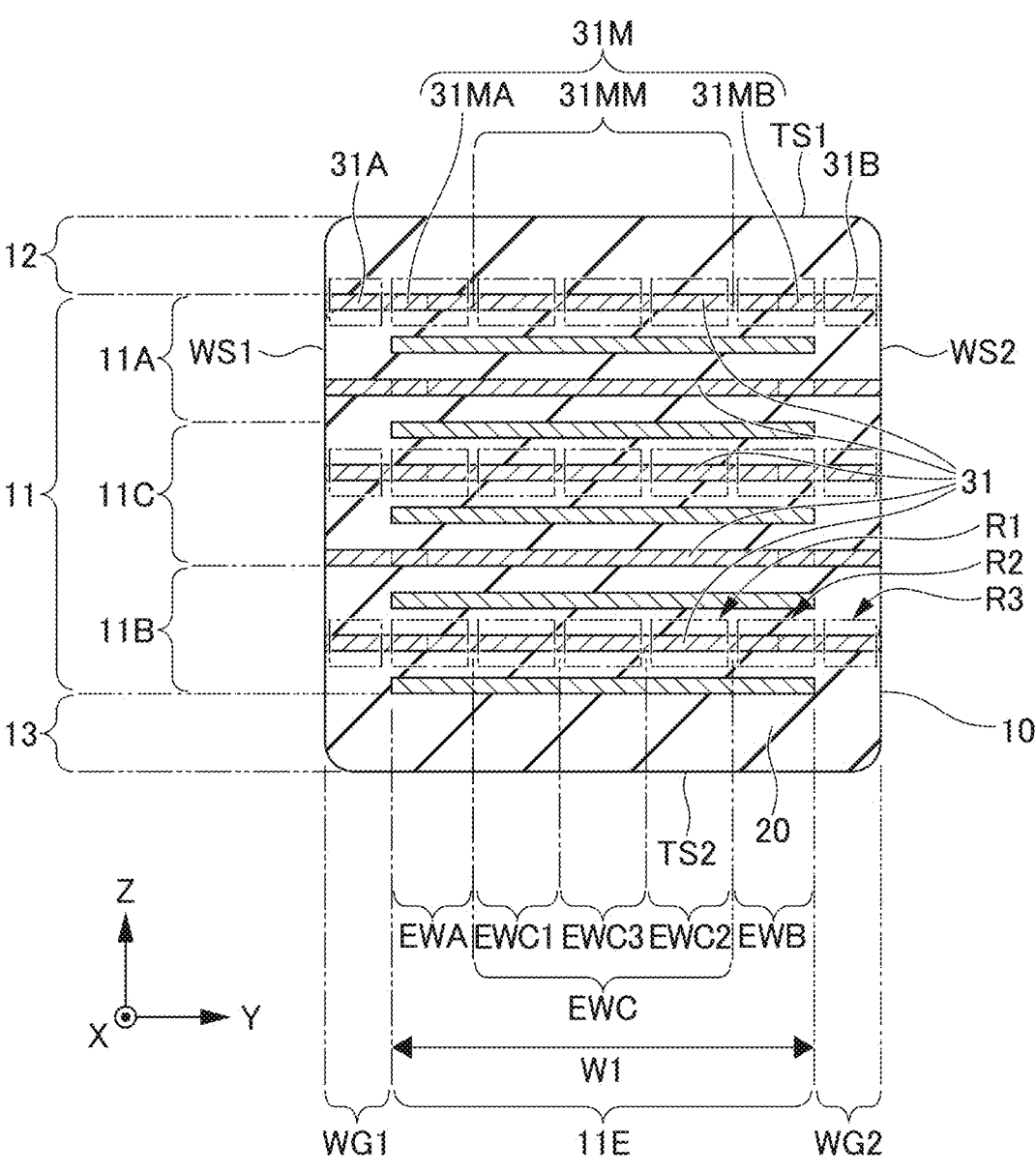
FIG. 8A is a diagram showing measurement positions of the coverage of the first internal electrode layers with respect to dielectric layers.
Figure 8B:
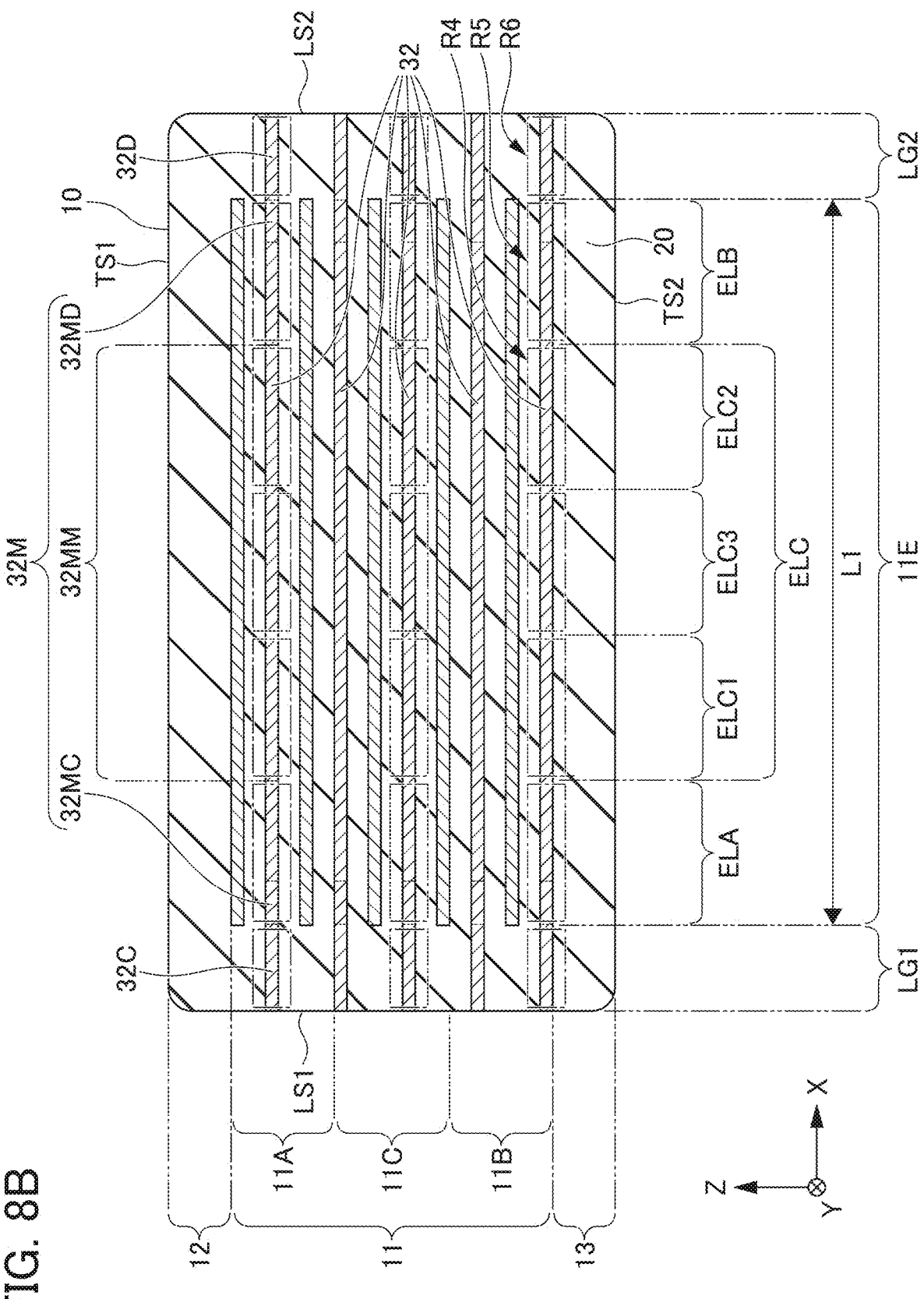
FIG. 8B is a diagram showing measurement positions of the coverage of the second internal electrode layers with respect to the dielectric layers.

Here, a non-limiting example of a method of measuring the coverage of the internal electrode layers 30 with respect to the dielectric layers 20 will be described. FIG. 8A is a diagram showing a measurement position of the coverage of the first internal electrode layers 31 with respect to the dielectric layers 20. FIG. 8B is a diagram showing a measurement position of the coverage of the second internal electrode layers 32 with respect to the dielectric layers 20.

First, a non-limiting example of a method of measuring the coverage at each portion of the first internal electrode layers 31 with respect to the dielectric layers 20 will be described. The coverage A of the first central region 31MM with respect to the dielectric layer 20, the coverage B of the first connection region 31MA and the second connection region 31MB with respect to the dielectric layer 20, and the coverage C of the first extension portion 31A and the second extension portion 31B with respect to the dielectric layer 20 are measured by the following method.

First, the multilayer ceramic capacitor 1 is polished from the first end surface LS1 or the second end surface LS2 to the position of about ½ of the dimension L to expose a specific cross section WT. The cross section WT is a cross section WT at the center in the length direction L of the multilayer ceramic capacitor 1.

Next, as shown in FIG. 8A, the cross section WT of the multilayer body 10 exposed by polishing is divided into a plurality of regions. In FIG. 8A, illustration of the external electrode 40 is omitted.

The region division in the lamination direction T will be described. The inner layer portion 11 is divided into the three regions of a first main surface-side region 11A, a second main surface-side region 11B, and an intermediate region 11C interposed therebetween, so as to be divided into three regions in the lamination direction T.

The region division in the width direction W will be described. First, the multilayer body 10 is divided into the three regions of a first side surface-side outer layer portion WG1, a second side surface-side outer layer portion WG2, and the counter portion 11E. Next, the counter portion 11E is divided into the five regions of a first side surface-side region EWA, a second side surface-side region EWB, and three regions EWC1, EWC2, and EWC3 interposed therebetween, so as to be divided into five regions in the width direction W.

Here, the first side surface-side outer layer portion WG1 is a portion including the first extension portion 31A. The second side surface-side outer layer portion WG2 is a portion including the second extension portion 31B. The first side surface-side region EWA is a portion including the first connection region 31MA of the first counter electrode portion 31M. The second side surface-side region EWB is a portion including the second connection region 31MB of the first counter electrode portion 31M. The central region EWC including the three regions EWC1, EWC2, and EWC3 defines the first central region 31MM of the first internal electrode layer 31. That is, the first central region 31MM of the first internal electrode layer 31 is a region centered on the central portion of the first counter electrode portion 31M in the width direction W, and is a region defined by a length of about 60% of the length W1 of the first counter electrode portion 31M in the width direction W.

Measurement Method of Coverage A of First Central Region 31MM with respect to Dielectric Layer 20

In the three regions EWC1, EWC2, and EWC3 of the multilayer body 10, an image of the cross section WT of the first internal electrode layer 31 in each of the first main surface-side region 11A, the second main surface-side region 11B, and the intermediate region 11C is observed by, for example, a scanning electron microscope (SEM) or a metallurgical microscope.

At this time, the observation range R1 is set such that an arbitrary ten first internal electrode layers 31 are specified in the nine observation regions. Then, the length La of the first internal electrode layer 31 in the width direction W (the length including the gap of the first internal electrode layer 31), which is the analysis target length of the first internal electrode layer 31 specified in the observation range R1, and the length Lb in the width direction W in which the first internal electrode layer 31 actually exists within the length of the analysis target (the length of the actual first internal electrode layer 31 excluding the gap) are measured, and the coverage of the first internal electrode layer 31 with respect to the dielectric layer 20 in the first central region 31MM is calculated by the following equation (1). The observation range is about 40 μm×about 40 μm, and the analysis target length is about 40 μm.

$$\text{Coverage (\%)} = (\text{length } Lb/\text{length } La) \times 100 \qquad (1)$$

Finally, the average value of the coverages of 90 pieces of the first internal electrode layers 31 calculated in the nine observation regions is calculated as the coverage A of the first central region 31MM with respect to the dielectric layer 20 in the present preferred embodiment.

In FIG. 8A, only one first internal electrode layer 31 is shown within the observation range R1 in each observation region. However, in a case of the multilayer ceramic capacitor 1 in which a large number of internal electrode layers are laminated, ten or more first internal electrode layers 31 are observed in each observation range R1. However, for example, when the total number of the first internal electrode layers 31 laminated in the multilayer body 10 is less than 30, the number of the first internal electrode layers 31 observable in each observation range R1 may be less than 10. In this case, the coverage of all of the first internal electrode layers 31 observable in each observation region is measured, and the average value thereof is calculated as the coverage A. The same applies to the measurement of the coverage B and the coverage C described later. The same applies to the measurement of the coverage D, the coverage E, and the coverage F of the second internal electrode layer 32 described later with reference to FIG. 8B.

Measurement Method of Coverage B of First Connection Region 31MA and Second Connection Region 31MB with Respect to Dielectric Layer 20

The coverage of the first connection region 31MA with respect to the dielectric layer 20 is measured using the cross section WT at the center in the length direction L of the first extension portion 31A. The coverage of the second connection region 31MB with respect to the dielectric layer 20 is measured using the cross section WT at the center in the length direction L of the second extension portion 31B. As in the present preferred embodiment, when the first extension portion 31A and the second extension portion 31B are provided at the center in the length direction L of the multilayer ceramic capacitor 1, the coverage B of the first connection region 31MA and the second connection region 31MB with respect to the dielectric layer 20 is measured using the cross section WT used for calculating the coverage A of the first central region 31MM with respect to the dielectric layer 20. The same applies to the measurement of the coverage C described later.

In the first side surface-side region EWA, an image of the cross section WT of the first connection region 31MA in each of the first main surface-side region 11A, the second main surface-side region 11B, and the intermediate region 11C is observed by, for example a scanning electron microscope (SEM) or a metallurgical microscope. Here, the first connection region 31MA is defined by a position up to a length of about 5% of the length W1 of the first counter electrode portion 31M (the counter portion 11E) in the width direction W toward the center in the width direction W of the multilayer body 10 starting from the boundary between the first extension portion 31A and the first counter electrode portion 31M (the boundary between the first side surface-side outer layer portion WG1 and the counter portion 11E).

In the second side surface-side region EWB, an image of the cross section WT of the second connection region 31MB in each of the first main surface-side region 11A, the second main surface-side region 11B, and the intermediate region 11C is observed by, for example, a scanning electron microscope (SEM) or a metallurgical microscope. Here, the second connection region 31MB is defined by a position up to a length of about 5% of the length W1 of the first counter electrode portion 31M (the counter portion 11E) in the width direction W toward the center side in the width direction W of the multilayer body 10 starting from the boundary between the second extension portion 31B and the first counter electrode portion 31M (the boundary between the second side surface-side outer layer portion WG2 and the counter portion 11E).

At this time, the observation range R2 is set such that an arbitrary ten first internal electrode layers 31 are specified within the six observation regions. Then, the length La of the first internal electrode layer 31 in the width direction W (the length including the gap of the first internal electrode layer 31), which is the analysis target length of the first internal electrode layer 31 specified in the observation range R2, and the length Lb of the first internal electrode layer 31 in the width direction W in which the first internal electrode layer 31 actually exists in the length of the analysis target (the length of the actual first internal electrode layer 31 excluding the gap) are measured, and the coverage of the first internal electrode layer 31 with respect to the dielectric layer 20 in the first connection region 31MA and the second connection region 31MB is calculated by the following equation (1). The observation range is about 40 μm×about 40 μm. When the lengths of the first connection region 31MA and the second connection region 31MB are about 40 μm or more, the analysis target length is about 40 μm. When the lengths of the first connection region 31MA and the second connection region 31MB are less than about 40 μm, the entire lengths of the first connection region 31MA and the second connection region 31MB are set as the analysis target lengths.

$$\text{Coverage (\%)} = (\text{length } Lb/\text{length } La) \times 100 \qquad (1)$$

Finally, the average value of the coverages of 60 pieces of the first internal electrode layers 31 calculated in the six observation regions is calculated as the coverage B of the first connection region 31MA and the second connection region 31MB with respect to the dielectric layer 20 in the present preferred embodiment.

Measurement Method of Coverage C of First Extension Portion 31A and Second Extension Portion 31B with Respect to Dielectric Layer 20

In the first side surface-side outer layer portion WG1, an image of the cross section WT of the first extension portion 31A in each of the first main surface-side region 11A, the second main surface-side region 11B, and the intermediate region 11C is observed by, for example, a scanning electron microscope (SEM) or a metallurgical microscope.

In the second side surface-side outer layer portion WG2, an image of the cross section WT of the second extension portion 31B in each of the first main surface-side region 11A, the second main surface-side region 11B, and the intermediate region 11C is observed by, for example, a scanning electron microscope (SEM) or a metallurgical microscope.

At this time, the observation range R3 is set such that an arbitrary ten first internal electrode layers 31 are specified in the six observation regions. Then, the length La of the first internal electrode layer 31 in the width direction W (the length including the gaps of the first internal electrode layer 31), which is the analysis target length of the first internal electrode layer 31 specified in the observation range R3, and the length Lb of the first internal electrode layer 31 in the width direction W in which the first internal electrode layer 31 actually exists in the length of the analysis target (the length of the actual first internal electrode layer 31 excluding the gaps) are measured, and the coverage of the first internal electrode layer 31 with respect to the dielectric layer 20 in the first extension portion 31A and the second extension portion 31B is calculated by the following equation (1). The observation range is about 40 μm×about 40 μm. When the lengths of the first extension portion 31A and the second extension portion 31B are about 40 μm or more, the length of the analysis target is about 40 μm. When the lengths of the first extension portion 31A and the second extension portion 31B are less than about 40 μm, the entire lengths of the first extension portion 31A and the second extension portion 31B are set as the analysis target lengths.

$$\text{Coverage (\%)} = (\text{length } Lb/\text{length } La) \times 100 \tag{1}$$

Finally, the average value of the coverages of 60 pieces of the first internal electrode layers 31 calculated in the six observation regions is calculated as the coverage C of the first extension portion 31A and the second extension portion 31B with respect to the dielectric layer 20 in the present preferred embodiment.

Next, a non-limiting example of a measurement method of the coverage at each portion of the second internal electrode layer 32 with respect to the dielectric layer 20 will be described. The coverage D of the second central region 32MM with respect to the dielectric layer 20, the coverage E of the third connection region 32MC and the fourth connection region 32MD with respect to the dielectric layer 20, and the coverage F of the third extension portion 32C and the fourth extension portion 32D with respect to the dielectric layer 20 are measured by the following methods.

First, the multilayer ceramic capacitor 1 is polished from the first side surface WS1 or the second side surface WS2 to a position of about ½ of the dimension L to expose a specific cross section LT. The cross section LT is a cross section LT at the center of the multilayer ceramic capacitor 1 in the width direction W.

Next, as shown in FIG. 8B, the cross section LT of the multilayer body 10 exposed by polishing is divided into a plurality of regions. In FIG. 8B, illustration of the external electrode 40 is omitted.

The region division in the lamination direction T will be described. The inner layer portion 11 is divided into the three regions of a first main surface-side region 11A, a second main surface-side region 11B, and an intermediate region 11C interposed therebetween, so as to be divided into three regions in the lamination direction T.

The region division in the length direction L will be described. First, the multilayer body 10 is divided into the three regions of a first end surface-side outer layer portion LG1, a second end surface-side outer layer portion LG2, and the counter portion 11E. Next, the counter portion 11E is divided into five regions, i.e., a first end surface-side region ELA, a second end surface-side region ELB, and three regions ELC1, ELC2, and ELC3 interposed therebetween, so as to be divided into five regions in the length direction L.

Here, the first end surface-side outer layer portion LG1 is a portion including the third extension portion 32C. The second end surface-side outer layer portion LG2 is a portion including the fourth extension portion 32D. The first end surface-side region ELA is a portion including the third connection region 32MC of the second counter electrode portion 32M. The second end surface-side region ELB is a portion including the fourth connection region 32MD of the second counter electrode portion 32M. The central region ELC including the three regions ELC1, ELC2, and ELC3 defines the second central region 32MM of the second internal electrode layer 32. That is, the second central region 32MM of the second internal electrode layer 32 is a region centered on the central portion in the length direction L of the second counter electrode portion 32M, and is a region defined by a length about 60% of the length L1 in the length direction L of the second counter electrode portion 32M.

Measurement Method of Coverage D of Second Central Region 32MM with Respect to Dielectric Layer 20

In the three regions ELC1, ELC2, and ELC3 of the multilayer body 10, an image of the cross section LT of the second internal electrode layer 32 in each of the first main surface-side region 11A, the second main surface-side region 11B, and the intermediate region 11C is observed by, for example, a scanning electron microscope (SEM) or a metallurgical microscope.

At this time, the observation range R4 is set such that an arbitrary ten second internal electrode layers 32 are specified in the nine observation regions. Then, the length La of the second internal electrode layer 32 in the length direction L (the length including the gap of the second internal electrode layer 32), which is the analysis target length of the second internal electrode layer 32 specified within the observation range R4, and the length Lb of the second internal electrode layer 32 in the length direction L in which the second internal electrode layer 32 actually exists within the length of the analysis target (the length of the actual second internal electrode layer 32 excluding the gap) are measured, and the coverage of the second internal electrode layer 32 with respect to the dielectric layer 20 in the second central region 32MM is calculated by the following equation (1). The observation range is about 40 μm×about 40 μm, and the analysis target length is about 40 μm.

$$\text{Coverage (\%)} = (\text{length } Lb/\text{length } La) \times 100 \tag{1}$$

Finally, the average value of the coverages of 90 pieces of the second internal electrode layers 32 calculated in the nine observation regions is calculated as the coverage D of the second central region 32MM with respect to the dielectric layer 20 in the present preferred embodiment.

Measurement Method of Coverage E of Third Connection Region 32MC and Fourth Connection Region 32MD with Respect to Dielectric Layer 20

The coverage of the third connection region 32MC with respect to the dielectric layer 20 is measured using the cross section LT at the center of the third extension portion 32C in the width direction W. The coverage of the fourth connection region 32MD with respect to the dielectric layer 20 is measured using the cross section LT at the center of the fourth extension portion 32D in the width direction W. As in the present preferred embodiment, when the third extension portion 32C and the fourth extension portion 32D are provided at the center of the multilayer ceramic capacitor 1 in the width direction W, the coverage E of the third connection region 32MC and the fourth connection region 32MD with respect to the dielectric layer 20 is measured using the cross section LT used for calculating the coverage D of the second central region 32MM with respect to the dielectric layer 20. The same applies to the measurement of the coverage F described later.

In the first end surface-side region ELA, an image of the cross section LT of the third connection region 32MC in each of the first main surface-side region 11A, the second main surface-side region 11B, and the intermediate region 11C is observed by, for example, a scanning electron microscope (SEM) or a metallurgical microscope. Here, the third connection region 32MC is defined by a position up to a length of about 5% of the length L1 of the second counter electrode portion 32M (the counter portion 11E) in the length direction L toward the center in the length direction L of the multilayer body 10 starting from the boundary between the third extension portion 32C and the second counter electrode portion 32M (the boundary between the first end surface-side outer layer portion LG1 and the counter portion 11E).

In the second end surface-side region ELB, an image of the cross section LT of the fourth connection region 32MD in each of the first main surface-side region 11A, the second main surface-side region 11B, and the intermediate region 11C is observed by, for example, a scanning electron microscope (SEM) or a metallurgical microscope. Here, the fourth connection region 32MD is defined by a position up to a length of about 5% of the length L1 of the second counter electrode portion 32M (the counter portion 11E) in the length direction L toward the center in the length direction L of the multilayer body 10 starting from the boundary between the fourth extension portion 32D and the second counter electrode portion 32M (the boundary between the second end surface-side outer layer portion LG2 and the counter portion 11E).

At this time, the observation range R5 is set such that an arbitrary ten second internal electrode layers 32 are specified in the six observation regions. Then, the length La of the second internal electrode layer 32 in the length direction L (the length including the gaps of the second internal electrode layer 32), which is the analysis target length of the second internal electrode layer 32 specified within the observation range R5, and the length Lb of the length direction L in which the second internal electrode layer 32 actually exists within the length of the analysis target (the length of the actual second internal electrode layer 32 in which the gaps are omitted) are measured, and the coverage of the second internal electrode layer 32 with respect to the dielectric layer 20 in the third connection region 32MC and the fourth connection region 32MD is calculated by the following equation (1). The observation range is about 40 μm×about 40 μm. When the lengths of the third connection region 32MC and the fourth connection region 32MD are about 40 μm or more, the length of the analysis target is about 40 μm. When the lengths of the third connection region 32MC and the fourth connection region 32MD are less than about 40 μm, the entire lengths of the third connection region 32MC and the fourth connection region 32MD are set as the target analysis lengths.

$$\text{Coverage (\%)} = (\text{length } Lb/\text{length } La) \times 100 \tag{1}$$

Finally, the average value of the coverages of 60 pieces of the second internal electrode layers 32 calculated in the six observation regions is calculated as the coverage E of the third connection region 32MC and the fourth connection region 32MD with respect to the dielectric layer 20 in the present preferred embodiment.

Measurement Method of Coverage F of Third Extension Portion 32C and Fourth Extension Portion 32D with Respect to Dielectric Layer 20

In the first end surface-side outer layer portion LG1, an image of the cross section LT of the third extension portion 32C in each of the first main surface-side region 11A, the second main surface-side region 11B, and the intermediate region 11C is observed by, for example, a scanning electron microscope (SEM) or a metallurgical microscope.

In the second end surface side outer layer portion LG2, an image of the cross section LT of the fourth extension portion 32D in each of the first main surface-side region 11A, the second main surface-side region 11B, and the intermediate region 11C is observed by, for example, a scanning electron microscope (SEM) or a metallurgical microscope.

At this time, the observation range R6 is set such that arbitrary ten second internal electrode layers 32 are specified in the six observation regions. Then, the length La of the second internal electrode layer 32 in the length direction L (the length including the gaps of the second internal electrode layer 32), which is the analysis target length of the second internal electrode layer 32 specified within the observation range R6 and the length Lb of the length direction L in which the second internal electrode layer 32 actually exists within the length of the analysis target (the length of the actual second internal electrode layer 32 excluding the gaps) are measured, and the coverage of the second internal electrode layer 32 with respect to the dielectric layer 20 in the third extension portion 32C and the fourth extension portion 32D is calculated by the following equation (1). The observation range is about 40 μm×about 40 μm. When the lengths of the third extension portion 32C and the fourth extension portion 32D are about 40 μm or more, the length of the analysis target is about 40 μm. When the lengths of the third extension portion 32C and the fourth extension portion 32D are less than about 40 μm, the entire lengths of the third extension portion 32C and the fourth extension portion 32D are set as the analysis target lengths.

$$\text{Coverage (\%)} = (\text{length } Lb/\text{length } La) \times 100 \tag{1}$$

Finally, the average value of the coverages of 60 pieces of the second internal electrode layers 32 calculated in the six observation regions is calculated as the coverage F of the third extension portion 32C and the fourth extension portion 32D with respect to the dielectric layer 20 in the present preferred embodiment.

The external electrode 40 includes three or more external electrodes. In a preferred embodiment of the present invention, the external electrode 40 includes a first external electrode 40A connected to the first extension portion 31A, a second external electrode 40B connected to the second extension portion 31B, a third external electrode 40C connected to the third extension portion 32C, and a fourth external electrode 40D connected to the fourth extension portion 32D.

The first external electrode 40A is provided on the first side surface WS1. The first external electrode 40A is connected to the first extension portion 31A of the first internal electrode layer 31. The first external electrode 40A may also be provided on a portion of the first main surface TS1 and a portion of the second main surface TS2. In the present preferred embodiment, the first external electrode 40A extends from the first side surface WS1 to a portion of the first main surface TS1 and a portion of the second main surface TS2.

The second external electrode 40B is provided on the second side surface WS2. The second external electrode 40B is connected to the second extension portion 31B of the first internal electrode layer 31. The second external electrode 40B may also be provided on a portion of the first main surface TS1 and a portion of the second main surface TS2. In the present preferred embodiment, the second external electrode 40B extends from the second side surface WS2 to a portion of the first main surface TS1 and a portion of the second main surface TS2.

The third external electrode 40C is provided on the first end surface LS1. The third external electrode 40C is connected to the third extension portion 32C of the second internal electrode layer 32. The third external electrode 40C may also be provided on a portion of the first main surface TS1 and a portion of the second main surface TS2, and also on a portion of the first side surface WS1 and a portion of the second side surface WS2. In the present preferred embodiment, the third external electrode 40C extends from the first end surface LS1 to a portion of the first main surface TS1 and a portion of the second main surface TS2, and to a portion of the first side surface WS1 and a portion of the second side surface WS2.

The fourth external electrode 40D is provided on the second end surface LS2. The fourth external electrode 40D is connected to the fourth extension portion 32D of the second internal electrode layer 32. The fourth external electrode 40D may also be provided on a portion of the first main surface TS1 and a portion of the second main surface TS2, and also on a portion of the first side surface WS1 and a portion of the second side surface WS2. In the present preferred embodiment, the fourth external electrode 40D extends from the second end surface LS2 to a portion of the first main surface TS1 and a portion of the second main surface TS2, and to a portion of the first side surface WS1 and a portion of the second side surface WS2.

The first external electrode 40A includes a first base electrode layer 50A and a first plated layer 60A provided on the first base electrode layer 50A.

The second external electrode 40B includes a second base electrode layer 50B and a second plated layer 60B provided on the second base electrode layer 50B.

The third external electrode 40C includes a third base electrode layer 50C and a third plated layer 60C provided on the third base electrode layer 50C.

The fourth external electrode 40D includes a fourth base electrode layer 50D and a fourth plated layer 60D provided on the fourth base electrode layer 50D.

The first base electrode layer 50A is provided on the surface of the first side surface WS1 of the multilayer body 10, and extends from the first side surface WS1 to cover a portion of each of the first main surface TS1 and the second main surface TS2. The first base electrode layer 50A is connected to the first extension portion 31A of the first internal electrode layer 31. The first base electrode layer 50A may be provided only on the surface of the first side surface WS1 of the multilayer body 10.

The second base electrode layer 50B is provided on the surface of the second side surface WS2 of the multilayer body 10, and extends from the second side surface WS2 to cover a portion of each of the first main surface TS1 and the second main surface TS2. The second base electrode layer 50B is connected to the second extension portion 31B of the first internal electrode layer 31. The second base electrode layer 50B may be provided only on the surface of the second side surface WS2 of the multilayer body 10.

The third base electrode layer 50C is provided on the surface of the first end surface LS1 of the multilayer body 10, and extends from the first end surface LS1 to cover a portion of each of the first main surface TS1, the second main surface TS2, the first side surface WS1, and the second side surface WS2. The third base electrode layer 50C is connected to the third extension portion 32C of the second internal electrode layer 32. The third base electrode layer 50C may be provided only on the surface of the first end surface LS1 of the multilayer body 10.

The fourth base electrode layer 50D is provided on the surface of the second end surface LS2 of the multilayer body 10, and extends from the second end surface LS2 to cover a portion of each of the first main surface TS1, the second main surface TS2, the first side surface WS1, and the second side surface WS2. The fourth base electrode layer 50D is connected to the fourth extension portion 32D of the second internal electrode layer 32. The fourth base electrode layer 50D may be provided only on the surface of the second end surface LS2 of the multilayer body 10.

The first base electrode layer 50A, the second base electrode layer 50B, the third base electrode layer 50C, and the fourth base electrode layer 50D (hereinafter collectively referred to as base electrode layers) of the preferred embodiment are fired layers. The fired layer preferably includes, for example, a metal component and either or both of a glass component and a ceramic component. The metal component includes, for example, at least one selected from Cu, Ni, Ag, Pd, Ag—Pd alloy, Au, and the like. The glass component includes, for example, at least one selected from B, Si, Ba, Mg, Al, Li, and the like. The ceramic component may be a ceramic material of the same type as the dielectric layer 20 or a ceramic material of a different type. The ceramic component includes, for example, at least one selected from $BaTiO_3$, $CaTiO_3$, $(Ba, Ca)TiO_3$, $SrTiO_3$, $CaZrO_3$, and the like.

The fired layer is obtained, for example, by coating a multilayer body with an electrically conductive paste including glass and metal, and firing the resultant product. The fired layer may be obtained by simultaneously firing a laminated chip including internal electrodes and dielectric layers and an electrically conductive paste applied to the laminated chip, or may be obtained by applying an electrically conductive paste to a multilayer body after firing a laminated chip having internal electrodes and dielectric layers to obtain the multilayer body. When the laminated chip including the internal electrode and the dielectric layer and the electrically conductive paste applied to the laminated chip are fired at the same time, the fired layer is preferably obtained by adding a ceramic material instead of a glass component. In this case, it is particularly preferable to use the same kind of ceramic material as the dielectric layer 20 as the ceramic material to be added. The fired layer may include a plurality of layers.

The thickness in the width direction of the first base electrode layer 50A positioned at the first side surface WS1 is preferably, for example, about 3 μm or more and about 70 μm or less at the center or approximate center of the first base electrode layer 50A in the lamination direction T and the length direction L.

The thickness in the width direction of the second base electrode layer 50B positioned at the second side surface WS2 is preferably, for example, about 3 μm or more and about 70 μm or less at the center or approximate center of the second base electrode layer 50B in the lamination direction T and the length direction L.

In a case where the first base electrode layer 50A is provided on a portion of at least one of the first main surface TS1 or the second main surface TS2, the thickness of the first base electrode layer 50A provided on this portion in the lamination direction is preferably, for example, about 3 μm or more and about 70 μm or less at the center or approximate center of the first base electrode layer 50A in the length direction L and the width direction W provided on this portion.

In a case where the second base electrode layer 50B is provided on a portion of at least one of the first main surface TS1 or the second main surface TS2, the thickness of the second base electrode layer 50B provided on this portion in the lamination direction is preferably, for example, about 3 μm or more and about 70 μm or less at the center or approximate center of the second base electrode layer 50B in the length direction L and the width direction W provided on this portion.

The thickness of the third base electrode layer 50C positioned at the first end surface LS1 in the length direction is preferably, for example, about 3 μm or more and about 70

μm or less at the center or approximate center of the third base electrode layer 50C in the lamination direction T and the width direction W.

The thickness of the fourth base electrode layer 50D positioned at the second end surface LS2 in the length direction is preferably, for example, about 3 μm or more and about 70 μm or less at the center or approximate center of the fourth base electrode layer 50D in the lamination direction T and the width direction W.

In a case where the third base electrode layer 50C is provided also on a portion of at least one of the first main surface TS1 and the second main surface TS2, the thickness of the third base electrode layer 50C provided on this portion in the lamination direction is preferably, for example, about 3 μm or more and about 70 μm or less at the center or approximate center of the third base electrode layer 50C in the length direction L and the width direction W provided on this portion.

In a case where the third base electrode layer 50C is provided on a portion of at least one of the first side surface WS1 and the second side surface WS2, the thickness in the width direction of the third base electrode layer 50C provided on this portion in the width direction is preferably, for example, about 3 μm or more and about 70 μm or less at the center or approximate center of the third base electrode layer 50C in the length direction L and the lamination direction T provided on this portion.

In a case where the fourth base electrode layer 50D is provided also on a portion of at least one of the first main surface TS1 and the second main surface TS2, the thickness of the fourth base electrode layer 50D provided on this portion in the lamination direction is preferably, for example, about 3 μm or more and about 70 μm or less at the center or approximate center of the fourth base electrode layer 50D in the length direction L and the width direction W provided on this portion.

In a case where the fourth base electrode layer 50D is provided also on a portion of at least one of the first side surface WS1 and the second side surface WS2, the thickness in the width direction of the fourth base electrode layer 50D provided on this portion is preferably, for example, about 3 μm or more and about 70 μm or less at the center or approximate center of the fourth base electrode layer 50D in the length direction L and the lamination direction T provided on this portion.

In addition, the base electrode layer is not limited to a fired layer. The base electrode layer includes at least one selected from, for example, a fired layer, an electrically conductive resin layer, a thin film layer, and the like. For example, the base electrode layer may be a thin film layer. The thin film layer is formed by a thin film forming method such as, for example, a sputtering method or deposition method. The thin film layer is a layer including metal particles deposited thereon and having a thickness of about 1 μm or less.

The first plated layer 60A covers the first base electrode layer 50A.

The second plated layer 60B covers the second base electrode layer 50B.

The third plated layer 60C covers the third base electrode layer 50C.

The fourth plated layer 60D covers the fourth base electrode layer 50D.

The first plated layer 60A, the second plated layer 60B, the third plated layer 60C, and the fourth plated layer 60D (hereinafter collectively referred to as plated layers) may include, for example, at least one selected from Cu, Ni, Sn, Ag, Pd, Ag—Pd alloy, Au, and the like. Each plated layer may include a plurality of layers. The plated layer preferably has, for example, a two-layer structure in which a Sn plated layer is provided on a Ni plated layer.

The first plated layer 60A covers the first base electrode layer 50A. In a preferred embodiment of the present invention, the first plated layer 60A includes, for example, a first Ni plated layer 61A and a first Sn plated layer 62A located on the first Ni plated layer 61A.

The second plated layer 60B covers the second base electrode layer 50B. In a preferred embodiment of the present invention, the second plated layer 60B includes, for example, a second Ni plated layer 61B and a second Sn plated layer 62B located on the second Ni plated layer 61B.

The third plated layer 60C covers the third base electrode layer 50C. In a preferred embodiment of the present invention, the third plated layer 60C includes, for example, a third Ni plated layer 61C and a third Sn plated layer 62C located on the third Ni plated layer 61C.

The fourth plated layer 60D covers the fourth base electrode layer 50D. In a preferred embodiment of the present invention, the fourth plated layer 60D includes, for example, a fourth Ni plated layer 61D and a fourth Sn plated layer 62D located on the fourth Ni plated layer 61D.

The Ni plated layer prevents the base electrode layer from being eroded by solder when the multilayer ceramic capacitor 1 is mounted. Furthermore, the Sn plated layer improves wettability of solder when mounting the multilayer ceramic capacitor 1. This facilitates mounting of the multilayer ceramic capacitor 1. The thicknesses of the first Ni plated layer 61A, the first Sn plated layer 62A, the second Ni plated layer 61B, the second Sn plated layer 62B, the third Ni plated layer 61C, the third Sn plated layer 62C, the fourth Ni plated layer 61D, and the fourth Sn plated layer 62D are preferably, for example, about 2 μm or more and about 15 μm or less.

The external electrode 40 of the present preferred embodiment may include, for example, an electrically conductive resin layer containing electrically conductive particles and a thermosetting resin. When the electrically conductive resin layer is provided as the base electrode layer, the electrically conductive resin layer may cover the fired layer or may be provided directly on the multilayer body 10 without providing the fired layer. When the electrically conductive resin layer covers the fired layer, the electrically conductive resin layer is provided between the fired layer and the plated layer. The electrically conductive resin layer may completely cover the fired layer or may partially cover the fired layer.

The electrically conductive resin layer including a thermosetting resin is more flexible than, for example, an electrically conductive layer made of a plating film or a fired product of an electrically conductive paste. Therefore, even when a physical impact or an impact caused by a thermal cycle is applied to the multilayer ceramic capacitor 1, the electrically conductive resin layer defines and functions as a buffer layer. Accordingly, the electrically conductive resin layer reduces or prevents the generation of cracks in the multilayer ceramic capacitor 1.

The metal defining the electrically conductive particles may be, for example, Ag, Cu, Ni, Sn, Bi, or an alloy including them. The electrically conductive particles preferably include Ag, for example. The electrically conductive particles are metal powders of Ag, for example. Ag is suitable as an electrode material because of its lowest specific resistance among the metals. Since Ag is a noble metal, it hardly oxidizes and the weatherability is high. Therefore, the metal powder of Ag is suitable as electrically conductive particles.

Furthermore, the electrically conductive particles may be, for example, metal powder in which the surface of the metal powder is Ag-coated. When a metal powder coated with Ag is used, the metal powder is preferably, for example, Cu, Ni, Sn, Bi or an alloy powder thereof. In order to make the metal of the base material inexpensive while maintaining the Ag characteristics, it is preferable to use a Ag-coated metal powder.

Furthermore, the electrically conductive particles may be formed by, for example, subjecting Cu or Ni to an antioxidant treatment. Furthermore, the electrically conductive particles may be metal powder obtained by, for example, coating the surface of the metal powder with Sn, Ni, or Cu. When a metal powder coated with Sn, Ni, or Cu is used, the metal powder is preferably, for example, Ag, Cu, Ni, Sn, or Bi or an alloy powder thereof.

The shape of the electrically conductive particles is not particularly limited. The electrically conductive particles may have a spherical shape, a flat shape, or the like. It is preferable to use a mixture of spherical and flat metal powders.

The electrically conductive particles included in the electrically conductive resin layer mainly ensure the electric conductivity of the electrically conductive resin layer. Specifically, the plurality of electrically conductive particles are brought into contact with each other to provide an electric conductivity path inside the electrically conductive resin layer.

The resin of the electrically conductive resin layer may include, for example, at least one selected from various known thermosetting resins such as epoxy resin, phenol resin, urethane resin, silicone resin, and polyimide resin. Among them, epoxy resins excellent in heat resistance, moisture resistance, adhesiveness and the like are one of the most suitable resins. The resin of the electrically conductive resin layer preferably includes a curing agent together with the thermosetting resin. When an epoxy resin is used as the base resin, the curing agent of the epoxy resin may be any of various known compounds such as, for example phenolic, amine-based, acid anhydride-based, imidazole-based, active ester-based, and amideimide-based compounds.

The electrically conductive resin layer may include a plurality of layers. The thickness of the thickest portion of the electrically conductive resin layer is preferably, for example, about 10 μm or more and about 150 μm or less.

In addition, the plated layer may be directly provided on the multilayer body 10 without providing the base electrode layer. That is, the multilayer ceramic capacitor 1 may include a plated layer electrically connected directly to the first internal electrode layer 31 and the second internal electrode layer 32. In such a case, the plated layer may be formed after the catalyst is provided on the surface of the multilayer body 10 as a pretreatment.

Also in such a case, the plated layer preferably includes a plurality of layers. Each of the lower plated layer and the upper plated layer preferably includes, for example, at least one metal selected from Cu, Ni, Sn, Pb, Au, Ag, Pd, Bi, Zn, and the like, or an alloy including these metals. The lower plated layer is more preferably formed using Ni having solder barrier performance. The upper plated layer is more preferably formed using Sn or Au having good solder wettability. For example, when the first internal electrode layer 31 and the second internal electrode layer 32 are formed using Ni, the lower plated layer is preferably formed using Cu having good bonding property with Ni. The upper plated layer may be formed as necessary, and the external electrode 40 may include only the lower plated layer. The plated layer may be the outermost layer of the upper plated layer, or another plated layer may be further provided on the surface of the upper plated layer.

The thickness of one plated layer provided without providing the base electrode layer is preferably, for example, about 1 μm or more and about 15 μm or less. The plated layer preferably does not include glass. The proportion of metal per unit volume of the plated layer is preferably, for example, about 99% by volume or more.

When the plated layer is provided directly on the multilayer body 10, it is possible to reduce the thickness of the base electrode layer. Therefore, by reducing the thickness of the base electrode layer, it is possible to reduce the dimension of the multilayer ceramic capacitor 1 in the lamination direction T, thus reducing the height of the multilayer ceramic capacitor 1. Alternatively, by reducing the thickness of the base electrode layer, the thickness of the dielectric layer 20 sandwiched between the first internal electrode layer 31 and the second internal electrode layer 32 can be increased, such that it is possible to increase the thickness of the element body. By providing the plated layer directly on the multilayer body 10 in this manner, it is possible to improve the design freedom of the multilayer ceramic capacitor.

When the dimension in the length direction of the multilayer ceramic capacitor 1 including the multilayer body 10 and the external electrode 40 is defined as the dimension L, the dimension L is preferably, for example, about 1.0 mm or more and about 3.2 mm or less. When the dimension of the multilayer ceramic capacitor 1 in the lamination direction is defined as the dimension T, the dimension T is preferably, for example, about 0.3 mm or more and about 2.5 mm or less. When the dimension in the width direction of the multilayer ceramic capacitor 1 is defined as the dimension W, the dimension W is preferably, for example, about 0.5 mm or more and about 2.5 mm or less. The dimensions of the multilayer ceramic capacitor 1 can be measured by, for example, a microscope.

Figure 9:
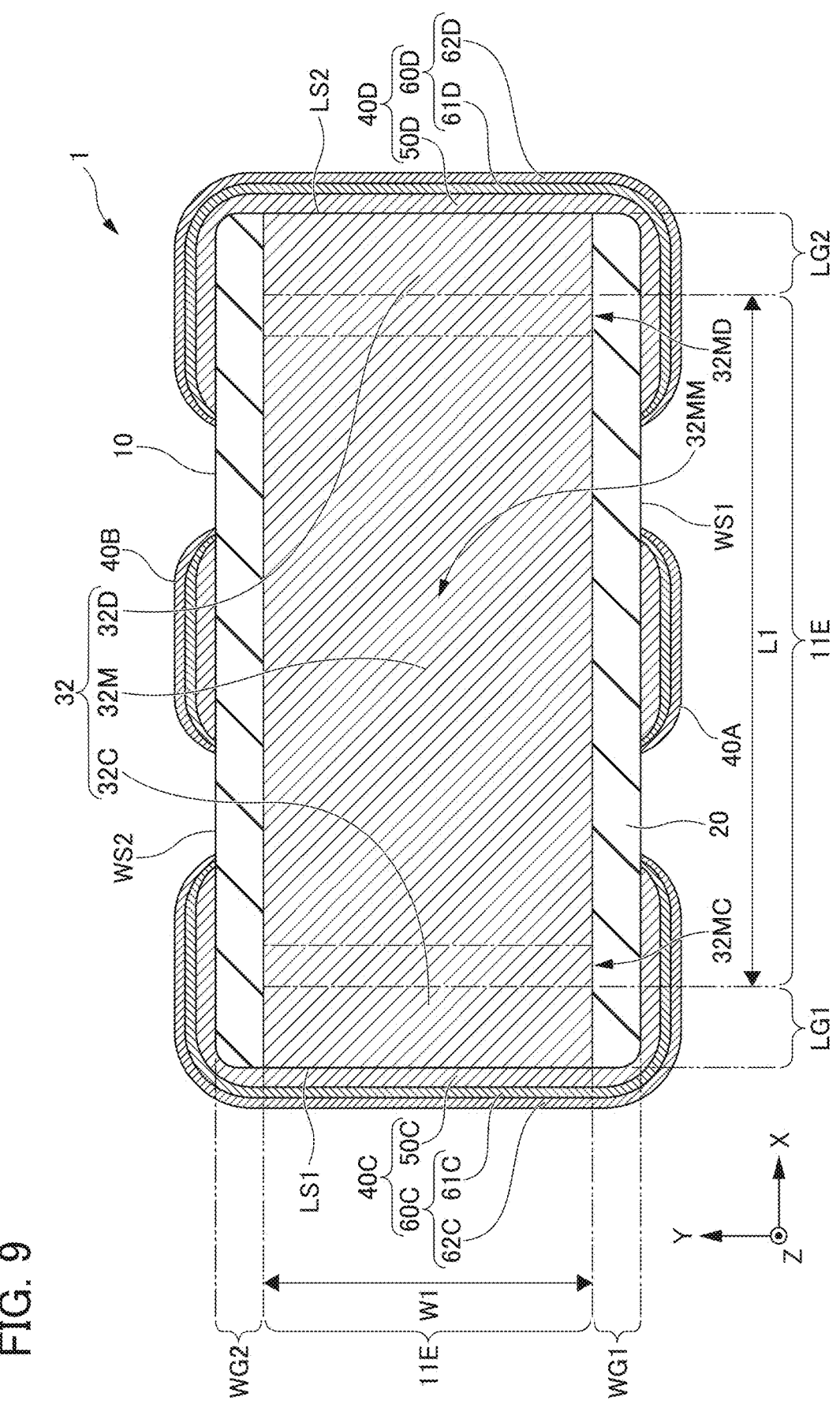
FIG. 9 is a cross-sectional view showing a modified example of a second internal electrode layers of a multilayer ceramic capacitor according to a preferred embodiment of the present invention, and corresponds to FIG. 7.

Hereinafter, a modified example of the multilayer ceramic capacitor 1 of the present preferred embodiment will be described. In the following description, the same or corresponding components as those in the first preferred embodiment are denoted by the same reference numerals, and a detailed description thereof is omitted. FIG. 9 is a cross-sectional view showing a modified example of the second internal electrode layer 32 of the multilayer ceramic capacitor 1 of the present preferred embodiment, and corresponds to FIG. 7.

In this modified example, the shape of the second internal electrode layer 32 is different from the shape of the second internal electrode layer 32 shown in FIG. 7. In this modified example, the dimension of the third extension portion 32C in the width direction W is the same or substantially the same as the dimension W1 of the second counter electrode portion 32M in the width direction W. The dimension of the fourth extension portion 32D in the width direction W is the same or substantially the same as the dimension W1 of the second counter electrode portion 32M in the width direction W.

Also in this modified example, the second counter electrode portion 32M preferably includes a second central region 32MM including the central portion of the second counter electrode portion 32M, a third connection region 32MC connected to the third extension portion 32C, and a fourth connection region 32MD connected to the fourth extension portion 32D. The third connection region 32MC preferably includes a region having a higher coverage with respect to the dielectric layer 20 than the second central region 32MM. The fourth connection region 32MD preferably includes a region having a higher coverage with respect to the dielectric layer 20 than the second central region 32MM.

The coverage of the third connection region 32MC and the fourth connection region 32MD with respect to the dielectric layer 20 is preferably higher than the coverage of the second central region 32MM with respect to the dielectric layer 20. The coverage of the third extension portion 32C and the fourth extension portion 32D with respect to the dielectric layer 20 is preferably higher than the coverage of the second central region 32MM with respect to the dielectric layer 20.

With such a configuration, it is possible to obtain the advantageous effects of the present preferred embodiment of the present invention.

Next, a non-limiting example of a method of manufacturing the multilayer ceramic capacitor 1 of the present preferred embodiment will be described.

A dielectric sheet for forming the dielectric layer 20 and an electrically conductive paste for forming the internal electrode layer 30 are provided. The dielectric sheet and the electrically conductive paste for forming internal electrodes include a binder and a solvent. A known binder and solvent may be used.

The configuration of the first internal electrode layer 31 including the first extension portion 31A, the second extension portion 31B, the first connection region 31MA, the second connection region 31MB, and the first central region 31MM of the present preferred embodiment is achieved by separately applying an electrically conductive paste for the internal electrode layer. Similarly, the configuration of the second internal electrode layer 32 including the third extension portion 32C, the fourth extension portion 32D, the third connection region 32MC, the fourth connection region 32MD, and the second central region 32MM of the present preferred embodiment is achieved by coating an electrically conductive paste for the internal electrode layer. Accordingly, an electrically conductive paste for forming each internal electrode layer 30 is provided.

Specifically, an electrically conductive paste A for forming the internal electrode is provided for use in the first extension portion 31A, the second extension portion 31B, the third extension portion 32C, the fourth extension portion 32D, the first connection region 31MA, the second connection region 31MB, the third connection region 32MC, and the fourth connection region 32MD. In addition, an electrically conductive paste B for forming the internal electrode is provided for use in the first counter electrode portion 31M including the first central region 31MM except for the portion serving as the first connection region 31MA and the second connection region 31MB, and the second counter electrode portion 32M including the second central region 32MM except for the portion defining and functioning as the third connection region 32MC and the fourth connection region 32MD.

Here, when the average particle size of the metal powder included in the electrically conductive paste A for forming the internal electrode is defined as D2, and the average particle size of the metal powder included in the electrically conductive paste B for forming the internal electrode is defined as D1, the relationship of D2<D1 is satisfied. As a result, in the region where the electrically conductive paste B for forming the internal electrode is applied, the average particle size of the metal powder is large, and when a particle defect occurs, the thickness of the internal electrode layer in the region becomes very thin. Accordingly, the portion tends to become a defect portion during firing, and the coverage of the internal electrode layer in the region where the electrically conductive paste B for forming the internal electrode is applied becomes low. On the other hand, in the region where the electrically conductive paste A for forming the internal electrode is applied, the average particle size of the metal powder is small, and when a particle defect occurs, the influence on the thickness of the internal electrode layer is small. Therefore, the portion is less likely to become a defect portion during firing, and the coverage of the internal electrode layer in the region where the electrically conductive paste A for forming the internal electrode is applied becomes high. In addition, by adjusting the sizes of D2 and D1, it is possible to adjust the value of the coverage of the internal electrode layer 30 with respect to the dielectric layer 20.

The electrically conductive paste for the internal electrode layer 30 is printed on the dielectric sheet in a predetermined pattern by, for example, screen printing or gravure printing. Thus, a dielectric sheet including a pattern of the first internal electrode layer 31 and a dielectric sheet including a pattern of the second internal electrode layer 32 are provided.

More specifically, a screen plate for printing the first internal electrode layer 31 and a screen plate for printing the second internal electrode layer 32 are separately provided. A printing machine capable of separately printing each internal electrode layer using two kinds of screen plates can be used.

In order to obtain the configuration of the first internal electrode layer 31 including the first extension portion 31A, the second extension portion 31B, the first connection region 31MA, the second connection region 31MB, and the first central region 31MM of the present preferred embodiment, a plurality of kinds of electrically conductive pastes for forming the internal electrode layers are separately coated on the dielectric sheet.

First, the electrically conductive paste A for forming the internal electrode is applied to portions defining and functioning as the first extension portion 31A, the second extension portion 31B, the first connection region 31MA, and the second connection region 31MB. Next, the electrically conductive paste B for forming the internal electrode is applied to portions functioning as the first counter electrode portion 31M including the first central region 31MM except for portions defining and functioning as the first connection region 31MA and the second connection region 31MB. At this time, the electrically conductive paste B for forming the internal electrode may be applied so as to overlap with the electrically conductive paste A for forming the internal electrode. In such a case, a resultant film is preferably controlled to be smooth.

In order to obtain the configuration of the second internal electrode layer 32 including the third extension portion 32C, the fourth extension portion 32D, the third connection region 32MC, the fourth connection region 32MD, and the second central region 32MM of the present preferred embodiment, a plurality of types of electrically conductive pastes for internal electrode layers are separately coated on the dielectric sheet.

First, the electrically conductive paste A for forming the internal electrode is applied to portions defining and functioning as the third extension portion 32C, the fourth extension portion 32D, the third connection region 32MC, and the fourth connection region 32MD. Next, the electrically conductive paste B for forming the internal electrode is applied to a portion defining and functioning as the second counter electrode portion 32M including the second central region 32MM except for portions defining and functioning as the third connection region 32MC and the fourth connection region 32MD. At this time, the electrically conductive paste B for forming the internal electrode may be applied so as to overlap with the electrically conductive paste A for forming the internal electrode. In such a case, a resultant film is preferably controlled to be smooth.

By laminating a predetermined number of dielectric sheets on which patterns of internal electrode layers are not printed, a portion defining and functioning as the first main surface-side outer layer portion 12 adjacent to the first main surface TS1 is formed. A dielectric sheet on which the pattern of the first internal electrode layer 31 is printed and a dielectric sheet on which the pattern of the second internal electrode layer 32 is printed are sequentially laminated thereon, such that a portion defining and functioning as the inner layer portion 11 is formed. A predetermined number of dielectric sheets on which patterns of internal electrode layers are not printed are laminated on the portion defining and functioning as the inner layer portion 11, such that the portion defining and functioning as the second main surface-side outer layer portion 13 adjacent to the second main surface TS2 is formed. Thus, a laminated sheet is produced.

The laminated sheet is pressed in the height direction by, for example, as hydrostatic pressing to form a laminated block.

By cutting the laminated block into a predetermined size, the laminated chip is cut out. At this time, the corners and ridges of the laminated chip may be rounded by, for example, barrel polishing or the like.

The laminated chip is fired to form the multilayer body 10. The firing temperature depends on the materials of the dielectric layer 20 and the internal electrode layer 30, but is preferably, for example, about 900° C. or higher and about 1400° C. or lower.

The first base electrode layer 50A and the second base electrode layer 50B are formed on the first side surface WS1 and the second side surface WS2 of the multilayer body 10 obtained by firing. In the present preferred embodiment, the base electrode layer is a fired layer. An electrically conductive paste containing a glass component and a metal is applied to the multilayer body 10. Then, firing treatment is performed to form a base electrode layer. The temperature of the firing treatment at this time is preferably, for example, about 700° C. or higher and about 900° C. or lower.

Here, as a method of forming the fired layer, various methods can be used. For example, a method in which an electrically conductive paste is extruded from a slit and applied can be used. In a case of this manufacturing method, by increasing the extrusion amount of the electrically conductive paste, the base electrode layer can be formed not only on the first side surface WS1 and the second side surface WS2, but also on a portion of the first main surface TS1 and a portion of the second main surface TS2.

Alternatively, for example, a roller transfer method may be used. When the base electrode layer is formed not only on the first side surface WS1 and the second side surface WS2, but also on a portion of the first main surface TS1 and a portion of the second main surface TS2 by the roller transfer method, the pressing pressure at the time of roller transfer is increased. This makes it possible to form the base electrode layer to a portion of the first main surface TS1 and a portion of the second main surface TS2.

Next, the third base electrode layer 50C and the fourth base electrode layer 50D are formed on the first end surface LS1 and the second end surface LS2 of the multilayer body 10 obtained by firing. In the present preferred embodiment, the base electrode layer is a fired layer. An electrically conductive paste including a glass component and a metal is applied to the multilayer body 10. Thereafter, firing treatment is performed to form a base electrode layer. The temperature of the firing treatment at this time is preferably, for example, about 700° C. or higher and about 900° C. or lower.

In the present preferred embodiment, the base electrode layer is formed so as to extend not only to the first end surface and the second end surface, but also to a portion of the first main surface and a portion of the second main surface, a portion of the first side surface, and a portion of the second side surface by using, for example, a dip method.

In the firing treatment, the first base electrode layer 50A, the second base electrode layer 50B, the third base electrode layer 50C, and the fourth base electrode layer 50D may be fired at the same time, or may be fired at different timings separately on the side surface side and the end surface side.

In a case where the laminated chip before firing and the electrically conductive paste applied to the laminated chip are fired at the same time, it is preferable that the fired layer is formed by firing a ceramic material added instead of the glass component. At this time, it is particularly preferable to use the same type of ceramic material as the dielectric layer 20 as the ceramic material to be added. In this case, an electrically conductive paste is applied to the laminated chip before firing, and the laminated chip and the electrically conductive paste applied to the laminated chip are fired at the same time to form the multilayer body 10 in which the fired layer is formed.

Thereafter, a plated layer is formed on the surface of the base electrode layer. In the present preferred embodiment, a Ni plated layer and a Sn plated layer are formed as plated layers. In the plating treatment, either electrolytic plating or electroless plating may be used. However, the electroless plating requires a pretreatment using a catalyst or the like in order to improve the plating deposition rate, and therefore, there is a disadvantage in that the process becomes complicated. Therefore, it is usually preferable to use electrolytic plating. The Ni plated layer and the Sn plated layer are sequentially formed by, for example, barrel plating. The plated layer may be provided directly on the exposed portion of the internal electrode layer 30 of the multilayer body 10 without providing the base electrode layer.

In addition, in a case where the base electrode layer is formed using a thin film layer, a thin film layer defining and functioning as a base electrode layer is formed in a portion where an external electrode is to be formed by, for example, masking or the like. The thin film layer is formed by a thin film forming method such as, for example, sputtering or deposition. The thin film layer is a layer having metal particles deposited thereon and having a thickness of, for example, about 1 μm or less.

When the electrically conductive resin layer is provided as the base electrode layer, an electrically conductive resin layer may be provided so as to cover the fired layer or may be provided directly on the multilayer body 10 without providing the fired layer. When the electrically conductive resin layer is provided, an electrically conductive resin paste including a thermosetting resin and a metal component is applied on the fired layer or the multilayer body 10, and then heat-treated at a temperature of, for example, about 250° C. to about 550° C. or higher. Thus, the thermosetting resin is thermally cured to form the electrically conductive resin layer. The atmosphere during the heat treatment is preferably, for example, an N2 atmosphere. In order to prevent scattering of the resin and to prevent oxidation of various metal components, the oxygen concentration is preferably, for example, about 100 ppm or less. As a method of applying the electrically conductive resin paste, for example, a method in which the electrically conductive paste is extruded from a slit and applied, or a roller transfer method can be used, as in a method in which the base electrode layer is formed as a fired layer.

The multilayer ceramic capacitor 1 is manufactured by such a manufacturing process.

In the present preferred embodiment, a description is provided in which the internal electrode layers (ground electrodes) extending toward and being exposed at the first side surface WS1 and the second side surface WS2 refer to the first internal electrode layers, and the internal electrode layers (through electrodes) extending toward and being exposed at the first end surface LS1 and the second end surface LS2 refer to the second internal electrode layers. However, the internal electrode layers (through electrodes) extending toward and being exposed at the first end surface LS1 and the second end surface LS2 can be regarded as the first internal electrode layers, and the internal electrode layers (ground electrodes) extending toward and being exposed at the first side surface WS1 and the second side surface WS2 can be regarded as the second internal electrode layers. In such a case, it is understood that the first internal electrode layers extend toward and are exposed at the first end surface LS1 and the second end surface LS2 defining and functioning as the first surface portion and the second surface portion, and the second internal electrode layers extend toward and are exposed at the first side surface WS1 and the second side surface WS2 defining and functioning as the third surface portion and the fourth surface portion. In such a case, it is understood that the external electrodes described as the third external electrode 40C, the fourth external electrode 40D, the first external electrode 40A, and the second external electrode 40B in the present preferred embodiment are recognized as the first external electrode, the second external electrode, the third external electrode, and the fourth external electrode, respectively.

According to the multilayer ceramic capacitor 1 of the present preferred embodiment, it is possible to obtain the following advantageous effects:

(1) The multilayer ceramic capacitor 1 according to the present preferred embodiment includes the multilayer body 10 including the plurality of laminated dielectric layers 20, the plurality of internal electrode layers 30 each laminated on a respective one of the plurality of dielectric layers 20, the first main surface TS1 and the second main surface TS2 opposed to each other in the lamination direction, the first end surface LS1 and the second end surface LS2 opposed to each other in the length direction orthogonal or substantially orthogonal to the lamination direction, and the first side surface WS1 and the second side surface WS2 opposed to each other in the width direction orthogonal or substantially orthogonal to the lamination direction and the length direction, and the three or more external electrodes 40, wherein the plurality of internal electrode layers 30 include the plurality of first internal electrode layers 31 and the plurality of second internal electrode layers 32, the plurality of first internal electrode layers 31 each include the first counter electrode portion 31M opposed to a respective one of the plurality of second internal electrode layers 32 with a respective one of the plurality of dielectric layers 20 interposed therebetween, the first extension portion 31A that extends from the first counter electrode portion 31M and extends toward and reaches the first surface portion of the multilayer body 10, and the second extension portion 31B that extends from the first counter electrode portion 31M and extends toward and is exposed at the second surface portion of the multilayer body 10, the plurality of second internal electrode layers 32 each include the second counter electrode portion 32M opposed to a respective one of the plurality of first internal electrode layers 31 with a respective one of the plurality of dielectric layers 20 interposed therebetween, and the third extension portion 32C that extends from the second counter electrode portion 32M and extends toward and is exposed at the third surface portion of the multilayer body 10, the three or more external electrodes 40 include the first external electrode 40A connected to the first extension portion 31A, the second external electrode 40B connected to the second extension portion 31B, and the third external electrode 40C connected to the third extension portion 32C, the first counter electrode portion 31M includes the first central region 31MM including a central portion of the first counter electrode portion 31M, the first connection region 31MA that is connected to the first extension portion 31A and has a higher coverage with respect to the dielectric layers 20 than the first central region 31MM, and the second connection region 31MB that is connected to the second extension portion 31B and has a higher coverage with respect to the dielectric layers 20 than the first central region 31MM, the coverages of the first connection region 31MA and the second connection region 31MB with respect to the dielectric layers 20 are higher than a coverage of the first central region 31MM with respect to the dielectric layers 20, and coverages of the first extension portion 31A and the second extension portion 31B with respect to the dielectric layers 20 are higher than the coverage of the first central region 31MM with respect to the dielectric layers 20. With such a configuration, it is possible to provide the multilayer ceramic capacitor 1 that is able to reduce or prevent an increase in the DC resistance of the internal electrode layers.

(2) In the multilayer ceramic capacitor 1 according to the present preferred embodiment, at least a portion of the first surface portion is a portion of the first side surface WS1, and at least a portion of the second surface portion is a portion of the second side surface WS2. Even in such a configuration, it is possible to obtain the advantageous effects of the present preferred embodiment.

(3) In the multilayer ceramic capacitor 1 according to the present preferred embodiment, the length L2 of the first extension portion 31A in the length direction L is shorter than the length L1 of the first counter electrode portion 31M in the length direction L, and the length L2 of the second extension portion 31B in the length direction L is shorter than the length L1 of the first counter electrode portion 31M in the length direction L. When the width of the extension portion is narrower than the width of the counter electrode portion when the internal electrode layer is viewed as a path through which electric charges flow, the DC resistance of the internal electrode layer is controlled to states of the extension portion and a connection portion between and the counter electrode portion and the extension portion. Accordingly, the present preferred embodiment of the present invention obtains particularly high advantageous effects in such a configuration of the internal electrode layers.

(4) In the multilayer ceramic capacitor 1 according to the present preferred embodiment, the coverages of the first connection region 31MA and the second connection region 31MB with respect to the dielectric layers 20 are about 72% or more, and the coverages of the first extension portion 31A and the second extension portion 31B with respect to the dielectric layers 20 are about 72% or more. This makes it possible to more effectively reduce or prevent an increase in the DC resistance of the internal electrode layers.

(5) In the multilayer ceramic capacitor 1 according to the present preferred embodiment, the second internal electrode layers 32 each include the fourth extension portion 32D that extends from the second counter electrode portion 32M and extends toward and is exposed at the fourth surface portion of the multilayer body 10, and the three or more external electrodes 40 further include the fourth external electrode 40D connected to the fourth extension portion 32D. Even in such a configuration, it is possible to obtain the advantageous effects of the present preferred embodiment.

(6) In the multilayer ceramic capacitor 1 according to the present preferred embodiment, at least a portion of the third surface portion is a portion of the first end surface LS1, and at least a portion of the fourth surface portion is a portion of the second end surface LS2. Even in such a configuration, it is possible to obtain the advantageous effects of the preferred embodiment.

(7) In the multilayer ceramic capacitor 1 according to the present preferred embodiment, the length W2 of the third extension portion 32C in the width direction W is shorter than the length W1 of the second counter electrode portion 32M in the width direction W, and the length W2 of the fourth extension portion 32D in the width direction W is shorter than the length W1 of the second counter electrode portion 32M in the width direction W. Even in such a configuration, it is possible to obtain the advantageous effects of the present preferred embodiment.

(8) In the multilayer ceramic capacitor 1 according to the present preferred embodiment, the second counter electrode portion 32M includes the second central region 32MM including a central portion of the second counter electrode portion 32M, the third connection region 32MC that is connected to the third extension portion 32C and has a higher coverage with respect to the dielectric layers 20 than the second central region 32MM, and the fourth connection region 32MD that is connected to the fourth extension portion 32D and has a higher coverage with respect to the dielectric layers 20 than the second central region 32MM, the coverages of the third connection region 32MC and the fourth connection region 32MD with respect to the dielectric layers 20 are higher than the coverage of the second central region 32MM with respect to the dielectric layers 20, and the coverages of the third extension portion 32C and the fourth extension portion 32D with respect to the dielectric layers 20 are higher than the coverage of the second central region 32MM with respect to the dielectric layers 20. With such a configuration, in addition to reducing or preventing an increase in the DC resistance of the first internal electrode layers

31, it is possible to further reduce or prevent an increase in the DC current of the second internal electrode layers 32.

(9) In the multilayer ceramic capacitor 1 according to the present preferred embodiment, the coverages of the third connection region 32MC and the fourth connection region 32MD with respect to the dielectric layers 20 are about 72% or more, and the coverages of the third extension portion 32C and the fourth extension portion 32D with respect to the dielectric layers 20 are about 72% or more. This makes it possible to more effectively reduce or prevent an increase in the DC resistance of the internal electrode layers.

(10) In the multilayer ceramic capacitor 1 according to the present preferred embodiment, the dielectric layers 20 each include a thickness of about 0.3 μm or more and about 1.5 μm or less. Even in such a configuration, it is possible to obtain the advantageous effects of the present preferred embodiment.

(11) In the multilayer ceramic capacitor 1 according to the preferred embodiment, the internal electrode layers 30 each include a thickness of about 0.25 μm or more and about 0.6 μm or less. The present preferred embodiment of the present invention obtains a highly advantageous effect in such a region where the thickness of the internal electrode layer 30 is thin.

(12) In the multilayer ceramic capacitor 1 according to the present preferred embodiment, the internal electrode layers 30 each include a thickness of about 0.25 μm or more and about 0.4 μm or less. The present preferred embodiment of the present invention obtains a more highly advantageous effect in such a region where the thickness of the internal electrode layer 30 is thin.

(13) In the multilayer ceramic capacitor 1 according to the present preferred embodiment, when an extending direction of the first extension portion 31A is defined as a first extending direction, the length of the first extension portion 31A in a direction orthogonal or substantially orthogonal to the first extending direction is shorter than the length of the first counter electrode portion 31M in a direction orthogonal or substantially orthogonal to the first extending direction, and when an extending direction of the second extension portion 31B is defined as a second extending direction, the length of the second extension portion 31B in a direction orthogonal or substantially orthogonal to the second extending direction is shorter than the length of the first counter electrode portion 31M in a direction orthogonal or substantially orthogonal to the second extending direction. When the width of the extension portion is narrower than the width of the counter electrode portion when the internal electrode layer is viewed as a path through which electric charges flow, the DC resistance of the internal electrode layer is controlled to states of the extension portion and a connection portion between and the counter electrode portion and the extension portion. Accordingly, the present preferred embodiment of the present invention obtains particularly highly advantageous effects in such a configuration of the internal electrode layers.

In the multilayer ceramic capacitor 1 of the present preferred embodiment, at least a portion of the first surface portion may be a portion of the first side surface WS1, and at least a portion of the second surface portion may be a portion of the second side surface WS2. In the multilayer ceramic capacitor 1 of the present preferred embodiment, at least a portion of the first surface portion may be a portion of the first end surface LS1, and at least a portion of the second surface portion may be a portion of the second end surface.

The present preferred embodiment of the present invention includes the following element and features.

The multilayer ceramic capacitor 1 includes the multilayer body 10 including the plurality of laminated dielectric layers 20, the plurality of internal electrode layers 30 each laminated on a respective one of the plurality of dielectric layers 20, the first main surface TS1 and the second main surface TS2 opposed to each other in the lamination direction, the first end surface LS1 and the second end surface LS2 opposed to each other in the length direction orthogonal or substantially orthogonal to the lamination direction, and the first side surface WS1 and the second side surface WS2 opposed to each other in the width direction orthogonal or substantially orthogonal to the lamination direction and the length direction, and the plurality of external electrodes 40, the plurality of internal electrode layers include a plurality of first internal electrode layers and a plurality of second internal electrode layers, the first internal electrode layers each include a first counter electrode portion opposed to the second internal electrode layer with a respective one of the dielectric layers, and a first extension portion that extends from the first counter electrode portion and extends toward and is exposed at an outer surface of the multilayer body, the second internal electrode layers each include a second counter electrode portion opposed to the first internal electrode layer with a respective one of the dielectric layers, and the second extension portion that extends from the second counter electrode portion and extends toward and is exposed at an outer surface of the multilayer body, when an extending direction of the first extension portion is defined as the first extending direction, the length of the first extension portion in the direction orthogonal or substantially orthogonal to the first extending direction is shorter than the length of the first counter electrode portion in the direction orthogonal or substantially orthogonal to the first extending direction, the plurality of external electrodes include a first external electrode connected to the first extension portion, and the other external electrode connected to the other extension portion, the first counter electrode portion includes the first central region including a central portion of the first counter electrode portion, and the first connection region that is connected to the first extension portion and has a higher coverage with respect to the dielectric layers than the first central region, the coverage of the first connection region with respect to the dielectric layers is higher than the coverage of the first central region with respect to the dielectric layers, and the coverage of the first extension portion with respect to the dielectric layers is higher than the coverage of the first central region with respect to the dielectric layers. When the width of the extension portion is narrower than the width of the counter electrode portion when the internal electrode layer is viewed as a path through which electric charges flow, the resistance of the internal electrode layer is controlled to states of the extension portion and a connection portion between and the counter electrode portion and the extension portion. Accordingly, the present preferred embodiment of the present invention obtains particularly highly advantageous effects in such a configuration of the internal electrode layers.

Second Preferred Embodiment

Figure 10A:
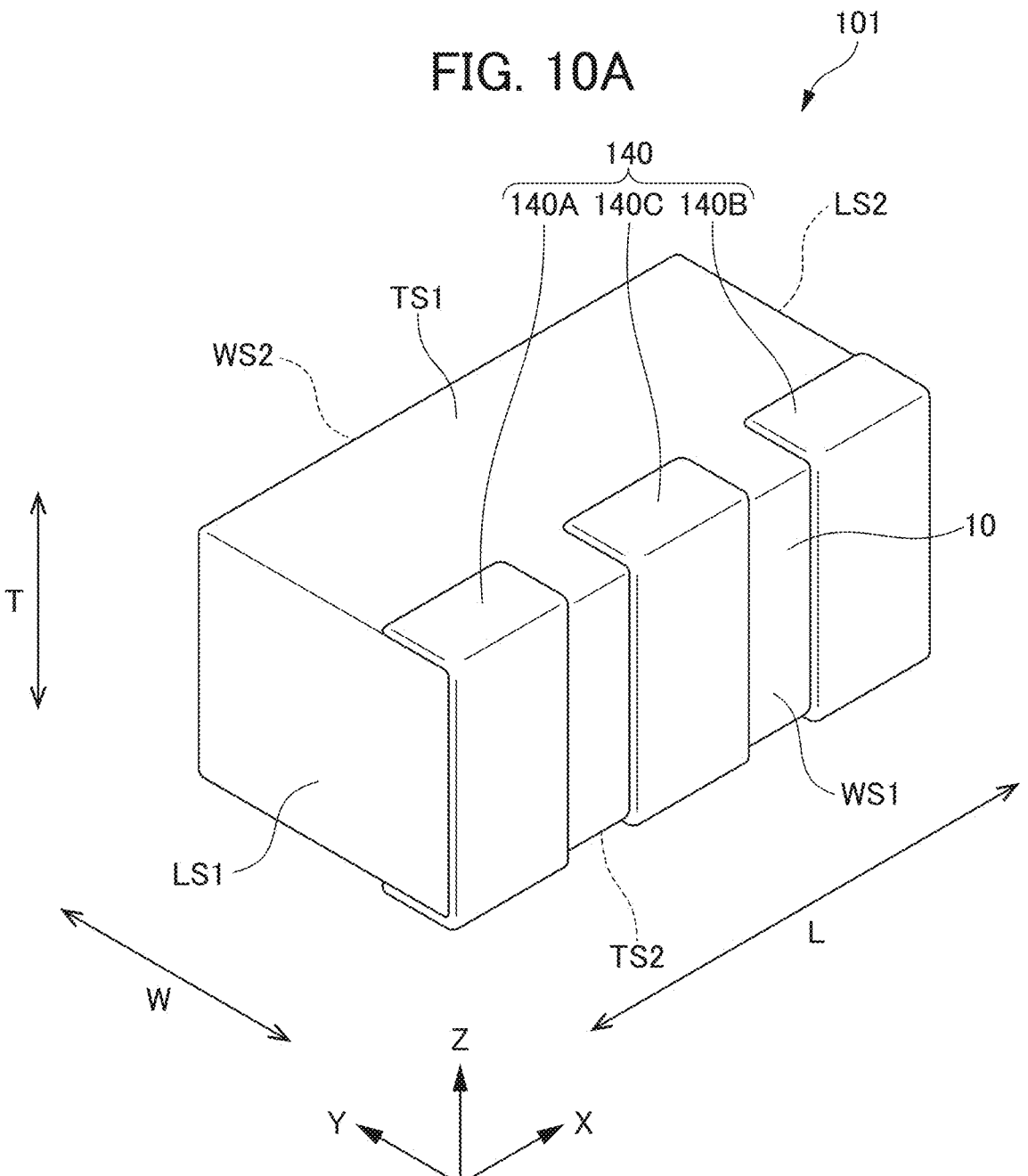
FIG. 10A is an external perspective view of a multilayer ceramic capacitor according to a second preferred embodiment of the present invention.
Figure 10B:
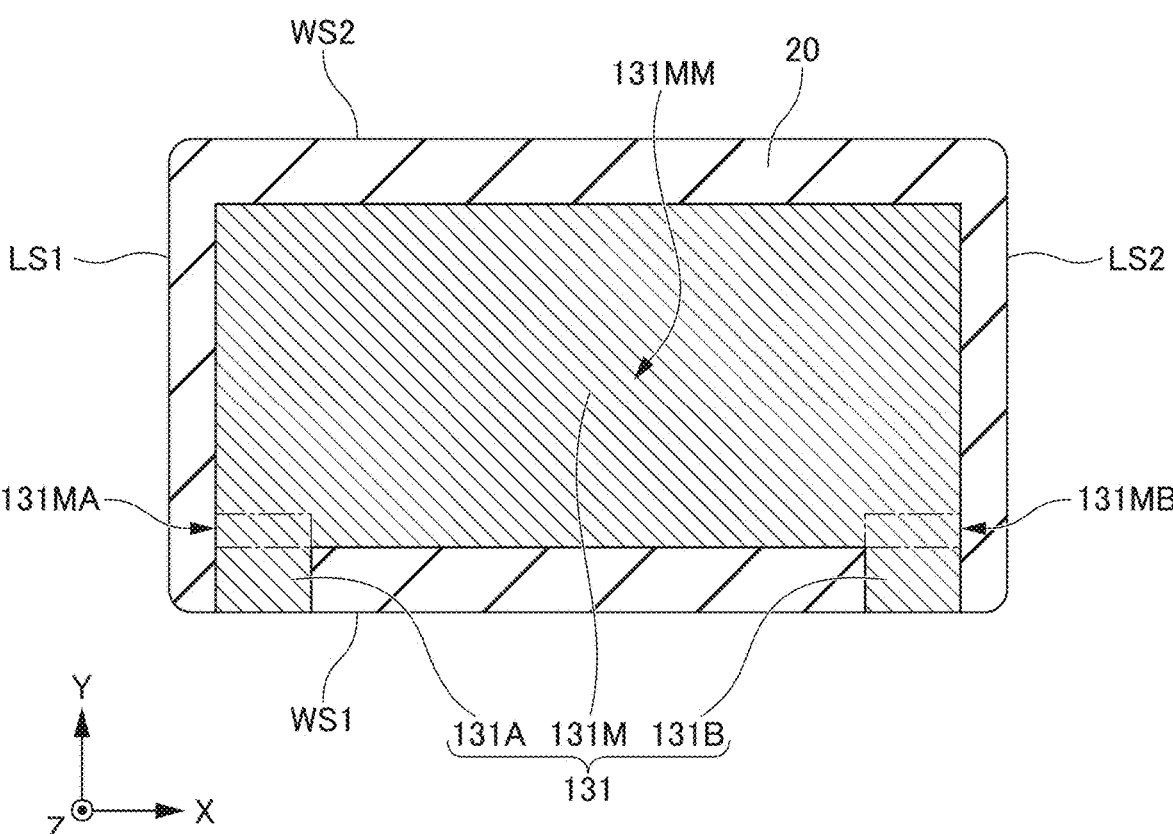
FIG. 10B is a diagram showing a first internal electrode layer of the second preferred embodiment of the present invention.
Figure 10C:
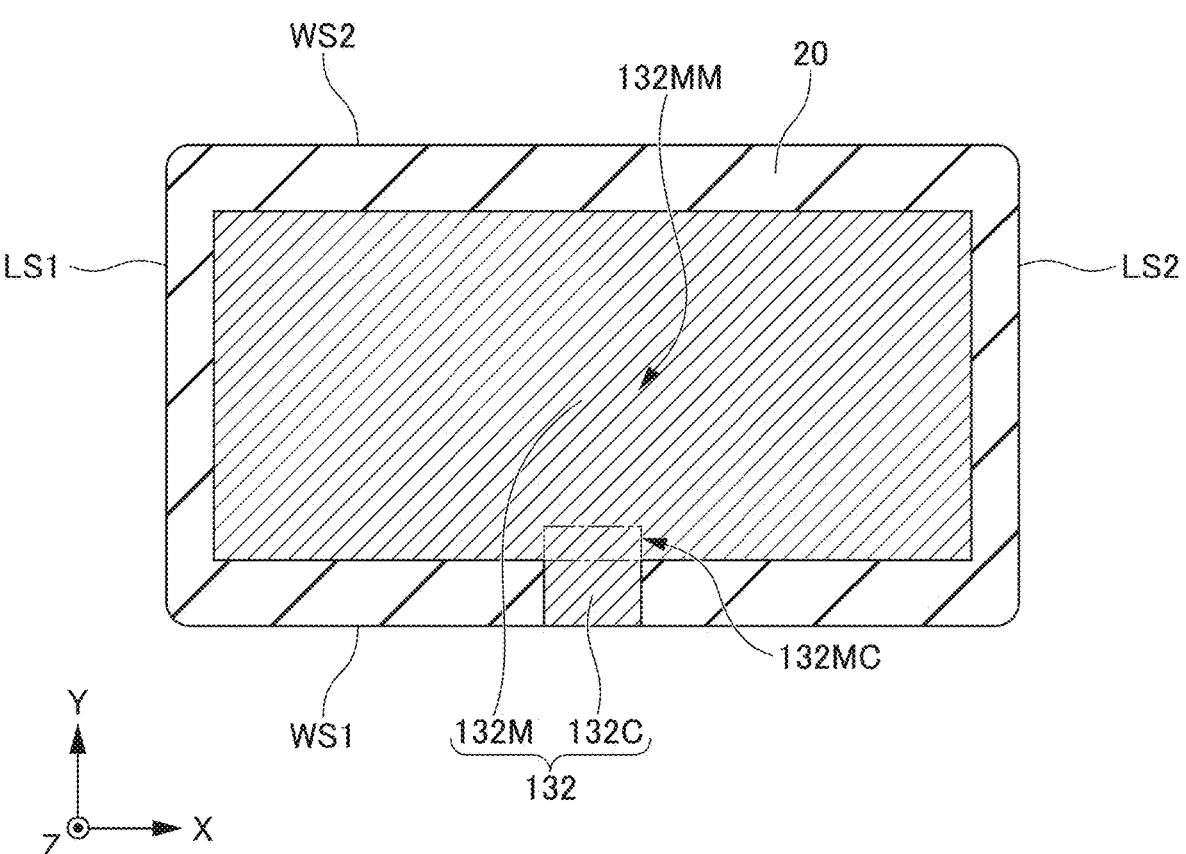
FIG. 10C shows a second internal electrode layer of the second preferred embodiment of the present invention.

Hereinafter, a multilayer ceramic capacitor 101 according to a second preferred embodiment of the present invention will be described. In the following description, detailed descriptions of the same or corresponding configurations as in the first preferred embodiment will be omitted. FIG. 10A is an external perspective view of a multilayer ceramic capacitor 101 according to a second preferred embodiment. FIG. 10B is a view of the cross section LW showing a first internal electrode layers 131 of the multilayer ceramic capacitor 101 according to the second preferred embodiment. FIG. 10C is a view of the cross section LW showing a second internal electrode layer 132 of the multilayer ceramic capacitor 101 of the present preferred embodiment. In FIGS. 10B and 10C, illustration of the external electrode 140 is omitted.

The multilayer ceramic capacitor 101 of the present preferred embodiment differs from that of the first preferred embodiment in the configuration of the first internal electrode layer, the second internal electrode layer, and the external electrode.

As shown in FIG. 10B, the first internal electrode layer 131 includes a first counter electrode portion 131M opposed to the second internal electrode layer 132 with the dielectric layer 20 interposed therebetween, a first extension portion 131A extending from the first counter electrode portion 131M and extending toward and being exposed at a portion of the first side surface WS1 defining and functioning as a first surface portion adjacent to the first end surface LS1, and a second extension portion 131B extending from the first counter electrode portion 131M and extending toward and being exposed at a portion of the first side surface WS1 defining and functioning as a second surface portion adjacent to the second end surface LS2. The first extension portion 131A is exposed at a portion of the first side surface WS1 adjacent to the first end surface LS1. The second extension portion 131B is exposed at a portion of the first side surface WS1 adjacent to the second end surface LS2. The second extension portion 131B is exposed at a position different from the exposed portion of the first extension portion 131A in the length direction L of the multilayer body 10. The first internal electrode layer 131 is U-shaped or substantially U-shaped (approximately C-shaped).

Also in the present preferred embodiment, the dimension of the first extension portion 131A in the length direction L is smaller than the dimension of the first counter electrode portion 131M in the length direction L. The dimension of the second extension portion 131B in the length direction L is smaller than the dimension of the first counter electrode portion 131M in the length direction L. That is, when the extending direction of the first extension portion 131A (the direction from the second side surface WS2 to the first side surface WS1) is defined as the first extending direction, the length of the first extension portion 131A in the direction orthogonal or substantially orthogonal to the first extending direction (the length direction L) is smaller than the length of the first counter electrode portion 131M in the direction orthogonal or substantially orthogonal to the first extending direction (the length direction L). When the extending direction of the second extension portion 131B (the direction from the second side surface WS2 to the first side surface WS1) is defined as the second extending direction, the length of the second extension portion 131B in the direction orthogonal or substantially orthogonal to the second extending direction (the length direction L) is smaller than the length of the first counter electrode portion 131M in the direction orthogonal or substantially orthogonal to the second extending direction (the length direction L).

The first counter electrode portion 131M includes a first central region 131MM including a central portion of the first counter electrode portion 131M, a first connection region 131MA connected to the first extension portion 131A, and a second connection region 131MB connected to the second extension portion 131B. The first connection portion 131A has a higher coverage with respect to the dielectric layer 20 than the first central region 131MM. The second extension portion 131B has a higher coverage with respect to the dielectric layer 20 than the first central region 131MM.

The length of the first connection region 131MA in the width direction W is defined as, for example, about 5% of the length of the first counter electrode portion 131M in the width direction W. The length of the first connection region 131MA in the length direction L is defined to be the same or substantially the same as the length of the first extension portion 131A. The length of the second connection region 131MB in the width direction W is defined as, for example, about 5% of the length of the first counter electrode portion 131M in the width direction W. The length of the second connection region 131MB in the length direction L is defined to be the same or substantially the same as the length of the second extension portion 131B. In addition, also in the following preferred embodiments, each connection region of the first internal electrode layer is defined by a similar method based on the dimension of the counter electrode portion.

The coverages of the first connection region 131MA and the second connection region 131MB with respect to the dielectric layer 20 are higher than the coverage of the first central region 131MM with respect to the dielectric layer 20. The coverages of the first extension portion 131A and the second extension portion 131B with respect to the dielectric layer 20 are higher than the coverage of the first central region 131MM with respect to the dielectric layer 20.

That is, when the coverage of the first central region 131MM with respect to the dielectric layer 20 is defined as A, the coverages of the first connection region 131MA and the second connection region 131MB with respect to the dielectric layer 20 are defined as B, and the coverages of the first extension portion 131A and the second extension portion 131B with respect to the dielectric layer 20 are defined as C, the relationships of A<B and A<C are satisfied.

As shown in FIG. 10C, the second internal electrode layer 132 includes a second counter electrode portion 132M opposed to the first internal electrode layer 131 with the dielectric layer 20 interposed therebetween, and a third extension portion 132C extending from the second counter electrode portion 132M and extending toward and reaching a portion of the first side surface WS1 defining and functioning as a third surface portion. The third extension portion 132C is exposed at the first side surface WS1. The third extension portion 132C is exposed at a position different from the exposed portion of the first extension portion 131A and the exposed portion of the second extension portion 131B in the width direction W of the multilayer body 10. In the present preferred embodiment, the third extension portion 132C is exposed at the center of the multilayer body 10 in the width direction W.

The dimension of the third extension portion 132C in the length direction L is smaller than the dimension of the second counter electrode portion 132M in the length direction L. That is, when the extending direction of the third extension portion 132C (the direction from the second side surface WS2 to the first side surface WS1) is defined as the third extending direction, the length of the third extension portion 132C in the direction orthogonal or substantially orthogonal to the third extending direction (the length direction L) is smaller than the length of the second counter electrode portion 132M in the direction orthogonal or substantially orthogonal to the third extending direction (the length direction L).

The second counter electrode portion 132M preferably includes a second central region 132MM including a central portion of the second counter electrode portion 132M, and a third connection region 132MC which is a portion connected to the third extension portion 132C and has a higher coverage with respect to the dielectric layer 20 than the second central region 132MM.

The length of the third connection region 132MC in the width direction W is defined as, for example, about 5% of the length of the second counter electrode portion 132M in the width direction W. The length of the third connection region 132MC in the length direction L is defined to be the same or substantially the same as the length of the third extension portion 132C in the length direction L. In addition, also in the following preferred embodiments, each connection region of the second internal electrode layers is defined by a similar method based on the dimension of the counter electrode portion.

The coverage of the third connection region 132MC with respect to the dielectric layer 20 is preferably higher than the coverage of the second central region 132MM with respect to the dielectric layer 20. The coverage of the third extension portion 132C with respect to the dielectric layer 20 is preferably higher than the coverage of the second central region 132MM with respect to the dielectric layer 20.

That is, when the coverage of the second central region 132MM with respect to the dielectric layer 20 is defined as D, the coverage of the third connection region 132MC with respect to the dielectric layer 20 is defined as E, and the coverage of the third extension portion 132C with respect to the dielectric layer 20 is defined as F, the relationships of D<E and D<F are preferably satisfied.

The external electrode 140 of the present preferred embodiment includes, as three or more external electrodes, a first external electrode 140A connected to the first extension portion 131A, a second external electrode 140B connected to the second extension portion 131B, and a third external electrode 140C connected to the third extension portion 132C.

The first external electrode 140A is provided on the first side surface WS1 adjacent to the first end surface LS1. The first external electrode 140A is connected to the first extension portion 131A adjacent to the first internal electrode layer 131. The first external electrode 140A may also be provided at a portion of the first main surface TS1 and a portion of the second main surface TS2. In the present preferred embodiment, the first external electrode 140A extends from the first side surface WS1 to a portion of the first main surface TS1 and a portion of the second main surface TS2.

The second external electrode 140B is provided on the first side surface WS1 at a position different from the first external electrode 140A. The second external electrode 140B is provided on the first side surface WS1 adjacent to the second end surface LS2. The second external electrode 140B is connected to the second extension portion 131B of the first internal electrode layer 131. The second external electrode 140B may also be provided at a portion of the first main surface TS1 and a portion of the second main surface TS2. In the present preferred embodiment, the second external electrode 140B extends from the first side surface WS1 to a portion of the first main surface TS1 and a portion of the second main surface TS2.

The third external electrode 140C is provided on the first side surface WS1 at a position different from the first external electrode 140A and the second external electrode 140B. The third external electrode 140C is provided on the first side surface WS1 at the center of the multilayer body 10 in the width direction W. The third external electrode 140C is connected to the third extension portion 132C of the second internal electrode layer 132. The third external electrode 140C may also be provided at a portion of the first main surface TS1 and a portion of the second main surface TS2. In the present preferred embodiment, the third external electrode 140C extends from the first side surface WS1 to a portion of the first main surface TS1 and a portion of the second main surface TS2.

The layer structure of the external electrode 140 may be the same as or similar to that of the first preferred embodiment.

In the multilayer ceramic capacitor 1 of the present preferred embodiment, at least a portion of the first surface portion is a portion of the first side surface WS1 adjacent to the first end surface LS1, and at least a portion of the second surface portion is a portion of the first side surface WS1 adjacent to the second end surface LS2. Even in such a configuration, it is possible to obtain a similar advantageous effect as in the first preferred embodiment.

Third Preferred Embodiment

Figure 11A:
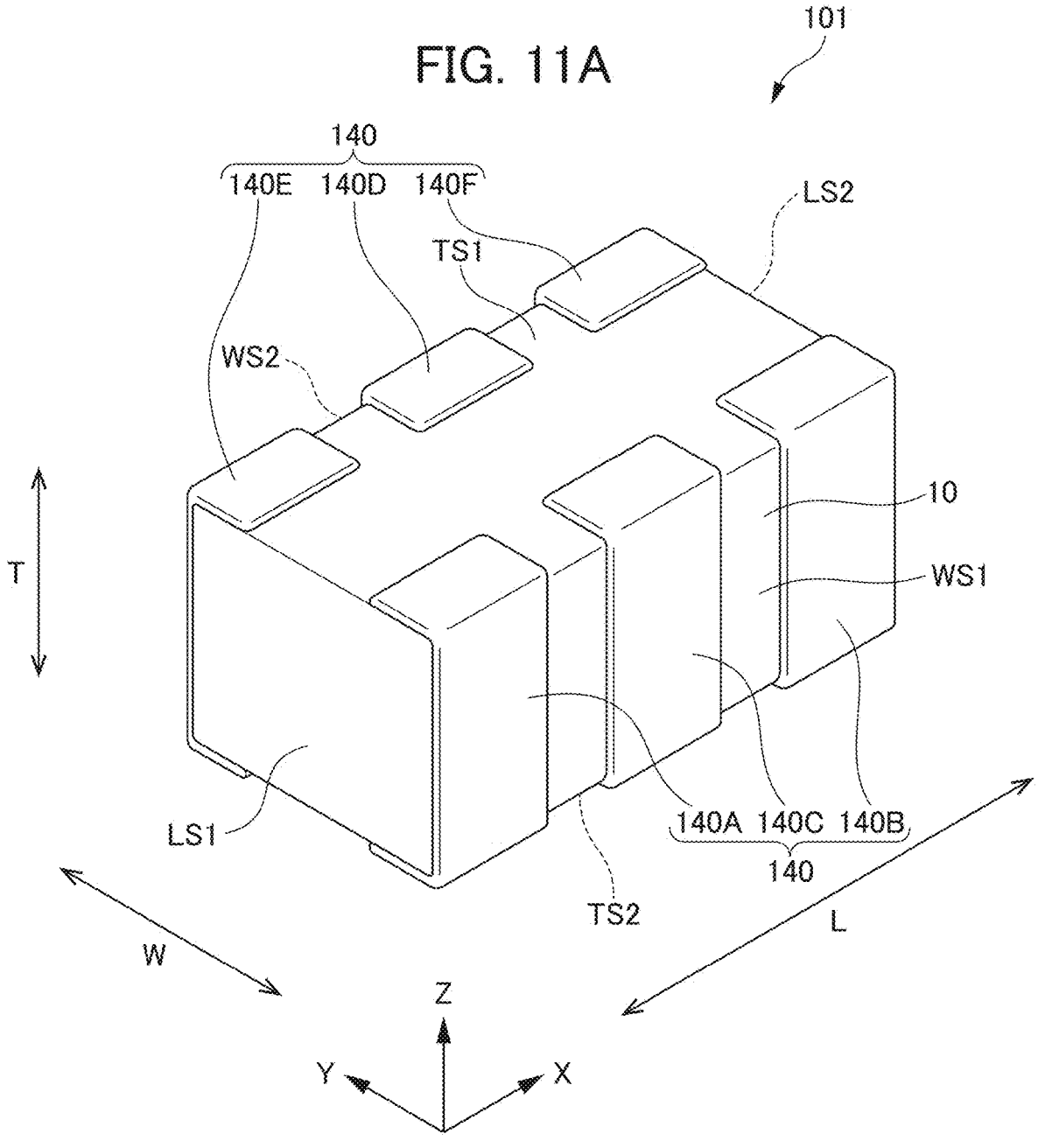
FIG. 11A is an external perspective view of a multilayer ceramic capacitor according to a third preferred embodiment of the present invention.
Figure 11B:
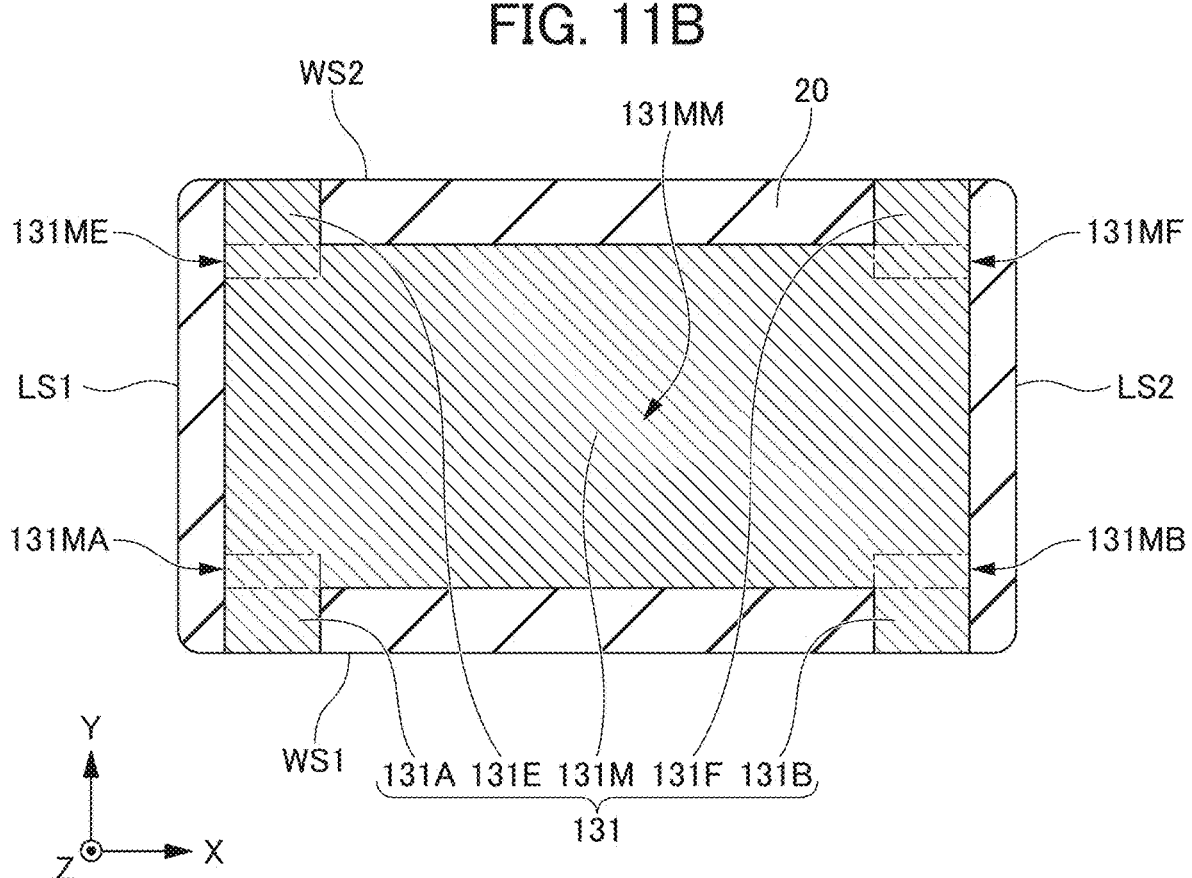
FIG. 11B shows a first internal electrode layer of the third preferred embodiment of the present invention.
Figure 11C:
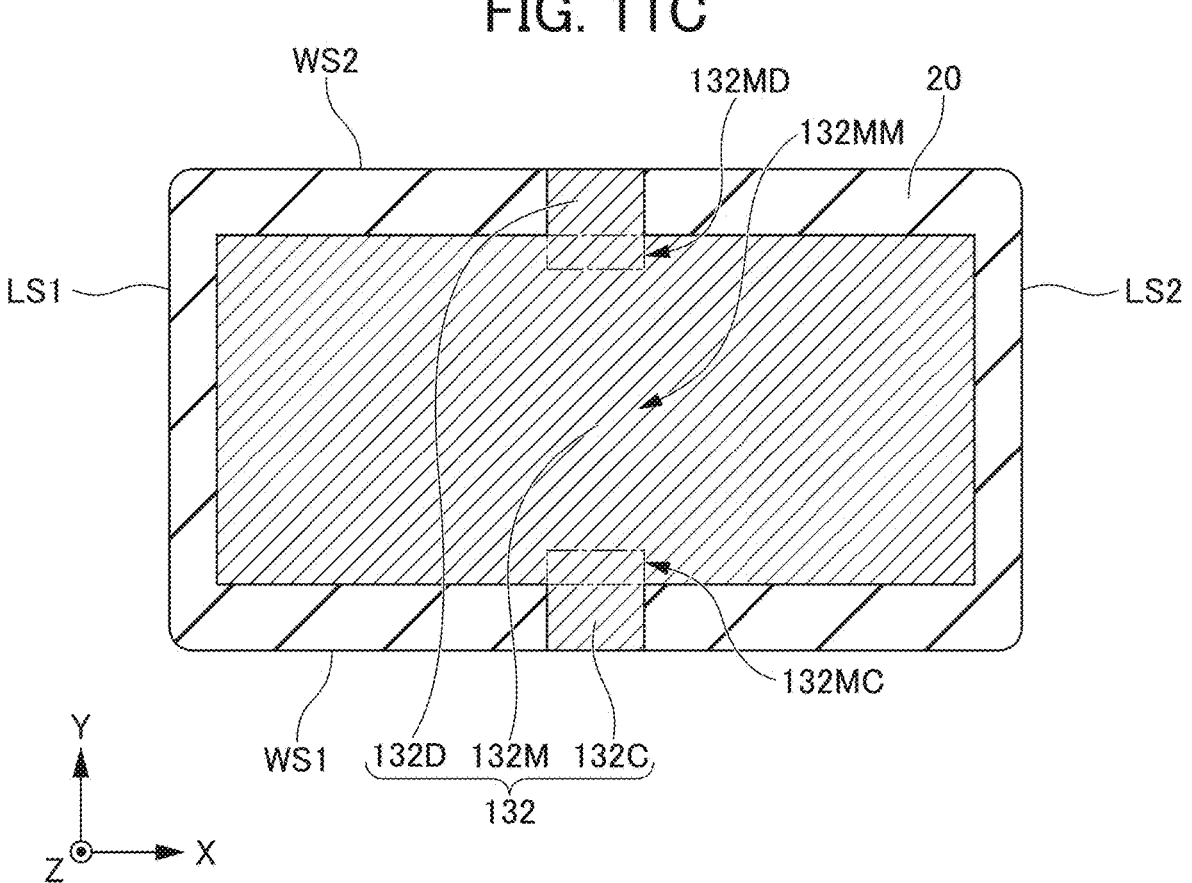
FIG. 11C shows a second internal electrode layer of the third preferred embodiment of the present invention.

Hereinafter, a multilayer ceramic capacitor 101 according to a third preferred embodiment of the present invention will be described. In the following description, detailed descriptions of the same or corresponding configurations as in the second preferred embodiment will be omitted. FIG. 11A is an external perspective view of a multilayer ceramic capacitor 101 according to a third preferred embodiment. FIG. 11B is a view of the cross section LW showing a first internal electrode layer 131 of the multilayer ceramic capacitor 101 according to the present preferred embodiment. FIG. 11C is a view of the cross section LW showing a second internal electrode layer 132 of the multilayer ceramic capacitor 101 of the present preferred embodiment. In FIGS. 11B and 11C, illustration of the external electrode 140 is omitted.

The multilayer ceramic capacitor 101 of the present preferred embodiment differs from the second preferred embodiment in the configuration of the first internal electrode layer, the second internal electrode layer, and the external electrode.

As shown in FIG. 11B, the first internal electrode layer 131 of the present preferred embodiment further includes a fifth extension portion 131E extending from the first counter electrode portion 131M and extending toward and being exposed at a portion of the second side surface WS2 adjacent to the first end surface LS1, and a sixth extension portion 131F extending from the first counter electrode portion 131M and extending toward and being exposed at a portion of the second side surface WS2 adjacent to the second end surface LS2. The fifth extension portion 131E is exposed at a portion of the second side surface WS2 adjacent to the first end surface LS1, and the sixth extension portion 131F is exposed at a portion of the second side surface WS2 adjacent to the second end surface LS2. The first internal electrode layer 131 is H-shaped or substantially H-shaped.

The first counter electrode portion 131M preferably further includes a fifth connection region 131ME, which is a region connected to the fifth extension portion 131E and having a higher coverage with respect to the dielectric layer 20 than the first central region 131MM, and a sixth connection region 131MF, which is a region connected to the sixth extension portion 131F and having a higher coverage with respect to the dielectric layer 20 than the first central region 131MM.

The coverages of the fifth connection region 131ME and the sixth connection region 131MF with respect to the dielectric layer 20 are preferably higher than the coverage of the first central region 131MM with respect to the dielectric layer 20. The coverages of the fifth extension portion 131E and the sixth extension portion 131F with respect to the dielectric layer 20 are preferably higher than the coverage of the first central region 131MM with respect to the dielectric layer 20.

As shown in FIG. 11C, the second internal electrode layer 132 further includes a fourth extension portion 132D extending from the second counter electrode portion 132M and extending toward and reaching a portion of the second side surface WS2. The fourth extension portion 132D is exposed at the second side surface WS2. The fourth extension portion 132D is exposed at a position different from the exposed portion of the fifth extension portion 131E and the exposed portion of the sixth extension portion 131F in the length direction L of the multilayer body 10. In the present preferred embodiment, the fourth extension portion 132D is exposed at the center of the multilayer body 10 in the width direction W.

The dimension of the fourth extension portion 132D in the length direction L is smaller than the dimension of the second counter electrode portion 132M in the length direction L. That is, when the extending direction of the fourth extension portion 132D (the direction from the first side surface WS1 to the second side surface WS2) is defined as the fourth extending direction, the length of the fourth extension portion 132D in the direction orthogonal or substantially orthogonal to the fourth extending direction (length direction L) is smaller than the length of the second counter electrode portion 132M in the direction orthogonal or substantially orthogonal to the fourth extending direction (length direction L).

The second counter electrode portion 132M preferably further includes a fourth connection region 132MD which is a portion connected to the fourth extension portion 132D and has a higher coverage with respect to the dielectric layer 20 than the second central region 132MM.

The coverage of the fourth connection region 132MD with respect to the dielectric layer 20 is preferably higher than the coverage of the second central region 132MM with respect to the dielectric layer 20. The coverage of the fourth extension portion 132D with respect to the dielectric layer 20 is preferably higher than the coverage of the second central region 132MM with respect to the dielectric layer 20.

The external electrode 140 of the present preferred embodiment further includes a fifth external electrode 140E connected to the fifth extension portion 131E, a sixth external electrode 140F connected to the sixth extension portion 131F, and a fourth external electrode 140D connected to the fourth extension portion 132D. The fifth, sixth, and fourth external electrodes 140E, 140F, and 140D are provided adjacent to the second side surface WS2 so as to be symmetrical with respect to the first external electrode 140A, the second external electrode 140B, and the third external electrode 140C.

In the present preferred embodiment, it is possible to use external electrodes the same as or similar to those of the first preferred embodiment shown in FIG. 1. In this case, for example, it is understood that the external electrode provided adjacent to the first end surface LS1 refers to a first external electrode, the external electrode provided adjacent to the second end surface LS2 refers to a second external electrode, and the external electrode provided adjacent to the first side surface WS1 refers to a third external electrode.

Even in such a configuration, it is possible to obtain the same or similar advantageous effects as in the first preferred embodiment.

In the present preferred embodiment, for example, in the first internal electrode layer 131, one of the two extension portions extending toward and being exposed at the second side surface WS2 can be regarded as a first extension portion, and the other extension portion extending toward and being exposed at the second side surface WS2 can be regarded as a second extension portion. Furthermore, in the first internal electrode layer 131, one of the two extension portions extending toward and being exposed at the first side surface WS1 can be regarded as a first extension portion, and one of the two extension portions extending toward and being exposed at the second side surface WS2 can be regarded as a second extension portion.

Fourth Preferred Embodiment

Figure 12A:
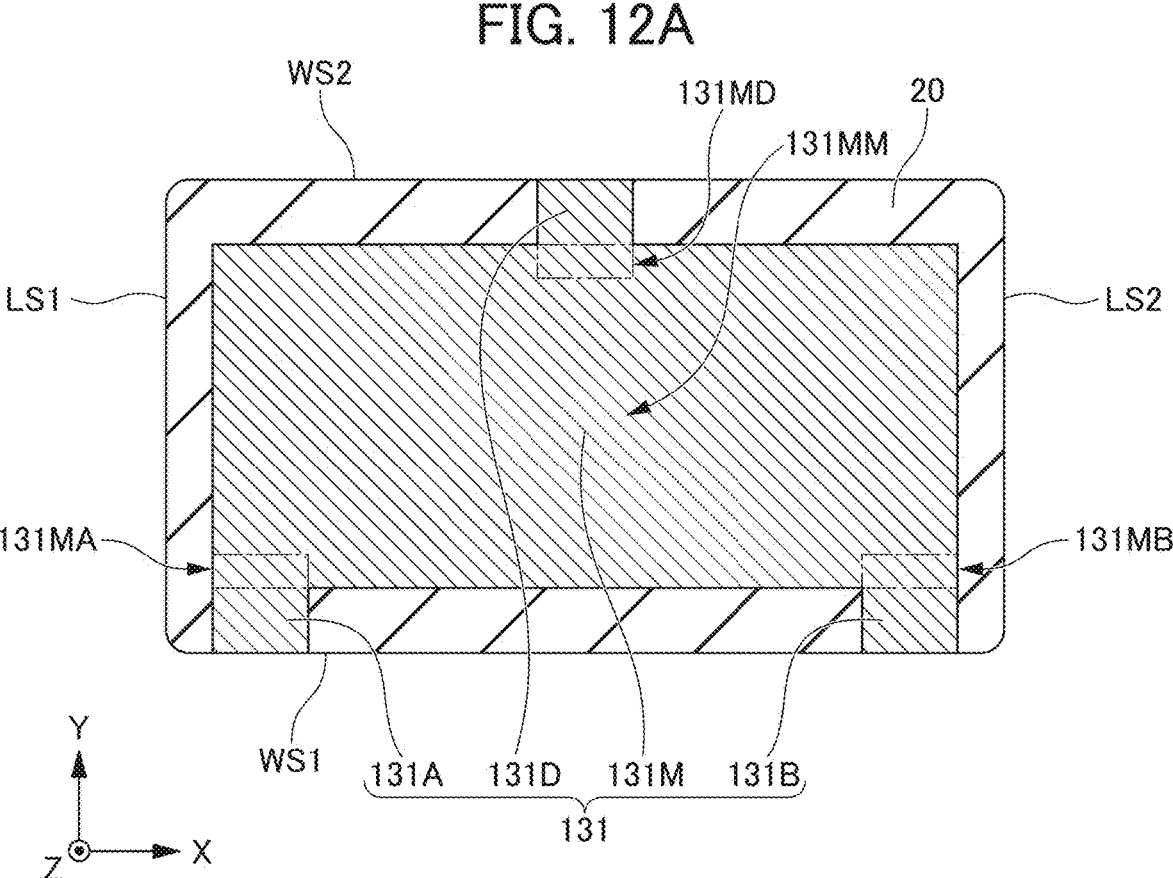
FIG. 12A is a diagram showing a first internal electrode layer of a multilayer ceramic capacitor according to a fourth preferred embodiment of the present invention.
Figure 12B:
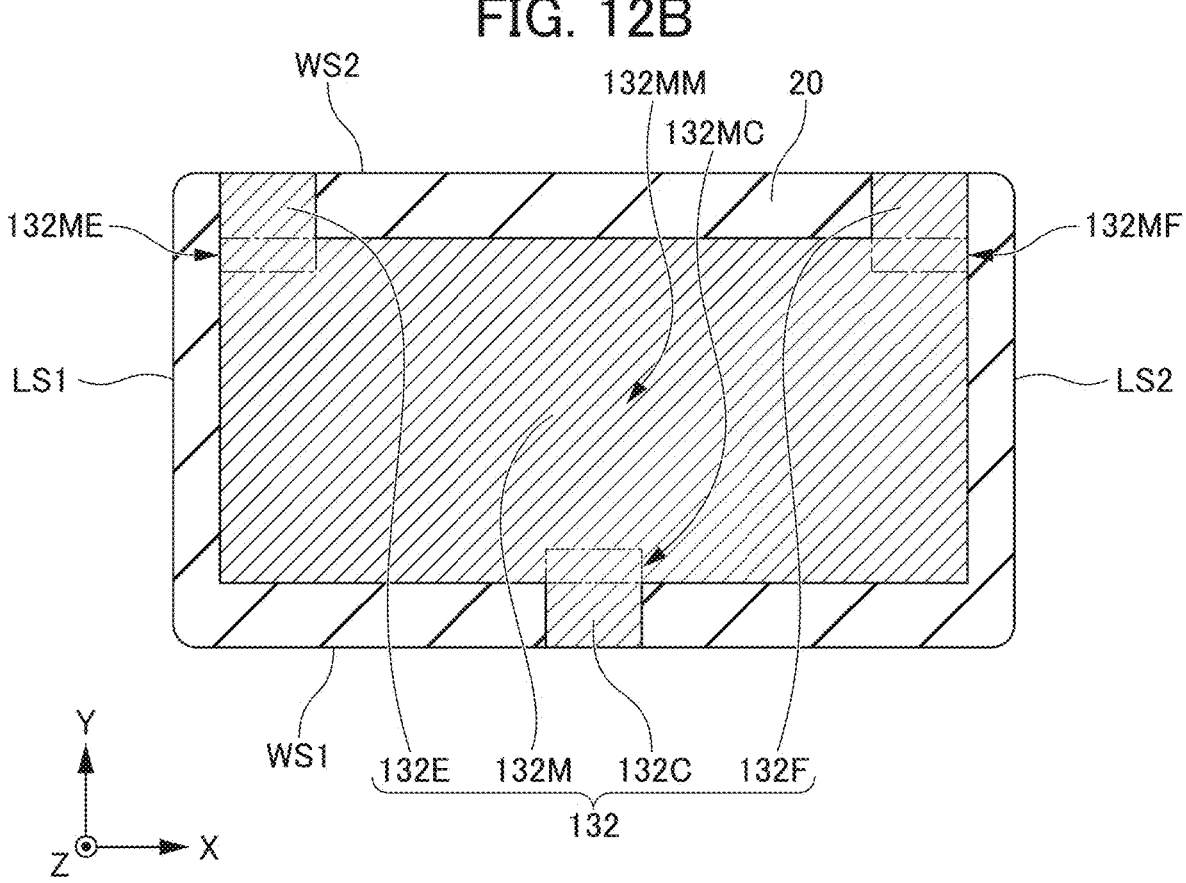
FIG. 12B is a diagram showing a second internal electrode layer of the fourth preferred embodiment of the present invention.

Hereinafter, a multilayer ceramic capacitor 101 according to a fourth preferred embodiment of the present invention will be described. In the following description of the internal electrode layers, detailed of descriptions the same or corresponding configurations as in the second preferred embodiment will be omitted. FIG. 12A is a view of the cross section LW showing a first internal electrode layer 131 of the multilayer ceramic capacitor 101 according to the preferred fourth preferred embodiment. FIG. 12B is a view of the cross section LW showing a second internal electrode layer 132 of the multilayer ceramic capacitor 101 of the present preferred embodiment. In FIGS. 12A and 12B, illustration of the external electrode 40 is omitted. Since the configuration of the external electrodes is the same or substantially the same as that of the third preferred embodiment shown in FIG. 11A, the external perspective view of the multilayer ceramic capacitor 1 and the detailed description of the external electrodes 140 are omitted.

The multilayer ceramic capacitor 101 of the present preferred embodiment differs from the second preferred embodiment in the configuration of the first internal electrode layer, the second internal electrode layer, and the external electrode.

As shown in FIG. 12A, the first internal electrode layer 131 of the present preferred embodiment further includes a seventh extension portion 131D extending from the first counter electrode portion 131M and extending toward and being exposed at the central portion of the second side surface WS2 in the length direction L. The seventh extension portion 131D is exposed at the center or approximate center of the second side surface WS2 in the length direction L.

The first counter electrode portion 131M preferably further includes a seventh connection region 131MD which is a portion connected to the seventh extension portion 131D and has a higher coverage with respect to the dielectric layer 20 than the first central region 131MM.

The coverage of the seventh connection region 131MD with respect to the dielectric layer 20 is preferably higher than the coverage of the first central region 131MM with respect to the dielectric layer 20. The coverage of the seventh extension portion 131D with respect to the dielectric layer 20 is preferably higher than the coverage of the first central region 131MM with respect to the dielectric layer 20.

As shown in FIG. 12B, the second internal electrode layer 132 of the present preferred embodiment further includes an eighth extension portion 132E extending from the second counter electrode portion 132M and extending toward and being exposed at a portion of the second side surface WS2 adjacent to the first end surface LS1, and a ninth extension portion 132F extending from the second counter electrode portion 132M and extending toward and being exposed at a portion of the second side surface WS2 adjacent to the second end surface LS2. The eighth extension portion 132E is exposed at a portion of the second side surface WS2 adjacent to the first end surface LS1, and the ninth extension portion 132F is exposed at a portion of the second side surface WS2 adjacent to the second end surface LS2.

The second counter electrode portion 132M preferably further includes an eighth connection region 132ME, which is a portion connected to the eighth extension portion 132E and has a higher coverage with respect to the dielectric layer 20 than the second central region 132MM, and a ninth connection region 132MF, which is a portion connected to the ninth extension portion 132F and has a higher coverage with respect to the dielectric layer 20 than the second central region 132MM.

The coverages of the eighth connection region 132ME and the ninth connection region 132MF with respect to the dielectric layer 20 is preferably higher than the coverage of the second central region 132MM with respect to the dielectric layer 20. The coverages of the eighth extension portion 132E and the ninth extension portion 132F with respect to the dielectric layer 20 is preferably higher than the coverage of the second central region 132MM with respect to the dielectric layer 20.

In the present preferred embodiment, the fourth external electrode 140D is connected to the seventh extension portion 131D, the fifth external electrode 140E is connected to the eighth extension portion 132E, and the sixth external electrode 140F is connected to the ninth extension portion 132F.

Even in such a configuration, it is possible to obtain the same or similar advantageous effects as in the first preferred embodiment.

Fifth Preferred Embodiment

Figure 13A:
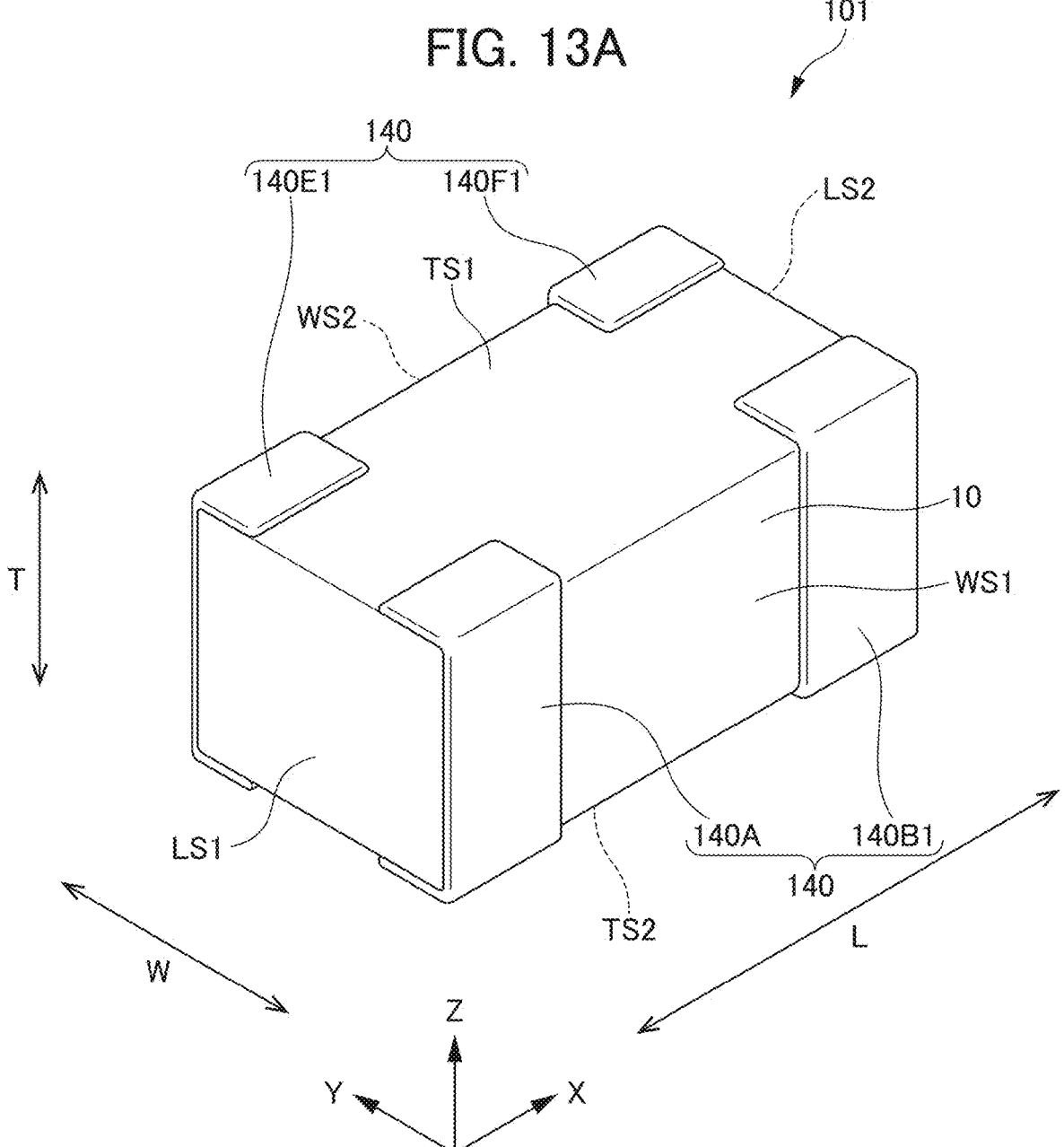
FIG. 13A is an external perspective view of a multilayer ceramic capacitor according to a fifth preferred embodiment of the present invention.
Figure 13B:
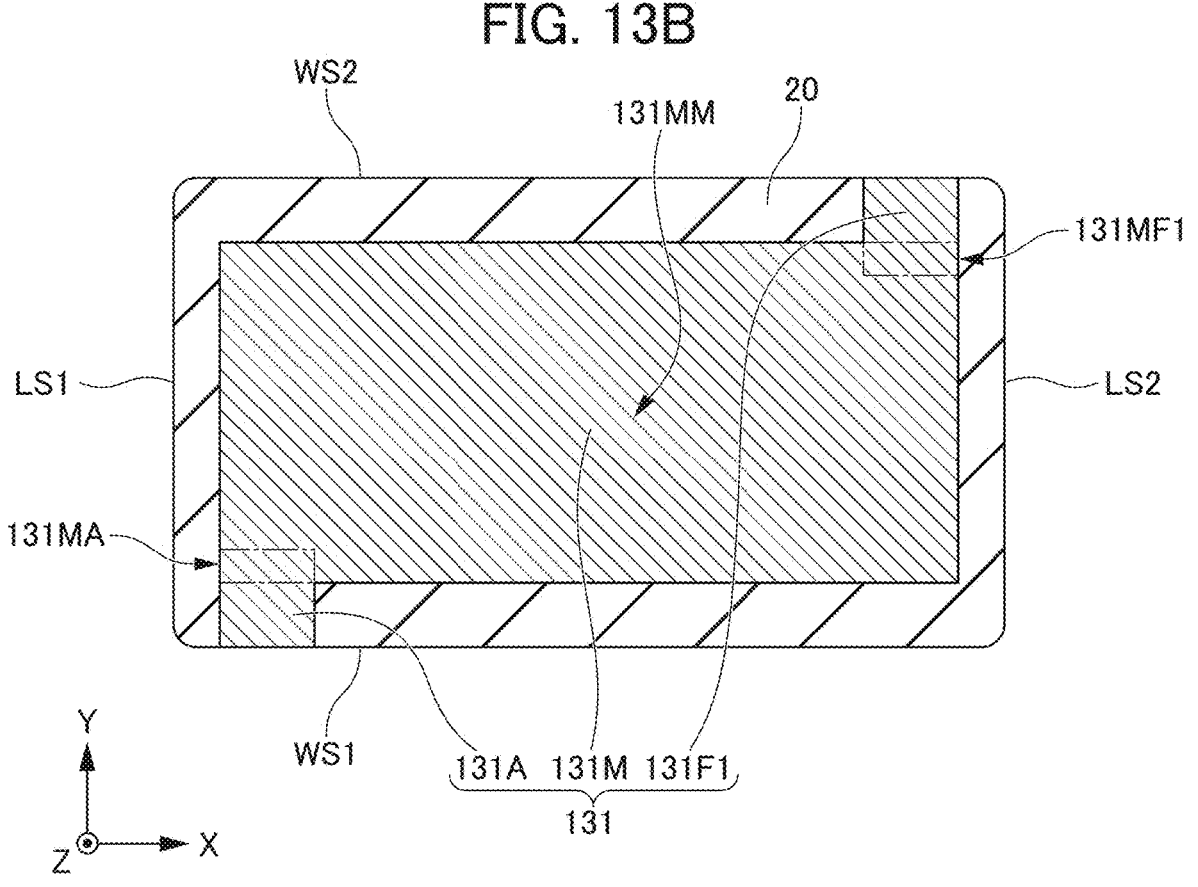
FIG. 13B is a diagram showing a first internal electrode layer of the above preferred embodiment.
Figure 13C:
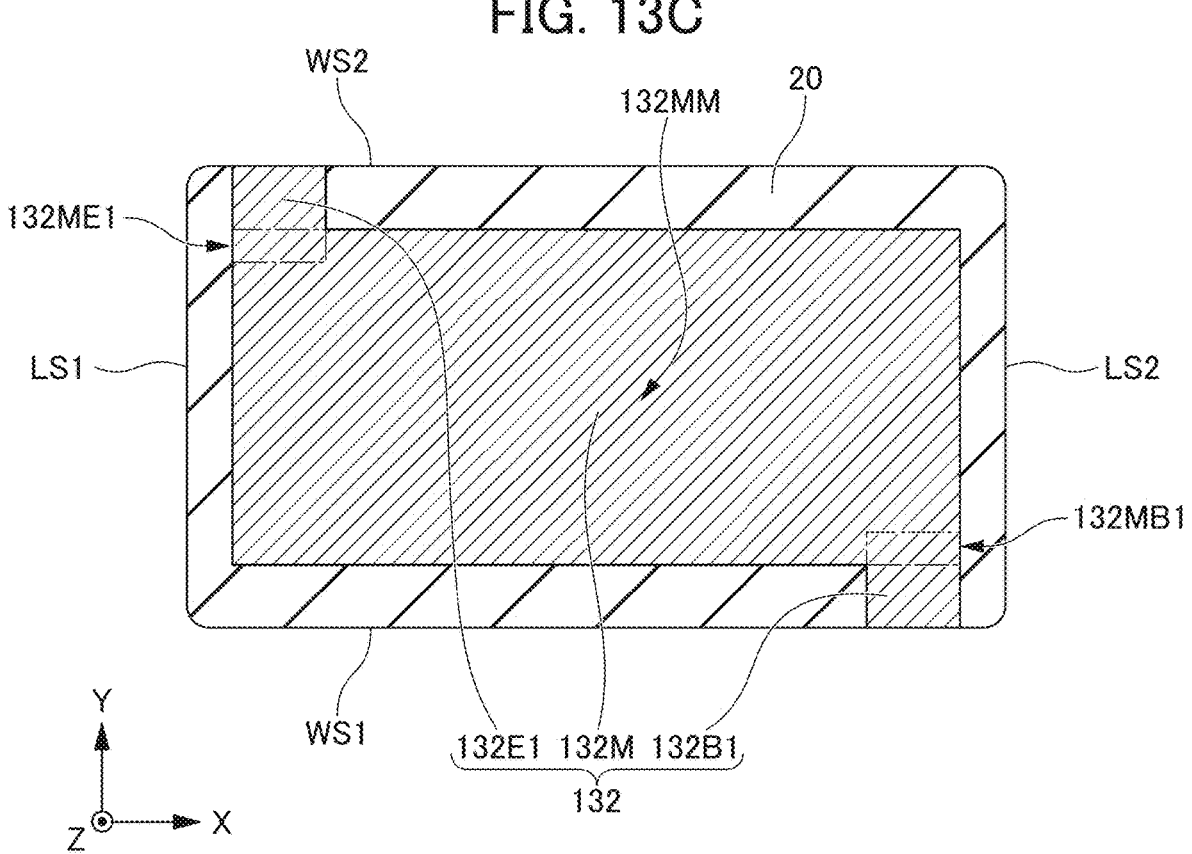
FIG. 13C shows a second internal electrode layer of the fifth preferred embodiment of the present invention.

Hereinafter, a multilayer ceramic capacitor 101 according to a fifth preferred embodiment of the present invention will be described. In the following description of the internal electrode layer, detailed descriptions of the same or substantially the same configurations as in the second preferred embodiment will be omitted. FIG. 13A is an external perspective view of a multilayer ceramic capacitor 101 according to a fifth preferred embodiment of the present invention. FIG. 13B is a view of the cross section LW showing the first internal electrode layer 131 of the multilayer ceramic capacitor 101 according to the present preferred embodiment. FIG. 13C is a view of the cross section LW showing the second internal electrode layer 132 of the multilayer ceramic capacitor 101 of the present preferred embodiment. In FIGS. 13B and 13C, illustration of the external electrode 140 is omitted.

The multilayer ceramic capacitor 101 of the present preferred embodiment differs from the second preferred embodiment in the configuration of the first internal electrode layer, the second internal electrode layer, and the external electrode.

As shown in FIG. 13B, the first internal electrode layer 131 includes a first counter electrode portion 131M opposed to the second internal electrode layer 132 with the dielectric layer 20 interposed therebetween, a first extension portion 131A extending from the first counter electrode portion 131M and extending toward and being exposed at a portion of the first side surface WS1 defining and functioning as a first surface portion adjacent to the first end surface LS1, and a second extension portion 131F1 extending from the first counter electrode portion 131M and extending toward and being exposed at a portion of the second side surface WS2 defining and functioning as a second surface portion adjacent to the second end surface LS2.

The first counter electrode portion 131M includes a first central region 131MM including a central portion of the first counter electrode portion 131M, a first connection region 131MA which is a region connected to the first extension portion 131A and having a higher coverage with respect to the dielectric layer 20 than the first central region 131MM, and a second connection region 131MF1 which is a region connected to the second extension portion 131F1 and having a higher coverage with respect to the dielectric layer 20 than the first central region 131MM.

The coverages of the first connection region 131MA and the second connection region 131MF1 with respect to the dielectric layer 20 are higher than the coverage of the first central region 131MM with respect to the dielectric layer 20. The coverages of the first extension portion 131A and the second extension portion 131F1 with respect to the dielectric layer 20 are higher than the coverage of the first central region 131MM with respect to the dielectric layer 20.

As shown in FIG. 13C, the second internal electrode layer 132 includes a second counter electrode portion 132M opposed to the first internal electrode layer 131 with the dielectric layer 20 interposed therebetween, a third extension portion 132B1 extending from the second counter electrode portion 132M and extending toward and being exposed at a portion of the first side surface WS1 defining and functioning as a third surface portion adjacent to the second end surface LS2, and a fourth extension portion 132E1 extending from the second counter electrode portion 132M and extending toward and being exposed at a portion of the second side surface WS2 defining and functioning as a fourth surface portion adjacent to the first end surface LS1.

The second counter electrode portion 132M preferably includes a second central region 132MM including a central portion of the second counter electrode portion 132M, a third connection region 132MB1 which is a portion connected to the third extension portion 132B1 and which is a region having a higher coverage with respect to the dielectric layer 20 than the second central region 132MM, and a fourth connection region 132ME1 which is a portion connected to the fourth extension portion 132E1 and which is a region having a higher coverage with respect to the dielectric layer 20 than the second central region 132MM.

The coverages of the third connection region 132MB1 and the fourth connection region 132ME1 with respect to the dielectric layer 20 is preferably higher than the coverage of the second central region 132MM with respect to the dielectric layer 20. The coverages of the third extension portion 132B1 and the fourth extension portion 132E1 with respect to the dielectric layer 20 is preferably higher than the coverage of the second central region 132MM with respect to the dielectric layer 20.

The external electrode 140 of the present preferred embodiment includes, as three or more external electrodes, a first external electrode 140A connected to the first extension portion 131A, a second external electrode 140F1 connected to the second extension portion 131F1, a third external electrode 140B1 connected to the third extension portion 132B1, and a fourth external electrode 140E1 connected to the fourth extension portion 132E1.

Even in such a configuration, it is possible to obtain the same or similar advantageous effects as in the first preferred embodiment.

Sixth Preferred Embodiment

Figure 14A:
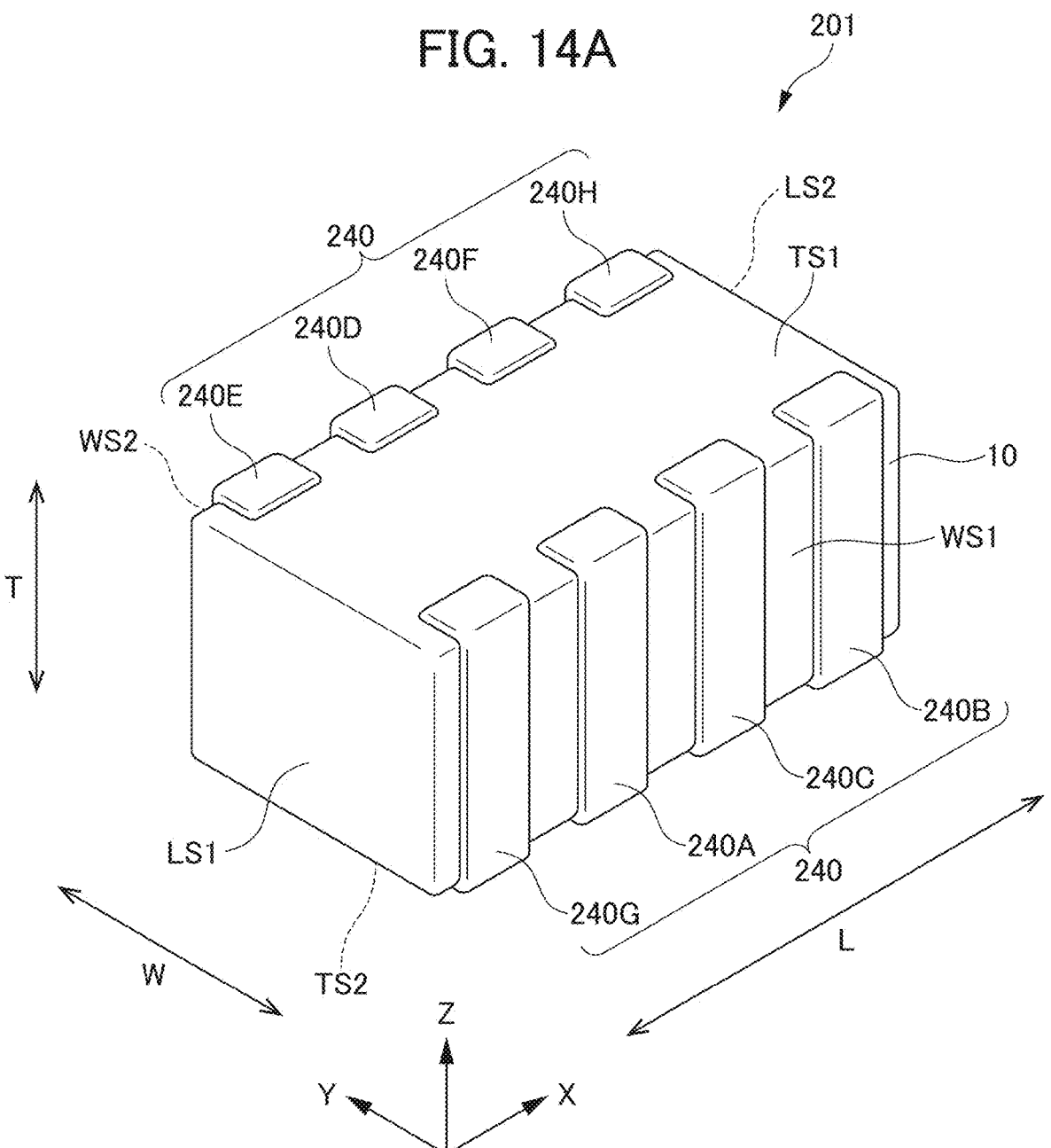
FIG. 14A is an external perspective view of a multilayer ceramic capacitor according to a sixth preferred embodiment of the present invention.
Figure 14B:
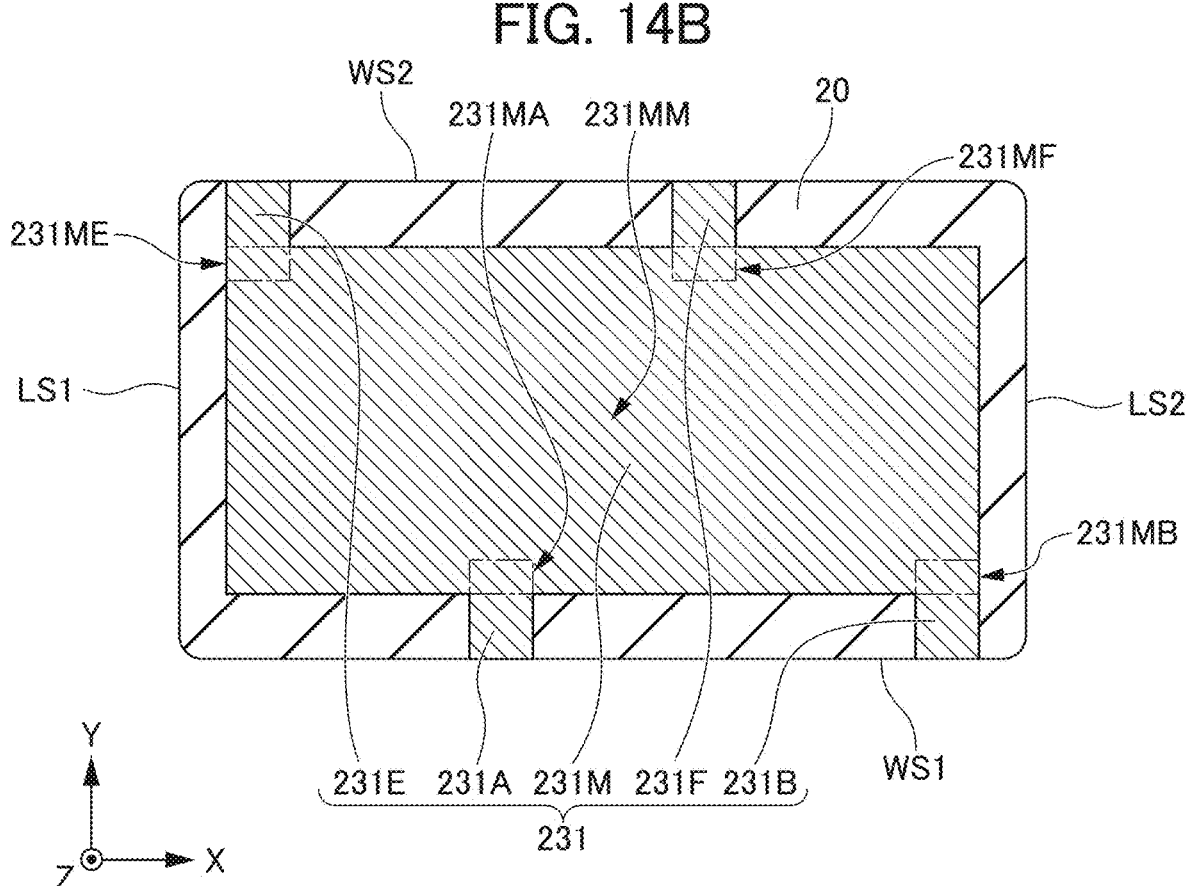
FIG. 14B is a diagram showing a first internal electrode layer of the sixth preferred embodiment of the present invention.
Figure 14C:
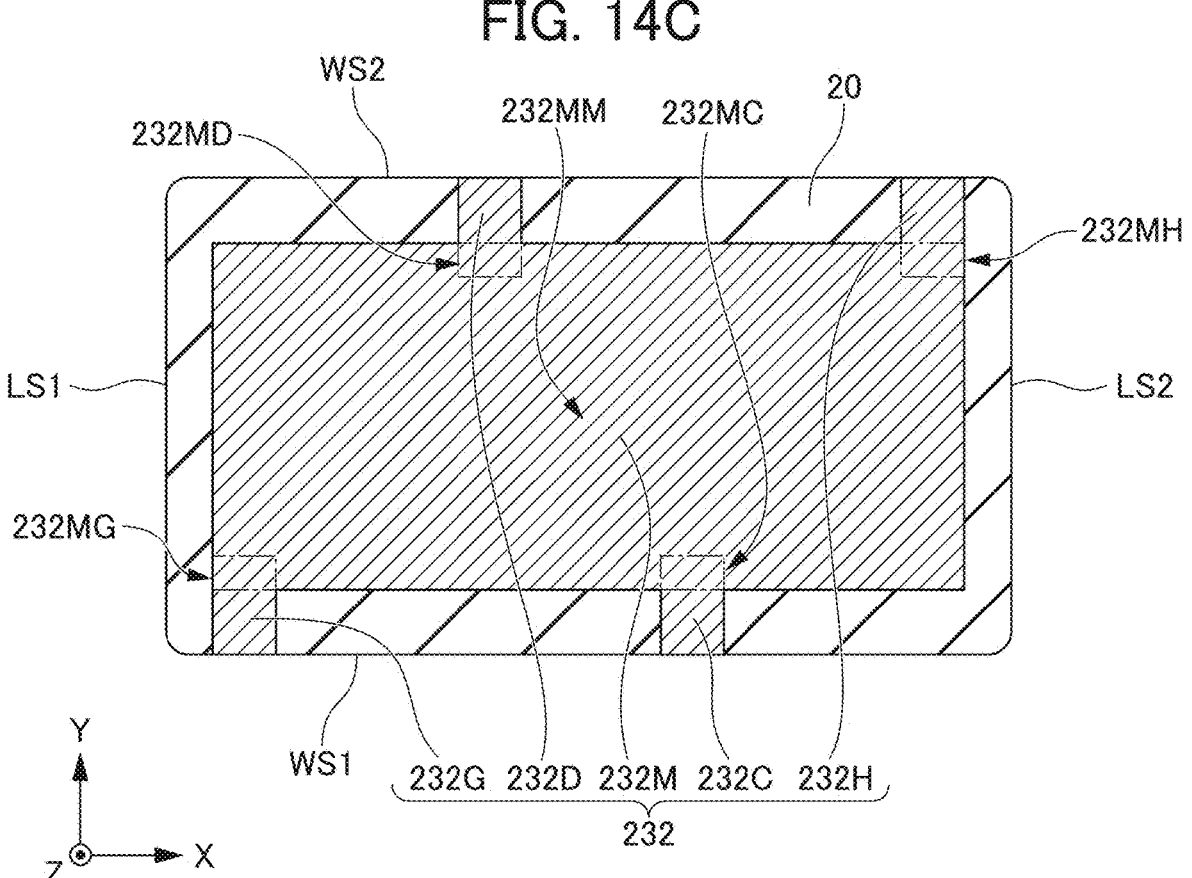
FIG. 14C shows a second internal electrode layer of the sixth preferred embodiment of the present invention.

Hereinafter, a multilayer ceramic capacitor 201 according to a sixth preferred embodiment of the present invention will be described. In the following description of the internal electrode layer, detailed descriptions of the same or substantially the same configurations as in the second preferred embodiment will be omitted. FIG. 14A is an external perspective view of a multilayer ceramic capacitor 201 according to a sixth preferred embodiment of the present invention. FIG. 14B is a view of the cross section LW showing a first internal electrode layer 231 of the multilayer ceramic capacitor 201 of the present preferred embodiment. FIG. 14C is a view of the cross section LW showing a second internal electrode layer 232 of the multilayer ceramic capacitor 201 of the present preferred embodiment. In FIGS. 14B and 14C, illustration of the external electrode 240 is omitted.

The multilayer ceramic capacitor 201 of the present preferred embodiment differs from the second preferred embodiment in the configuration of the first internal electrode layer, the second internal electrode layer, and the external electrode.

As shown in FIG. 14B, the first internal electrode layer 231 includes a first counter electrode portion 231M opposed to the second internal electrode layer 232 with the dielectric layer 20 interposed therebetween, a first extension portion 231A extending from the first counter electrode portion 231M and extending toward and being exposed at a portion of the first side surface WS1 defining and functioning as a first surface portion adjacent to the first end surface LS1, and a second extension portion 231B extending from the first counter electrode portion 231M and extending toward and being exposed at a portion of the first side surface WS1 defining and functioning as a second surface portion adjacent to the second end surface LS2. The first internal electrode layer 231 further includes a tenth extension portion 231E extending from the first counter electrode portion 231M and extending toward and being exposed at a portion of the second side surface WS2 adjacent to the first end surface LS1, and an eleventh extension portion 231F extending from the first counter electrode portion 231M and extending toward and being exposed at a portion of the second side surface WS2 adjacent to the second end surface LS2.

The first counter electrode portion 231M includes a first central region 231MM including a central portion of the first counter electrode portion 231M, a first connection region 231MA which is a portion connected to the first extension portion 231A and is a region having a higher coverage with respect to the dielectric layer 20 than the first central region 231MM, and a second connection region 231MB which is a portion connected to the second extension portion 231B and is a region having a higher coverage with respect to the dielectric layer 20 than the first central region 231MM. The first counter electrode portion 231M further includes a tenth connection region 231ME which is a portion connected to the tenth extension portion 231E and is a region having a higher coverage with respect to the dielectric layer 20 than the first central region 231MM, and an eleventh connection region 231MF which is a portion connected to the eleventh extension portion 231F and is a region having a higher coverage with respect to the dielectric layer 20 than the first central region 231MM.

The coverages of the first connection region 231MA and the second connection region 231MB with respect to the dielectric layer 20 are higher than the coverage of the first central region 231MM with respect to the dielectric layer 20. The coverages of the first extension portion 231A and the second extension portion 231B with respect to the dielectric layer 20 are higher than the coverage of the first central region 231MM with respect to the dielectric layer 20. The coverages of the tenth connection region 231ME and the eleventh connection region 231MF with respect to the dielectric layer 20 are preferably higher than the coverage of the first central region 231MM with respect to the dielectric layer 20. The coverages of the tenth extension portion 231E and the eleventh extension portion 231F with respect to the dielectric layer 20 are preferably higher than the coverage of the first central region 231MM with respect to the dielectric layer 20.

As shown in FIG. 14C, the second internal electrode layer 232 includes a second counter electrode portion 232M opposed to the first internal electrode layer 231 with the dielectric layer 20 interposed therebetween, a third extension portion 232C extending from the second counter electrode portion 232M and extending toward and being exposed at a portion of the first side surface WS1 defining and functioning as a third surface portion adjacent to the second end surface LS2, and a fourth extension portion 232D extending from the second counter electrode portion 232M and extending toward and being exposed at a portion of the second side surface WS2 defining and functioning as a fourth surface portion adjacent to the first end surface LS1. The second internal electrode layer 232 further includes a twelfth extension portion 232G extending from the second counter electrode portion 232M and extending toward and being exposed at a portion of the first side surface WS1 adjacent to the first end surface LS1, and a thirteenth extension portion 232H extending from the second counter electrode portion 232M and extending toward and being exposed at a portion of the second side surface WS2 adjacent to the second end surface LS2.

The second counter electrode portion 232M preferably includes a second central region 232MM including a central portion of the second counter electrode portion 232M, a third connection region 232MC that is a portion connected to the third extension portion 232C and that is a region having a higher coverage with respect to the dielectric layer 20 than the second central region 232MM, and a fourth connection region 232MD that is a portion connected to the fourth extension portion 232D and that is a region having a higher coverage with respect to the dielectric layer 20 than the second central region 232MM. The second counter electrode portion 232M preferably further includes a twelfth connection region 232 MG which is a portion connected to the twelfth extension portion 232G and is a region having a higher coverage with respect to the dielectric layer 20 than the second central region 232MM, and a thirteenth connection region 232MH which is a portion connected to the thirteenth extension portion 232H and is a region having a higher coverage with respect to the dielectric layer 20 than the second central region 232MM.

The coverages of the third connection region 232MC and the fourth connection region 232MD with respect to the dielectric layer 20 are preferably higher than the coverage of the second central region 232MM with respect to the dielectric layer 20. The coverages of the third extension portion 232C and the fourth extension portion 232D with respect to the dielectric layer 20 are preferably higher than the coverage of the second central region 232MM with respect to the dielectric layer 20. The coverages of the twelfth connection region 232 MG and the thirteenth connection region 232MH with respect to the dielectric layer 20 are preferably higher than the coverage of the second central region 232MM with respect to the dielectric layer 20. The coverages of the twelfth extension portion 232G and the thirteenth extension portion 232H with respect to the dielectric layer 20 are preferably higher than the coverage of the second central region 232MM with respect to the dielectric layer 20.

The external electrode 240 of the present preferred embodiment includes, as three or more external electrodes, a first external electrode 240A connected to the first extension portion 231A, a second external electrode 240B connected to the second extension portion 231B, a third external electrode 240C connected to the third extension portion 232C, and a fourth external electrode 240D connected to the fourth extension portion 232D. The external electrode 240 of the present preferred embodiment further includes a fifth external electrode 240E connected to the tenth extension portion 231E, a sixth external electrode 240F connected to the eleventh extension portion 231F, a seventh external electrode 240G connected to the twelfth extension portion 232G, and an eighth external electrode 240H connected to the thirteenth extension portion 232H.

Even in such a configuration, it is possible to obtain the same or similar advantageous effects as in the first preferred embodiment.

Seventh Preferred Embodiment

Figure 15A:
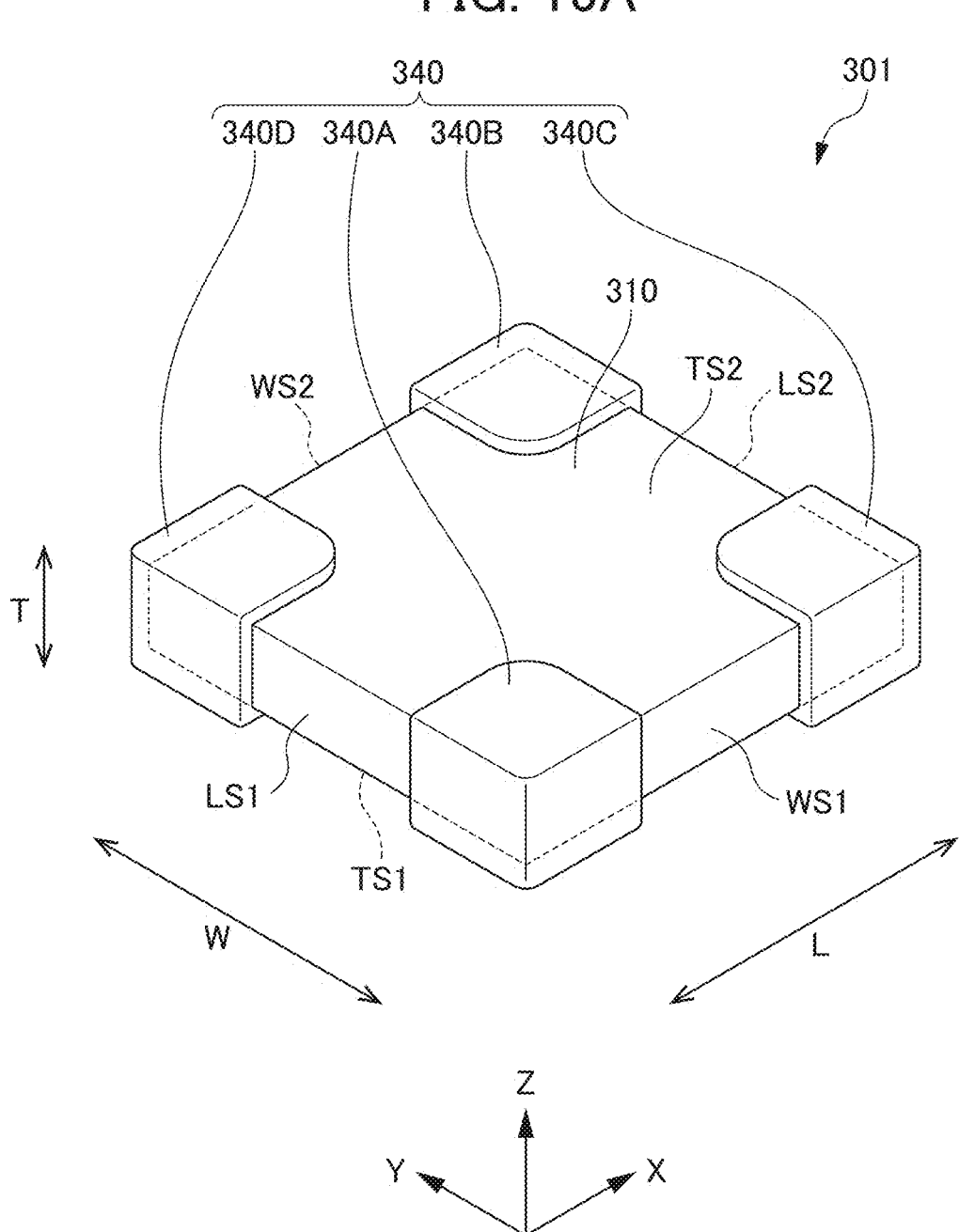
FIG. 15A is an external perspective view of a multilayer ceramic capacitor according to a seventh preferred embodiment of the present invention.
Figure 15B:
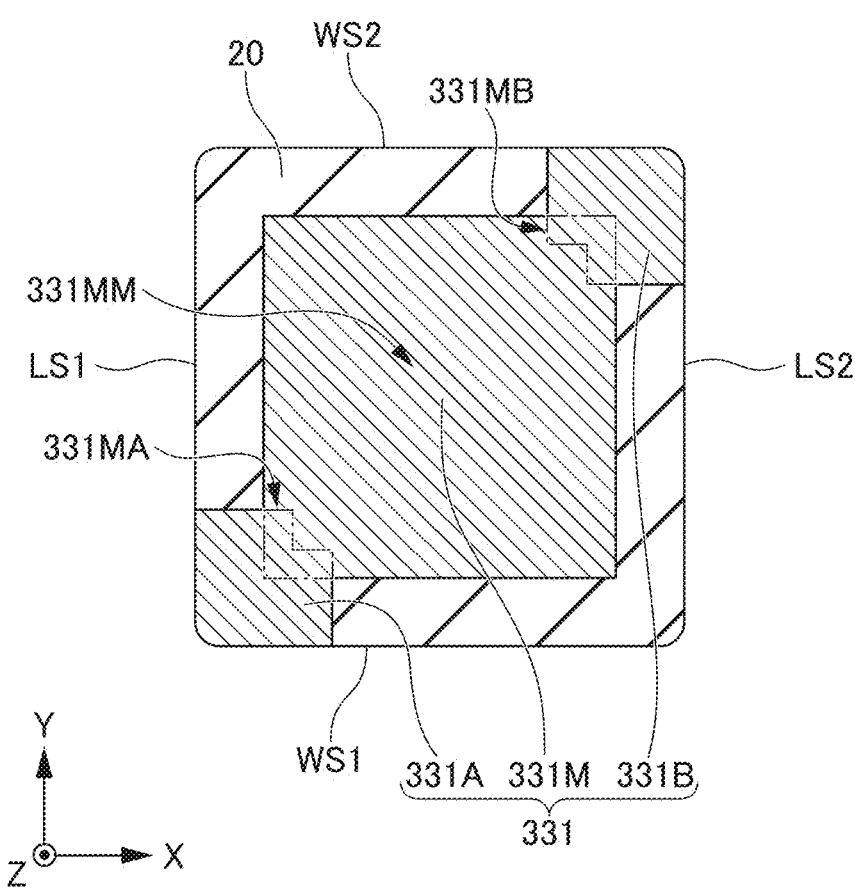
FIG. 15B is a diagram showing a first internal electrode layer of the seventh preferred embodiment of the present invention.
Figure 15C:
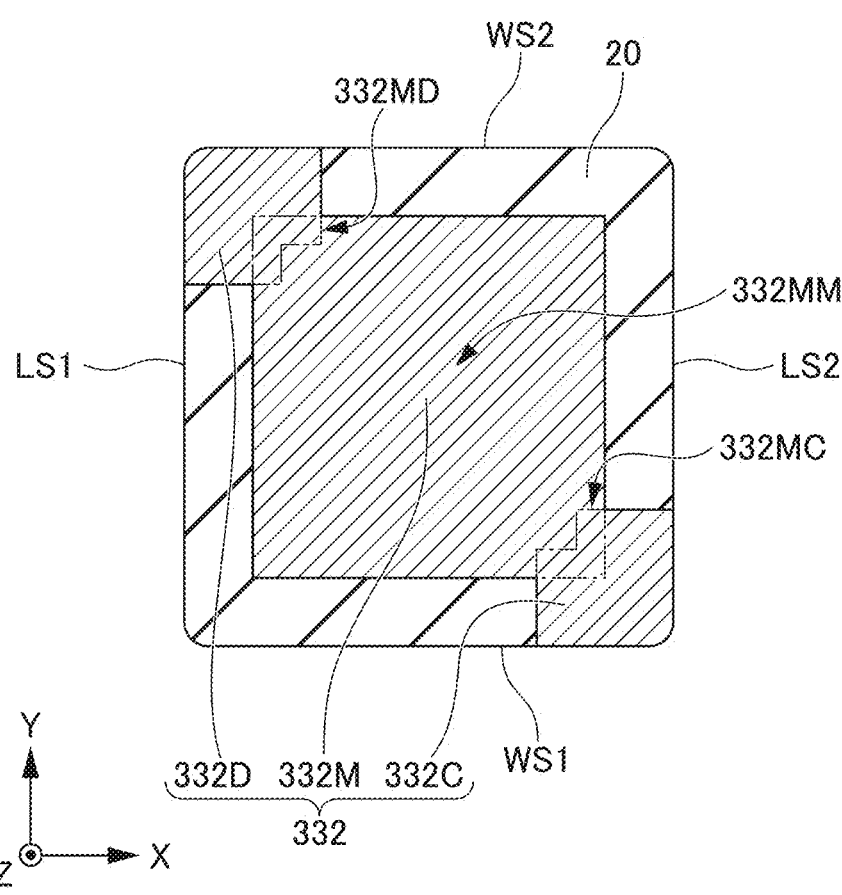
FIG. 15C shows the second internal electrode layer of the seventh preferred embodiment of the present invention.

Hereinafter, a multilayer ceramic capacitor 301 according to a seventh preferred embodiment of the present invention will be described. In the following description of the internal electrode layer, detailed descriptions of the same or substantially the same configurations as in the first preferred embodiment will be omitted. FIG. 15A is an external perspective view of a multilayer ceramic capacitor 301 according to a seventh preferred embodiment of the present invention. FIG. 15B is a view of the cross section LW showing a first internal electrode layer 331 of the multilayer ceramic capacitor 301 of the present preferred embodiment. FIG. 15C is a view of the cross section LW showing a second internal electrode layer 332 of the multilayer ceramic capacitor 301 of the present preferred embodiment. In FIGS. 15B and 15C, illustration of the external electrode 340 is omitted.

The multilayer ceramic capacitor 1 of the present preferred embodiment differs from the first preferred embodiment in the configuration of the multilayer body, the first internal electrode layer, the second internal electrode layer, and the external electrode.

The multilayer ceramic capacitor 301 of the present preferred embodiment includes a multilayer body 310 and external electrodes 340. The multilayer body 310 of the present preferred embodiment is thin in the lamination direction, and has a square or substantially square shape when viewed in the lamination direction.

As shown in FIG. 15B, the first internal electrode layer 331 includes a first counter electrode portion 331M opposed to the second internal electrode layer 332 with the dielectric layer 20 interposed therebetween, a first extension portion 331A extending from the first counter electrode portion 331M and extending toward and being exposed at a first side surface WS1 and a first end surface LS1 functioning as a first surface portion, and a second extension portion 331B extending from the first counter electrode portion 331M and extending toward and being exposed at a second side surface WS2 and a second end surface LS2 functioning as a second surface portion.

The first counter electrode portion 331M includes a first central region 331MM including a central portion of the first counter electrode portion 331M, a first connection region 331MA which is a portion connected to the first extension portion 331A and is a region having a higher coverage with respect to the dielectric layer 20 than the first central region 331MM, and a second connection region 331MB which is a portion connected to the second extension portion 331B and is a region having a higher coverage with respect to the dielectric layer 20 than the first central region 331MM.

The coverages of the first connection region 331MA and the second connection region 331MB with respect to the dielectric layer 20 are higher than the coverage of the first central region 331MM with respect to the dielectric layer 20. The coverages of the first extension portion 331A and the second extension portion 331B with respect to the dielectric layer 20 are higher than the coverage of the first central region 331MM with respect to the dielectric layer 20.

As shown in FIG. 15C, the second internal electrode layer 332 includes a second counter electrode portion 332M opposed to the first internal electrode layer 331 with the dielectric layer 20 interposed therebetween, a third extension portion 332C extending from the second counter electrode portion 332M and extending toward and being exposed at a first side surface WS1 and a second end surface LS2 defining and functioning as a third surface portion, and a fourth extension portion 332D extending from the second counter electrode portion 332M and extending toward and being exposed at a second side surface WS2 and a first end surface LS1 defining and functioning as a fourth surface portion.

The second counter electrode portion 332M preferably includes a second central region 332MM including a central portion of the second counter electrode portion 332M, a third connection region 332MC which is a portion connected to the third extension portion 332C and which is a region having a higher coverage with respect to the dielectric layer 20 than the second central region 332MM, and a fourth connection region 332MD which is a portion connected to the fourth extension portion 332D and which is a region having a higher coverage with respect to the dielectric layer 20 than the second central region 332MM.

The coverages of the third connection region 332MC and the fourth connection region 332MD with respect to the dielectric layer 20 are preferably higher than the coverage of the second central region 332MM with respect to the dielectric layer 20. The coverages of the third extension portion 332C and the fourth extension portion 332D with respect to the dielectric layer 20 are preferably higher than the coverage of the second central region 332MM with respect to the dielectric layer 20.

The external electrode 340 of the present preferred embodiment includes, as three or more external electrodes, a first external electrode 340A connected to the first extension portion 331A, a second external electrode 340B connected to the second extension portion 331B, a third external electrode 340C connected to the third extension portion 332C, and a fourth external electrode 340D connected to the fourth extension portion 332D.

Even in such a configuration, it is possible to obtain the same or similar advantageous effects as in the first preferred embodiment.

Experimental Examples

According to the above-described manufacturing method, multilayer ceramic capacitors were fabricated as samples of the experimental examples, and the values of the DC resistance (Rdc) of the multilayer ceramic capacitors were measured.

1. Manufacturing of Multilayer Ceramic Capacitor

As samples of the experimental examples, multilayer ceramic capacitors each having the structures shown in FIGS. 1 to 7 and having the following specifications in which the coverage of the internal electrode layer with respect to the dielectric layer was adjusted were fabricated using the manufacturing method according to the present preferred embodiment of the present invention.

Dimensions of multilayer ceramic capacitor: L×W× T=about 1.0 mm×about 0.5 mm×about 0.5 mm Material (main component) of dielectric layer: $BaTiO_3$ Capacitance: about 10 μF Rated voltage: about 4 V Thickness of dielectric layer: about 0.5 μm First internal electrode layer Material: Ni Shape: shape shown in FIG. 6

Thickness: about 0.4 μm

Coverage A of first counter electrode portion with respect to dielectric layer: See Table Coverage B of first connection region and second connection region with respect to dielectric layer: See Table Coverage C of first extension portion and second extension portion with respect to dielectric layer: See Table Second internal electrode layer: Ni Material: Ni Shape: Shape shown in FIG. 7

Thickness: about 0.4 μm

Coverage D of second counter electrode portion with respect to dielectric layer: See Table Coverage E of third connection region and fourth connection region with respect to dielectric layer: See Table Coverage F of third extension portion and fourth extension portion with respect to dielectric layer: See Table Structure of external electrode Structures of first external electrode and second external electrode Base electrode layer: fired layer containing electrically conductive metal (Cu) and glass component Thickness of central portion of the side surface: about 30 μm Plated layer: Two-layer formation of Ni plated layer and Sn plated layer Thickness of Ni plated layer: about 4 μm Thickness of Sn plated layer: about 4 μm Third and fourth external electrodes Base electrode layer: fired layer containing electrically conductive metal (Cu) and glass component Thickness of central portion of end surface: about 45 μm Plated layer: two-layer formation of Ni plated layer and Sn plated layer Thickness of Ni plated layer: about 4 μm Thickness of Sn plated layer: about 4 μm 2. Evaluation Next, the fabricated samples were evaluated according to the following measurement method.

Measurement of Value of DC Resistance (Rdc) of Multilayer Ceramic Capacitor

For the experimental examples 1a to 8a, the potential difference V between the first external electrode and the second external electrode was measured while the current I=about 100 mA was energized between the first external electrode and the second external electrode, and the DC resistance Rdc1 was calculated by calculating Rdc1=V/I (potential difference/about 100 mA). Thereafter, the coverages A, B, and C were measured. For the experimental examples 1b to 8b, the potential difference V between the third external electrode and the fourth external electrode was measured while the current I=about 100 mA was energized between the third external electrode and the fourth external electrode, and the DC resistance Rdc2 was calculated by calculating Rdc2=V/I (potential difference/about 100 mA). Thereafter, the coverages D, E, and F were measured.

3. Measurement Results

Table 1 shows the measurement results of Rdc1 and the coverages A, B and C. Table 2 shows the measurement results of Rdc2 and the coverages D, E and F.

TABLE 1

| | COVERAGE A | COVERAGE B | COVERAGE C | DC RESISTANCE Rdc1 |
|---|---|---|---|---|
| EXPERIMENTAL EXAMPLES 1 a | 58% | 42% | 41% | 20 m Ω |
| EXPERIMENTAL EXAMPLES 2 a | 53% | 71% | 73% | 14 m Ω |
| EXPERIMENTAL EXAMPLES 3 a | 52% | 44% | 46% | 19 m Ω |
| EXPERIMENTAL EXAMPLES 4 a | 52% | 74% | 72% | 14 m Ω |
| EXPERIMENTAL EXAMPLES 5 a | 65% | 56% | 55% | 17 m Ω |
| EXPERIMENTAL EXAMPLES 6 a | 60% | 80% | 79% | 10 m Ω |
| EXPERIMENTAL EXAMPLES 7 a | 80% | 98% | 95% | 4 m Ω |
| EXPERIMENTAL EXAMPLES 8 a | 95% | 100% | 100% | 3 m Ω |

TABLE 2

| | COVERAGE D | COVERAGE E | COVERAGE F | DC RESISTANCE Rdc2 |
|---|---|---|---|---|
| EXPERIMENTAL EXAMPLES 1 b | 58% | 44% | 43% | 19 m Ω |
| EXPERIMENTAL EXAMPLES 2 b | 53% | 49% | 47% | 17 m Ω |
| EXPERIMENTAL EXAMPLES 3 b | 52% | 73% | 75% | 13 m Ω |
| EXPERIMENTAL EXAMPLES 4 b | 52% | 76% | 74% | 12 m Ω |
| EXPERIMENTAL EXAMPLES 5 b | 65% | 51% | 54% | 16 m Ω |
| EXPERIMENTAL EXAMPLES 6 b | 60% | 78% | 80% | 9 m Ω |
| EXPERIMENTAL EXAMPLES 7 b | 78% | 97% | 98% | 3 m Ω |
| EXPERIMENTAL EXAMPLES 8 b | 95% | 100% | 100% | 2 m Ω |

When the experimental example 3a is compared with the experimental example 2a and the experimental example 4a, it is understood that, when the coverages A are the same or substantially the same values among them, it is possible to reduce the DC resistance Rdc1 by setting the coverage B and the coverage C higher than the coverage A (the experimental example 2a and the experimental example 4a). Furthermore, when comparing the experimental example 5a with the experimental examples 2a and 4a, it can be confirmed that the DC resistance Rdc1 becomes high when the coverage B and the coverage C are low, even when the coverage A is increased. In the experimental example 8a, by making the coverage A lower than the coverage B and the coverage C, it is possible to lower the DC resistance Rdc1 while increasing the adhesiveness between the dielectric layers.

When comparing the experimental example 2b with the experimental example 3b and the experimental example 4b, it is understood that, when the coverages D are the same or substantially the same value among them, it is possible to reduce the DC resistance Rdc2 by setting the coverage E and the coverage F higher than the coverage D (the experimental example 3b and the experimental example 4b). Furthermore, when comparing the experimental example 5b with the experimental examples 3b and 4b, it can be confirmed that the DC resistance Rdc2 becomes high when the coverage E and the coverage F are low even when the coverage D is increased. In the experimental example 8b, by making the coverage D lower than the coverage E and the coverage F, it is possible to lower the DC resistance Rdc2 while increasing the adhesiveness between the dielectric layers.

As shown in the experimental examples 2a, 4a, 6a, 7a and 8a, it is possible to reduce the DC resistance Rdc1 by setting the coverage A<the coverage B and the coverage A<the coverage C. Furthermore, as shown in the experimental examples 3b, 4b, 6b, 7b and 8b, it is possible to reduce the DC resistance Rdc2 by setting the coverage D<the coverage E and the coverage D<the coverage F. The coverages B, C, E, and F are preferably, for example, about 72% or more. The coverages A and D are preferably, for example, about 52% or more. The coverages B and C may be high at, for example, about 5% or more than the coverage A. The coverages E and F may be high at, for example, about 5% or more than the coverage D.

With such a configuration, it is possible to improve the adhesion strength between the dielectric layers, to reduce or prevent the increase of the DC resistance (Rdc) while reducing or preventing delamination, and to maintain and improve the characteristics of the multilayer ceramic capacitor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including a plurality of laminated dielectric layers, a plurality of internal electrode layers each laminated on a respective one of the plurality of dielectric layers, a first main surface and a second main surface opposed to each other in a lamination direction, a first end surface and a second end surface opposed to each other in a length direction orthogonal or substantially orthogonal to the lamination direction, and a first side surface and a second side surface opposed to each other in a width direction orthogonal or substantially orthogonal to the lamination direction and the length direction; and three or more external electrodes; wherein the plurality of internal electrode layers include a plurality of first internal electrode layers and a plurality of second internal electrode layers;

the plurality of first internal electrode layers each include a first counter electrode portion opposed to a respective one of the plurality of second internal electrode layers with a respective one of the plurality of dielectric layers interposed therebetween, a first extension portion extending from the first counter electrode portion and extending toward and being exposed at a first surface portion of the multilayer body, and a second extension portion extending from the first counter electrode portion and extending toward and being exposed at a second surface portion of the multilayer body;

the plurality of second internal electrode layers each include a second counter electrode portion opposed to a respective one of the plurality of first internal electrode layers with a respective one of the plurality of dielectric layers interposed therebetween, and a third extension portion extending from the second counter electrode portion and extending toward and being exposed at a third surface portion of the multilayer body;

the three or more external electrodes include a first external electrode connected to the first extension portion, a second external electrode connected to the second extension portion, and a third external electrode connected to the third extension portion;

the first counter electrode portion includes a first central region including a central portion of the first counter electrode portion, and a first peripheral region around the first central region;

the first peripheral region includes a first connection region connected to the first extension portion, a second connection region connected to the second extension portion, and a portion other than the first connection region and the second connection region;

a coverage of each of the first connection region and the second connection region with respect to the dielectric layers is higher than a coverage of the first central region with respect to the dielectric layers and higher than a coverage of the portion other than the first connection region and the second connection region of the first peripheral region with respect to the dielectric layers;

coverages of the first extension portion and the second extension portion with respect to the dielectric layers are higher than the coverage of the first central region with respect to the dielectric layers; and in at least one of the plurality of first internal electrode layers, an average thickness of the first counter electrode portion is equal or substantially equal to an average thickness of at least one of the first and second connection regions.

2. The multilayer ceramic capacitor according to claim 1, wherein at least a portion of the first surface portion is a portion of the first side surface; and at least a portion of the second surface portion is a portion of the second side surface.

3. The multilayer ceramic capacitor according to claim 2, wherein a length of the first extension portion in the length direction is shorter than a length of the first counter electrode portion in the length direction; and a length of the second extension portion in the length direction is shorter than a length of the first counter electrode portion in the length direction.

4. The multilayer ceramic capacitor according to claim 1, wherein the coverages of the first connection region and the second connection region with respect to the dielectric layers are about 72% or more; and the coverages of the first extension portion and the second extension portion with respect to the dielectric layers are about 72% or more.

5. The multilayer ceramic capacitor according to claim 1, wherein the second internal electrode layers each include a fourth extension portion extending from the second counter electrode portion and extending toward and being exposed at a fourth surface portion of the multilayer body; and the three or more external electrodes further include a fourth external electrode connected to the fourth extension portion.

6. The multilayer ceramic capacitor according to claim 5, wherein at least a portion of the third surface portion is a portion of the first end surface; and at least a portion of the fourth surface portion is a portion of the second end surface.

7. The multilayer ceramic capacitor according to claim 6, wherein a length of the third extension portion in the width direction is shorter than a length of the second counter electrode portion in the width direction; and a length of the fourth extension portion in the width direction is shorter than a length of the second counter electrode portion in the width direction.

8. The multilayer ceramic capacitor according to claim 5, wherein the second counter electrode portion includes a second central region including a central portion of the second counter electrode portion, and a second peripheral region around the second central region;

the second peripheral region includes a third connection region connected to the third extension portion, a fourth connection region connected to the fourth extension portion, and a portion other than the third connection region and the fourth connection region;

a coverage of each of the third connection region and the fourth connection region with respect to the dielectric layers is higher than a coverage of the second central region with respect to the dielectric layers and higher than a coverage of the portion other than the third connection region and the fourth connection region of the second peripheral region with respect to the dielectric layers; and coverages of the third extension portion and the fourth extension portion with respect to the dielectric layers are higher than the coverage of the second central region with respect to the dielectric layers.

9. The multilayer ceramic capacitor according to claim 8, wherein the coverages of the third connection region and the fourth connection region with respect to the dielectric layers are about 72% or more; and the coverages of the third extension portion and the fourth extension portion with respect to the dielectric layers are about 72% or more.

10. The multilayer ceramic capacitor according to claim 1, wherein the dielectric layers each include a thickness of about 0.3 μm or more and about 1.5 μm or less.

11. The multilayer ceramic capacitor according to claim 1, wherein the internal electrode layers each include a thickness of about 0.25 μm or more and about 0.6 μm or less.

12. The multilayer ceramic capacitor according to claim 11, wherein the internal electrode layers each include a thickness of about 0.25 μm or more and about 0.4 μm or less.

13. The multilayer ceramic capacitor according to claim 1, wherein an extending direction of the first extension portion is defined as a first extending direction;

a length of the first extension portion in a direction orthogonal or substantially orthogonal to the first extending direction is shorter than a length of the first counter electrode portion in a direction orthogonal or substantially orthogonal to the first extending direction;

an extending direction of the second extension portion is defined as a second extending direction; and a length of the second extension portion in a direction orthogonal or substantially orthogonal to the second extending direction is shorter than a length of the first counter electrode portion in a direction orthogonal or substantially orthogonal to the second extending direction.

14. The multilayer ceramic capacitor according to claim 13, wherein at least a portion of the first surface portion is a portion of the first side surface; and at least a portion of the second surface portion is a portion of the second side surface.

15. The multilayer ceramic capacitor according to claim 13, wherein at least a portion of the first surface portion is a portion of the first end surface; and at least a portion of the second surface portion is a portion of the second end surface.

16. The multilayer ceramic capacitor according to claim 13, wherein at least a portion of the first surface portion is a portion of the first side surface adjacent to the first end surface; and at least a portion of the second surface portion is a portion of the first side surface adjacent to the second end surface.

17. The multilayer ceramic capacitor according to claim 1, wherein each of the plurality of dielectric layers includes $BaTiO_3$, $CaTiO_3$, $SrTiO_3$, or $CaZrO_3$ as a main component.

18. The multilayer ceramic capacitor according to claim 17, wherein each of the plurality of dielectric layers further includes a Mn compound, a Fe compound, a Cr compound, a Co compound, or Ni compound as a sub-component.

19. The multilayer ceramic capacitor according to claim 1, wherein a thickness of each of the plurality of dielectric layers is about 0.3 μm or more and about 1.5 μm or less.

20. The multilayer ceramic capacitor according to claim 1, wherein a number of the plurality of dielectric layers is 14 or more and 1000 or less.

* * * * *